United States Patent [19]

Mathews et al.

[11] Patent Number: 5,311,183

[45] Date of Patent: May 10, 1994

[54] WINDSHEAR RADAR SYSTEM WITH UPPER AND LOWER ELEVATION RADAR SCANS

[75] Inventors: Bruce D. Mathews, Catonsville; Paul D. Mountcastle, Columbia; Walter W. Patterson, Edgewater, all of Md.

[73] Assignee: Westinghouse Electric Corp., Pittsburgh, Pa.

[21] Appl. No.: 714,133

[22] Filed: Jun. 13, 1991

[51] Int. Cl.$^5$ .......................................... G01S 13/95
[52] U.S. Cl. ..................................... 342/26
[58] Field of Search ......................... 342/26

[56] References Cited

U.S. PATENT DOCUMENTS

| Re. 33,152 | 1/1990 | Atlas | 342/26 |
|---|---|---|---|
| 3,573,824 | 4/1971 | Armstrong | 342/26 |
| 4,223,309 | 9/1980 | Payne | 342/26 |
| 4,649,388 | 3/1987 | Atlas | 342/26 |
| 4,712,108 | 12/1987 | Schwab | 342/26 |
| 4,835,536 | 5/1989 | Piesinger et al. | 342/26 |
| 4,965,573 | 10/1990 | Gallagher | 342/26 X |
| 5,077,558 | 12/1991 | Kuntman | 342/26 |
| 5,130,712 | 7/1992 | Rubin et al. | 342/26 |

OTHER PUBLICATIONS

ARINC Characteristic 708-5 Airborne Weather Radar, Aeronautical Radio Inc., 2551 Riva Road, Annapolis, Md. 21401, Jan. 11, 1988.
AIAA-88-4657, Airborne Doppler Radar Detection of Low Altitude Windshear, E. M. Bracalente, C. L. Britt and W. R. Jones, NASA Langley Research Center, Hampton, Va., Sep. 1988.
ARP 4102/11, Airborne Windshear Systems, Rev 1, Draft 9, SAE Committee S-7, TEAS7-6, Project No. S7-84-8, May 11, 1988.
TSO-C117, Airborne Windshear Warning and Escape Guidance Systems for Transport Airplanes, Dept. of Transportation, Federal Aviation Administration, Aircraft Certification Service, Washington, D.C., Jul. 24, 1990.
RTCA (Radio Technical Commission for Aeronautics) Document No. DO-160B, Environmental Conditions and Test Procedures for Airborne Equipment, Aug. 1989.
RTCA Document No. DO-178A, Software Considerations in Airborne Systems and Equipment Certification, dated Mar. 1985.
Proctor, FH, "NASA Wind Shear Model—Summary of Model Analyses" Airborne Windshear Detection and Warning Systems, NASA CP-100006, 1988, pp. 29-66.

(List continued on next page.)

Primary Examiner—T. H. Tubbesing
Attorney, Agent, or Firm—W. G. Sutcliff

[57] ABSTRACT

The present invention is an airborne radar system which scans the flight path of an aircraft with two radar scans, an upper elevation pointing above local level and a lower elevation scan pointing below the glide slope. The radar returns from the upper elevation scan are used to detect the core of the microburst. The core and a model of the windshear which uses the core are used to select angles and range cell candidates, in a lower elevation scan, for hazard detection processing. The candidates in the lower scan, which is pointing at the ground, are used to create a hazard map tested against a predetermined hazard threshold. A threshold violation results in a pilot alert. The hazard map includes a vertical factor determined through model coefficients in the radial outflow as a function of altitude. The invention applies the model to determine the total hazard factor along the glideslope using the vertical hazard of the model and altitude scaling of the horizontal hazard from the lower bar elevation to the glideslope of the aircraft. The present invention also includes a radar scan with two pulse repetition frequencies which allows the elimination of non-correlated returns. The system also includes post detection integration with a sliding azimuth window to enhance the signal to noise ratio. The system also combines velocities within a single range gate to produce a velocity representing the windspeed at that range.

18 Claims, 63 Drawing Sheets

OTHER PUBLICATIONS

Advisory Circular (AC) 25-12, "Airworthiness Criteria for the Approval of Airborne Windshear Warning Systems in Transport Category Airplanes", Nov. 2, 1987.

Bowles, R. L. "Windshear Detection and Avoidance Airborne Systems Survey", Twenty-nineth IEEE Conference on Decision and Control, Honolulu, Hawaii, Dec. 5-7, 1990.

Lucchi, G. A. (RCA), "Commercial Airborne Weather Radar Technology", IEEE International Radar Conference, 1980, pp. 123-130.

Richard O. Duda, Peter E. Hart, Pattern Classification and Scene Analysis, Wiley Interscience, New York, 1974.

A. Papoulis, Probability, Random Variables and Stochastic Processes, McGraw-Hill, New York 1984.

Dan D. Vicroy, A Simple, Analytical, Axisymmetric Microburst Model for Downdraft Estimation. NASA Report TM 104053, Feb. 91.

Rosa Am Oseguera and Roland L. Bowles, A Simple, Analytic 3-Dimensional Downburst Model Based on Boundary Stagnation Flow, NASA TM-100632, Jul. 1988.

Fred H. Proctor, "Numerical Simulations on an Isolated Microburst. Part II: Sensitivity Experiments" J. Atmospheric Sciences, vol. 46, No. 14, 15 Jul. 1989, pp. 2143-2165.

Fred H. Proctor, "Numerical Simulations of an Isolated Microburst, Part I: Dynamics and Structure", J. Atmospheric Sciences, vol. 45, No. 21, Nov. 1988, pp. 3137-3160.

Terry Zweifel, "Temperature Lapse Rate as an Adjunct to Windsheer Detection", Airborne Wind Shear Detection and Warning Systems, Third Combined Manufacturer's and Technologist's Conference, Hampton, Va. Oct. 16-18, 1990, pp. 480-506.

Merrill I. Skolnik, Introduction to Radar Systems, Second Edition pp. 498-507.

WINDSHEAR RADAR SYSTEM WITH UPPER AND LOWER ELEVATION RADAR SCANS

CROSS REFERENCE TO RELATED APPLICATIONS

This application is related to U.S. application entitled Modular Solid State Radar Transmitter by John Clarke, Joseph A. Faulkner, Gregory K. Sinon and Brian J. Misek and having Ser. No. 07/713,259 and U.S. application entitled Low Vibration Sensitivity Crystal Resonator Arrangement by Michael M. Driscoll and Norman George Mathews and having Ser. No. 07/713,260, filed concurrently herewith and incorporated by reference herein.

BACKGROUND OF THE INVENTION

1. Field of the Invention

The present invention is directed to a radar system which uses two radar scans to characterize a microburst generating a windshear and, more particularly, to a system in which oriented, ordered constant false alarm rate processing reduces ground and vehicular clutter from a downward looking radar scan which is processed for a windshear hazard alert based on an upper elevation scan which determines candidate regions for windshear hazard detection processing during both landing and take off.

2. Description of the Related Art

A microburst is a meteorological phenomena of atmospheric instability which causes a windshear phenomena which is hazardous to aircraft. The instability is created by warm air at lower altitudes supporting cooler, dense air at higher altitudes. When the cooler air mass exceeds a variable threshold, warm air can no longer support the cold air and the cold air begins to penetrate and descend, often accelerating further due to evaporative cooling. A microburst derives its name from the shaft of cold air which descends and splatters or spreads out in all directions upon ground impact. This splattering is governed by fluid dynamics and the laws of conservation of mass. Behaving almost as an incompressible fluid, the downdraft to the ground is transformed into radial outflow along the ground, producing a "sombrero" envelope in space for the downdraft, outflow and vortex of the flow. For aircraft at low altitudes during landing or takeoff these windshear outflows are hazardous because they amount to a region in space where the local wind changes from a headwind to a tailwind. Aerodynamically, this is a performance decreasing windshear and will cause the aircraft to lose altitude. The hazard is further increased by the downdraft and the initial impression of a performance enhancing headwind. The severity of the hazard is balanced by the aircraft's ability to initiate and sustain altitude performance, that is, its thrust to weight ratio. The magnitude of the hazard is measurable by the margin remaining within the aircraft's performance envelope when in a performance decreasing airstream.

The detection of hazardous weather has been performed using a double elevation or bar radar scan transmitted from the ground when a microburst is detected the pilot is alerted by the ground personnel monitoring the ground based radar. In this double bar scan relatively large vertical fan beams overlap and produce an upper beam Doppler spectrum and a lower beam Doppler spectrum which are subtracted allowing the velocity bounds of the difference Doppler spectrum to provide windspeed components at heights near the surface. However, this ground based approach is not particularly applicable to airborne systems with downlook scans because airborne radar typically employs higher frequencies, maximal directive gain and minimal antenna sidelobes. This type of double overlapping beam scan is described in U.S. Pat. No. RE 33,152. Airborne turbulence mapping systems typically involve pulse pair processing approaches in which autocorrelation is used between the echoes as typified by U.S. Pat. No. 4,835,536. Another approach is to characterize the turbulence by a variance of velocities over a range, without respect to a performance decreasing structure as described in U.S. Pat. No. 4,223,309. Neither of these approaches is suitable for a downlook system for detecting windshear.

To effectively avoid windshear hazards, pilots need an airborne windshear hazard alert system which looks at the path to be taken by the airplane and alerts the pilot in sufficient time to abort a landing or takeoff or to allow the pilot to compensate for the magnitude of the performance decreasing changes caused by the microburst.

SUMMARY OF THE INVENTION

It is an object of the present invention to access a windshear hazard by directly measuring the horizontal windshear.

It is another object of the present invention to measure the hazard in a cost effective system that will fit on a commercial aircraft.

It is an object of the present invention to accumulate returns in azimuth slices to enhance the return with a range cell.

It is a further object of the present invention to measure the hazard when faced with extensive ground clutter encountered by a downward looking radar beam.

It is also an object of the present invention to remove clutter in both the doppler and range domain in the downward look.

It is another object of the invention to reject second time around returns outside the range of target interest.

It is a further object of the present invention to alert the pilot in sufficient time to allow the pilot to avoid the hazard.

It is still another object of the present invention to reduce false alerts, especially from ground moving target sources.

It is an object of the present invention to accurately estimate the total hazard factor along the glideslope of an approach.

The above objects can be attained by a system which scans prospective directions of flight of an aircraft with two radar scans, an upper elevation scan scanning at a fixed uplook angle and a lower elevation scan scanning near the glide path. The radar returns from the upper elevation scan are used to detect the core of the microburst. The size of the core and an assumed model of the windshear produced by the core size are used to select radar return candidates in the lower elevation scan for hazard detection processing. The candidates in the lower scan, which is pointing at the ground, are used to create a hazard map which is examined to determine whether a windshear hazard above a predetermined hazard threshold exists. If the threshold is violated, the pilot is alerted. The hazard map can be displayed to the pilot if desired allowing the pilot to select an abort direction based on the area of the highest hazard shown in the display. To enhance the detection of the windshear hazard the present invention includes radar scans with multiple pulse repetition frequencies that allow the elimination of second time around return errors. The invention also includes post detection integration with a sliding azimuth window to enhance the signal to noise ratio. The invention also combines velocities within a single range gate to produce a velocity representing the windspeed at that range. To further enhance the determination of the windburst hazard an ordered, constant false alarm rate process is performed to remove ground clutter discretes from the lower scan using a bow tie shaped window oriented along with windshear ridges.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
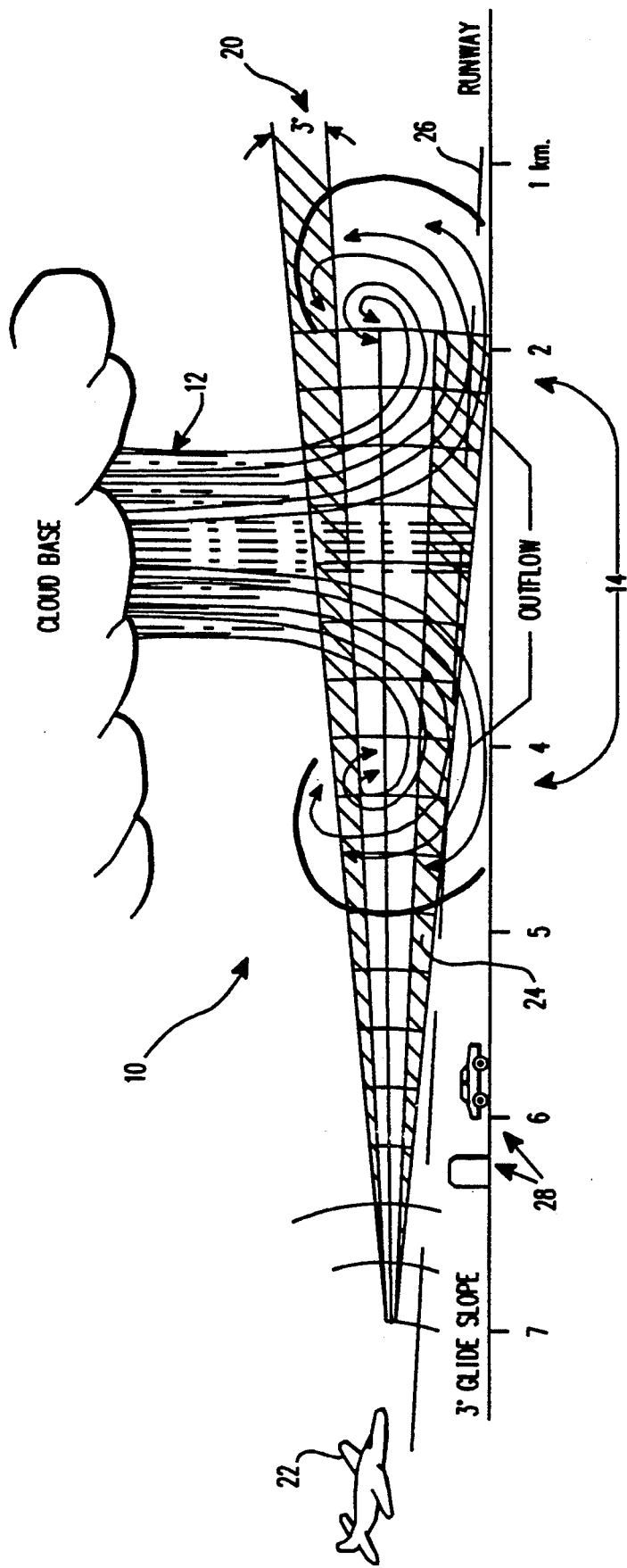
FIG. 1 depicts a microburst and the two elevation or bar scan of the present invention.

A microburst 10 such as depicted in FIG. 1, can be characterized by several features: the size of the downdraft core 12, the downflow within the core, the radius of the peak radial velocity, the magnitude and direction of the peak outflow at various spatial locations and the height of th vortex ring. The reflectivity of the falling rain is used to detect the core 12 while the outflow is detected from the Doppler effect caused by the radial motion of the rain in the outflow. From the core diameter, the depth of the outflow (the point at which outflow begins) can be obtained from which height and outflow velocity of the peak radial velocity can be obtained. The present invention uses an upper elevation scan 20 by the radar from an airplane 22 to determine the diameter of the core and thus the depth of the outflow. From the depth of the outflow the height and radius of the peak radial velocity is determined to profile the microburst. The area covered by the peak radial velocity centered on the core 10 is used to select velocity candidates in a lower elevation scan 24 for hazard detection processing. The upper elevation scan 20 essentially provides a spatial filter which selects radar returns from range cells in the lower scan 24 which are likely to present a windshear hazard. The present invention examines the candidate range cells to detect a pattern of changing wind velocities characteristic of a windshear which precludes areas otherwise having only false alert potential. When such a pattern is detected, the hazard to the aircraft 22 caused by the windshear is determined and compared to a threshold. If the threshold is exceeded, the system alerts the pilot in sufficient time to maneuver and avoid the windshear.

As illustrated in FIG. 1 the lower elevation scan 24 preferably points near the 3° glideslope 26 and, as a result, the sidelobes of the radar beam will encounter ground clutter 28, such as buildings and automobiles. The present invention uses an oriented, ordered constant false alarm rate processing method to remove such ground clutter from the returns. The return with the maximum reflectivity and longest Doppler motion is the range cell in the lower scan 24 at 2 km in FIG. 1. The present invention preferably scans the upper scan 20 at a fixed angle above local level when the airplane is at a height of 2500 feet at the initial activation in a three mile final approach, so that the core of the downdraft can be detected. The uplook angle is at a reference angle insuring only far antenna sidelobe (minimal) illumination of ground clutter and traffic and an absence of main beam clutter. The main criteria is to point the upward bar so as to avoid ground clutter to detect the non-moving microburst core which requires a constant uplook angle of at least 5° above local level for conventional antenna apertures, to thereby position the first null of the antenna on the horizon. As the airplane 22 approaches the ground from the initial height of activity where the windshear radar system is preferably activated, the lower elevation scan 24 lifts or rotates up, to avoid excessively large ground clutter, such that the lower elevation scan maintains a point $-15$ to $-20$ dB down on the mainbeam skirt ($\approx 2°-3°$ off center) in contact with the ground at a range of 5 km. This criteria essentially ensures the magnitude of clutter is dominated by second time around, i.e. non-saturating levels, at those ranges of time to go criticality. The upper scan stays fixed in angle with respect to local level as the plane descends. The beam is a circular beam of 3° and the range cells are 300 meters in depth and, of course, 3° high and wide. A lower depth of, for example, 150 meters would increase resolution but require faster processing hardware, making the system more expensive and less sensitive. The first range cell processed is preferably located at 1000 meters in front of the aircraft. The last range cell processed is at 10 km.

Figure 2:
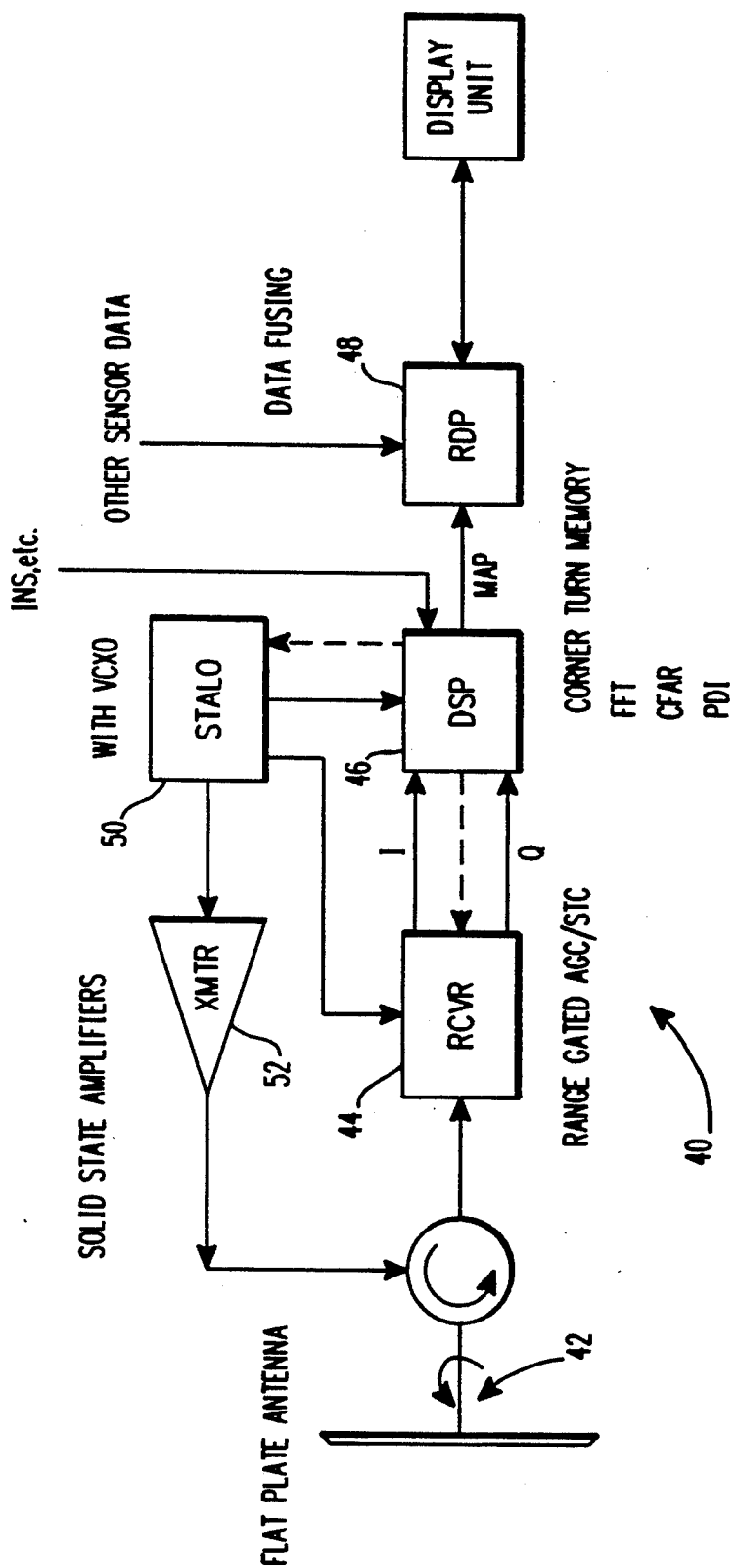
FIG. 2 illustrates the hardware of the present invention.

The present invention preferably is incorporated into a radar system 40 as illustrated in FIG. 2. This radar system includes a conventional gimbaled band, low sidelobe, slotted phased array flat plate antenna 42 commonly found in commercial airplanes and satisfying the requirements of ARINC 708. It is preferred that the antenna 42 have low sidelobes to reduce returns from off beam ground clutter. The antenna 42 is scanned in a rectangular pattern as will be discussed in more detail later. The antenna 42 is followed by a superheterodyne receiver 44 including an A/D converter followed by a digital signal processor 46 and radar data processor 48. The output by the processor 48 can be to a signal light, an audio annunciator or a CRT display as desired. The system also includes a stabilized local oscillator 50 and a transmitter 52. The receiver 44 preferably provides range gate switchable attenuation to prevent receiver saturation due to large rain reflections from the microburst core 12 and other reflective weather, large second time around error (STAE) discretes, or other sources. Range gated attenuation is preferred to an average clutter automatic gain control (CAGC) in order to preserve the sensitivity in range gates preceding or following the low calls of excessive return. The range gate automatic gain control profile is preferably updated in a conventional manner using the amplitude results of the latest coherent processing interval (CPI) and held constant over the subsequent CPI. The outflow and downdraft reflectivities are candidate features and the applied attenuation will be synthetically (post detection) adjusted. It is preferred, with the exception of the antenna and its immediate control/servo circuits, that the equipment of FIG. 1 be contained in a single chassis package and that the oscillator 50 provide long and short term stability channels for mutual interference rejection, minimal velocity detection and offset clutter positioning necessary to prevent clutter from spreading in velocity. The single package is necessary to fit the radar into the crowded space in the nose of a commercial airliner. The details of the single chassis package and the stabilized local oscillator can be obtained in the related applications previously mentioned in the Cross References to Related Applications.

A total hazard factor aviation (commercial air transport, general aviation, military transport) is obtained by the present invention with a lookdown, coherent pulse-Doppler radar. This allows the invention to function as an airborne windshear forward looking detection system, alerting the pilot to begin a recovery procedure immediately or to consider navigating away from the hazard, respectively. In the latter case, a display can be included to assist the pilot with identification of the hazardous area.

The invention operates with minimum operator intervention required by the cockpit workload during approach. The operator selects the windshear mode with a selector switch, but preferably the mode will also rely on inertial navigation system (INS) data and other discrete signals to determine that the aircraft 22 is essentially on a straight-in final approach flight segment at appropriate altitude of, for example 2500 ft., in anticipation of landing. The invention assumes accurate INS data is provided for ground speed, altitude, pitch, heading, local level, and crab angle.

Pulsed Doppler radar is used because of its ability to look down at the ground and detect moving targets. The radar preferably operates at X-Band to provide a narrow beam width and furnish unambiguous velocity and range information on wind driven rain returns lying at immediate ranges the aircraft is approaching. The pilot and crew are not particularly concerned with long warning times in a landing approach because of their work load. As discussed in the related application an X-Band radar can also be packaged to fit in a commercial airliner. Outflow radar reflections from microbursts provide good reflectivity and Doppler velocity only within a band of altitude roughly below 2000 ft. (600 m.) above ground level (AGL). The antenna 42 illuminates these windstreams with its mainbeam intensity and illuminates ground clutter at the same range with sidelobe intensities.

The preferred waveform described herein furnishes unambiguous velocity coverage for wind speeds up to about 60 knots (kts), which at X-Band means the pulse repetition frequency (PRF) should be at least 3.86 KHz. In the design of the radar subsystems, the dynamic range for the receiver 44 and oscillator 50 can be alleviated (at the expense of average power) by a lower PRF, effectively establishing the mainbeam clutter return from second time around error (STAE) as the return of pacing system amplitude. To provide minimum detectable velocity and resolution, a long coherent processing interval (CPI) is desired. Such a long coherent dwell, however, will pace the oscillator 50 low deviation frequency stability and mechanical isolation from the vibrational environment. The antenna scan rate and associated scan losses are conserved by a sliding window PDI. The present invention employs two alternating PRFs near 4 KHz. constructed of differing prime number multiples of the pulsewidth. In a 2 of 2 range correlation process, returns from STAE ranges will not correlate and are dismissed. The demands on time and hardware realities/constraints result in a preference for a 32 point Fast Fourier Transform (FFT).

The present invention assesses a windshear hazard by directly measuring the horizontal windshear (change in wind speed over distance) and measuring the vertical hazard factor of the downdraft. The horizontal windshear can be measured from the change in Doppler velocity of the wind driven rain over range using a lower bar scan looking just glide slope. The processing must first separate the wind from other returns, compute the wind within a range gate, and then calculate a finite difference approximation to the derivative. This approach can be augmented for both estimation and false alert rejection by peak outflow velocity and location extraction. Downdraft hazard estimation is less direct. The collocation of mainbeam clutter at slow Doppler speeds with downdraft returns impairs downdraft diameter and location information from a low level antenna beam. An upper bar which avoids mainbeam clutter with an up-look geometry furnishes downdraft location, extent, and a second data point for altitude profiling of the outflow, which when coupled with downdraft area extent, permits determination of the downdraft. Since the fluid flow is basically incompressible, if the outflow flux is known by the height of the outflow, the diameter of the outflow circumference, and its radial velocity, an average downdraft vertical velocity can be determined once the downdraft area (diameter) is determined.

For a landing approach mode, the antenna 42 is sweeping in azimuth ±21° about the nose of the airplane 22 at a constant rate. Two bars in elevation are interleaved, and together they form a complete frame. The lower bar is positioned in local level co-ordinates to illuminate the space near or just above the glideslope without depressing, so low as to saturate the receiver with mainbeam returns. As the aircraft lets down in altitude, the lower bar elevation angle will elevate, i.e. the antenna beam will lift up, to illuminate the altitudes of principal dry microburst observability and avoid illuminating ground clutter/vehicles at unambiguous range with the main beam edge by maintaining the lower bar pointing at a point at zero AGL 5 km ahead of the aircraft about 4° off the main beam center.

Figure 3:
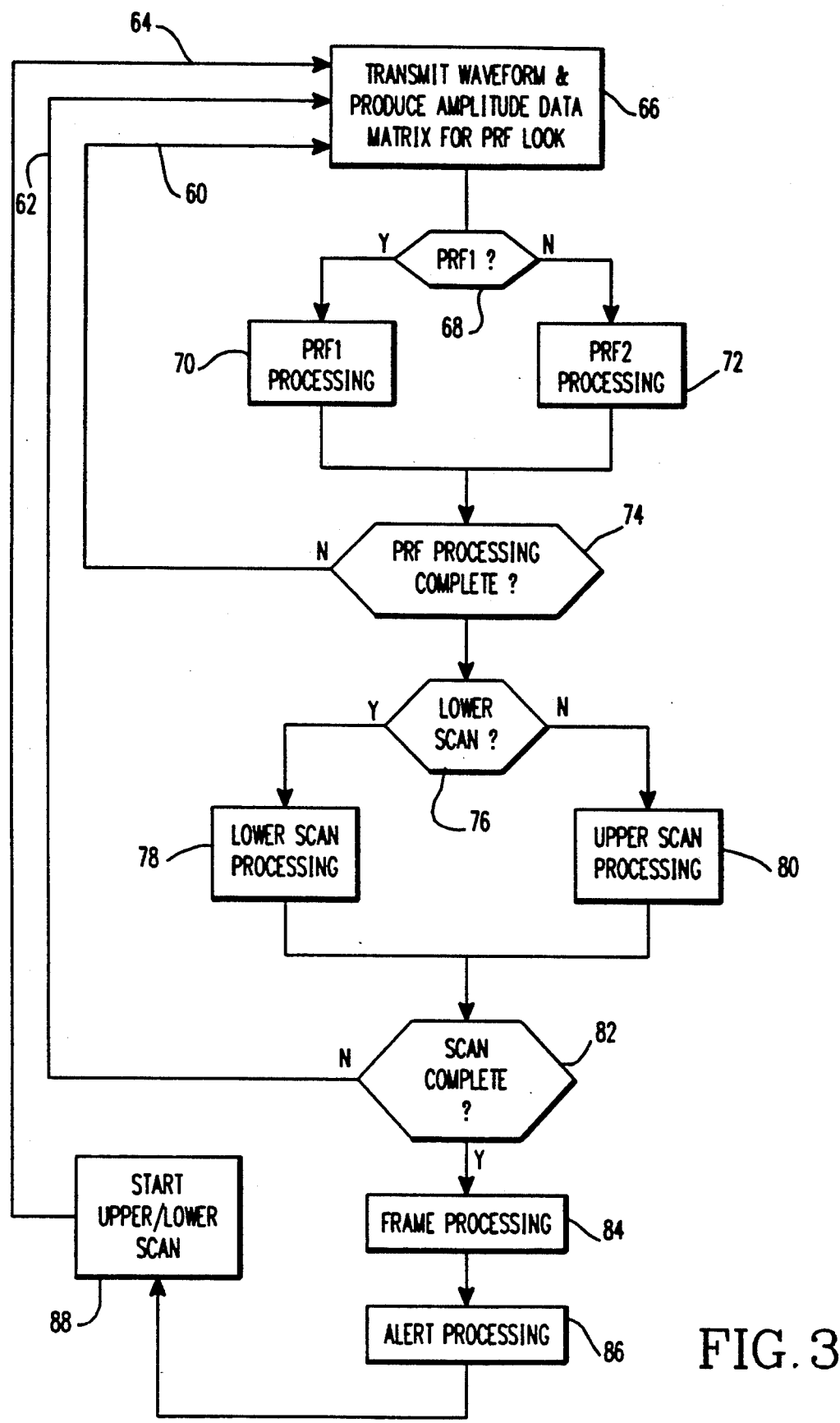
FIG. 3 is generalized block diagram of the operations performed by the present invention.

FIG. 3, in block diagram form, illustrates the general sequence of operations of the present invention. The present invention has several processing cycle times as illustrated by the several return loops 60-64 illustrated in FIG. 3. As previously mentioned, the present invention transmits a radar beam for illuminating the microburst at two different pulse repetition rrequencies. The inner loop 60 illustrates the PRF related processing operations. The first step in the PRF loop is to transmit the radar waveform 66 at the first PRF and capture the return signal in a conventional range gated fashion for the PRF look and store the returns in an amplitude data matrix. If the transmitted waveform is the first PRF waveform 68, PRF processing 70 for the first waveform is performed otherwise processing 72 for the second PRF waveform is performed. If PRF processing is not complete 74, the system loops back to transmit the waveform at the second PRF. Once the PRF processing is complete the scan return from the completed look is had from the lower elevation or bar scan 76, and lower scan processing 78 is performed otherwise upper scan processing 80 is performed. If the particular scan is not complete 82 the system returns for further dual PRF looks until the scan at the particular elevation is complete. Once a scan (either the lower or upper bar) is complete frame processing 84 can be performed where a frame includes an upper scan and a lower scan. Once the processing of a frame is complete alert processing 86 in which the frame is examined for hazards above the threshold is performed to alert the pilot. Once the alert processing is started the antenna is moved, during what is called a bar turn-around time, to the other scan to start 88 the other sweep (in the rectangle scan pattern). The details of the overall operation illustrated in FIG. 3 will be discussed in more detail. The PRF processing steps 70 and 72 are identical except for the PRF used in the processing and, as a result, the PRF processing will be described once with the system toggling between PRFs.

A complete frame consists of both elevation bars of radar data. A frame of data consists of a pair of data sets for two successive elevation bar scans, one bar at the lower elevation for the windshear hazard and outflow features and one bar at the upper elevation for downdraft core and outflow features. Independent frame outputs are available every other bar, but the frame output can be updated with the latest bar. The antenna will take approximately 1 second to scan a single bar (45°/sec), and collection of the data in an independent frame will take 2 seconds. Frame update rate processing occurs at 1 second (i.e. bar rate) intervals by using the latest complete bar of data to update the latest available frame data. Independent frame rate processing occurs at a 0.5 Hz. rate. Frame rate processing includes: i) taking the most recent estimates of elevation bar features (both outflow and downdraft) to estimate the downdraft core location, size, and speed, and this establishes the essence of a vertical hazard map; ii) combining an altitude scaled (horizontal) windshear hazard map and the downdraft (vertical) hazard map to form a total hazard map along the glideslope; and iii) assessing the total hazard map by average hazard factor area extent (sliding window average) and thresholding. If the hazard threshold is exceeded, a hazard annunciation signal is enabled. An estimate of the time to hazard encounter and/or the encounter of physical evidence of the hazard (i.e. performance enhancing windshear) may also be output.

An elevation bar of data consists of information derived from a complete scan over ±21° of azimuth angle at a constant elevation angle. A bar is either an upper bar concerned with estimating the downdraft location, size, and vertical velocity or a lower bar concerned with horizontal windshear and outflow estimates. The upper bar angle is selected to ensure that there is no (minimal) mainbeam ground clutter return and corresponds to an uplook geometry with potential for detectable Doppler on the rain and it is preferred that the uplook scan through an angle of 5° above local level. The lower elevation bar is used to estimate the hazard due to windshear along the expected glidepath by measuring the wind speeds near the glideslope. Upper bar rate processing determines downdraft core estimates and occurs at a 5 Hz rate (every 2 sec.). In general, the amount of processing for the upper bar is much less than the lower bar because the finite differencing of the wind map for a horizontal windshear hazard map is computed. The principal operations are the selection of features for characterizing the candidate microburst from a list of azimuth slice candidate features. Lower bar rate processing determines the horizontal windshear hazard map and outflow features and also occurs at 0.5 Hz. rate.

In general, the computation of either the wind map or the horizontal windshear hazard map can proceed without the entire elevation bar of data. An azimuth slice of data is the range×Doppler velocity×amplitude data for two successive coherent processing intervals (CPI) or looks. Since successive looks are at alternating PRFs, the slice of data refers to FFT data which has been velocity scaled and integrated using post detection integration (PDI). Slice rate processing is processing which is performed for each available slice of data. Independent slice processing occurs at approximately [(36/3937)+(36/3597)=0.0192 sec.] 52.2 Hz. rates. However, an updated latest slice of data is output every look, and operations on slices of data proceed at look rates. An azimuth window of data refers to the latest slices of data corresponding to correlated lines of sight (LOS) for microburst returns. In other words, the time spent in collecting FFT data and slice data is small compared to the time it takes for the antenna to sweep over a direction in azimuth. A few successive slices of data form an azimuth window with correlated target returns. The slices of a window are post detection integrated (PDI) to improve the azimuth beamwidth by elevation beamwidth by range gate by Doppler filter resolution cell rain to noise ratio. The PDI gain of the azimuth window will depend upon the number of independent slices in each cell and three slices per window are preferred as a match to the dB beamwidth. In general, azimuth window rate processing occurs at the look rate because a new slice is available each look. It is preferable to output azimuth window results each 0.1 of a beamwidth (150 Hz. for 45°/sec. ant. scan rate), which can only be approached by look rate processing (approx 100 Hz.) of windowed azimuth slices. Azimuth windowed processing occurs at the rate of new slices, i.e.

the look rate of approximately 109.4 Hz., and includes non-wind return editing, and STAE rejection.

For lower bar data, an azimuth by range wind map is made by thresholded, power weighted, average velocity extraction per range gate and an azimuth by range horizontal wind shear hazard map is computed on an azimuth window rate basis. For upper bar data, computations include reflective core diameter estimation and velocity map feature extraction.

A look of data corresponds to a coherent processing interval (CPI) or PRF dwell of the radar. During a look, the data is written into a corner turn memory in the processor 46. For a pipeline process, the FFT of those range gates must be completed before the latest corner turn memory of arriving data is collected. Because there are 2 PRFs with the same number of FFT points (32), the CPI "breathes" somewhat. In general, look rate processing is completed in 9.1 msec. or at 109.36 Hz. for the highest of the two PRFs. An interpulse period (IPP) is the time between successive transmit pulses and breathes somewhat from PRF to PRF, e.g. at the high PRF of 3937 Hz., IPP=254 $\mu$sec. In general, there are conventional sub-look processes which occur within a CPI and these include the range gated AGC, VCXO offset, and other receiver/oscillator transmitter tests, controls, and responsive command updates in anticipation of the subsequent look.

As shown in FIG. 2 the present invention prefers inertial navigation system (INS) data for ground velocity, crab angle, orientation and motion direction quantities. If the particular aircraft 22 in which the present invention is installed does not have such data software modules which can provide such data from the radar returns can be added to the present invention.

Figure 4A:
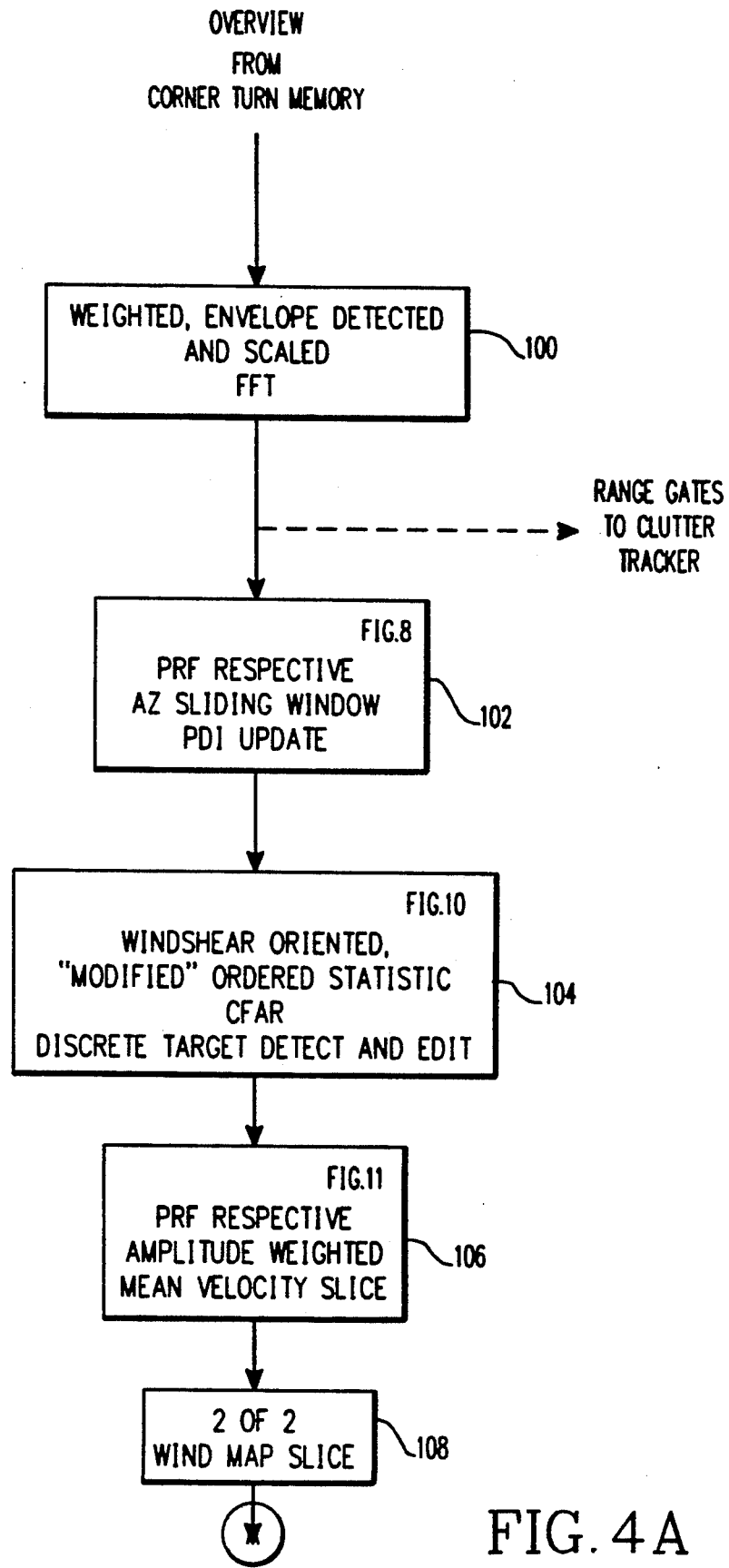
FIGS. 4A and 4B illustrate a portion of FIG. 3 in greater detail.
Figure 4B:
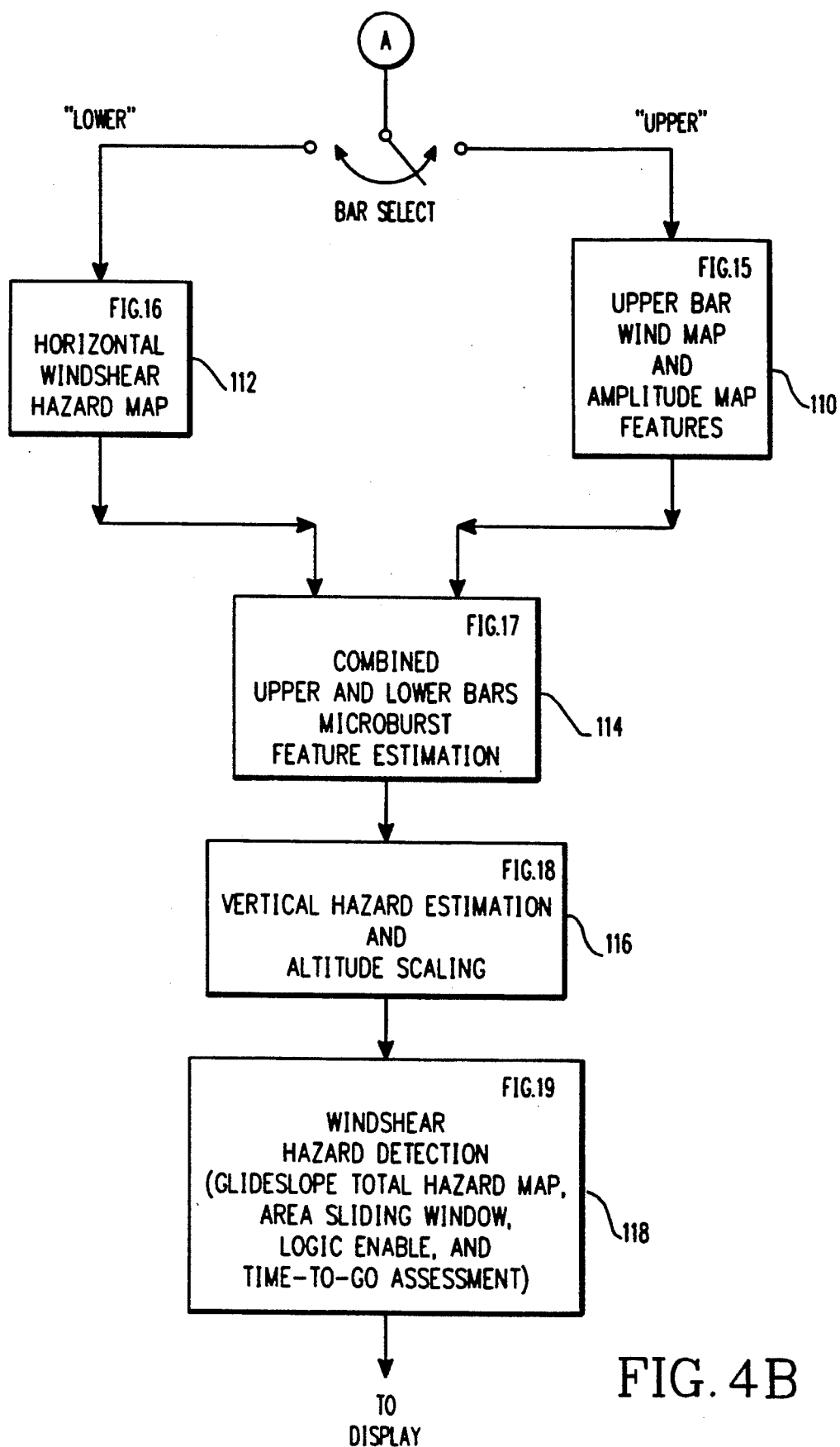

As shown in FIG. 4A and 4B, which depicts steps 70-86 in more detail, the complete microburst windshear process in accordance with the present invention is partitioned into several levels. The process of the present invention, which is preferably implemented in assembly language although implementation in a language such as "C" is of course acceptable, begins by the processor 48 performing 100 a conventional weighted, envelope detected and scaled FFT. The weighted FFT is conventionally performed on I and Q channel time sampled data in the corner turn memory. The FFT is weighted for low sidelobes to minimize visibility of mainbeam clutter. The envelope [SQRT(x)] output is scaled to place noise at 1.4 q. Although a 32 point FFT is preferred, the FFT size can be treated as programmable if changes need to be made to take into consideration azimuth window line rate over-sampling and low frequency stability under vibration on the one hand and maximizing coherent integration and minimizing minimum detectable Doppler-velocity (MDV) on the other. The invention is designed to not only be installed in new aircraft but also as a retrofit to a radar as specified by the ARINC 708 standard having a constant 45°/sec. scan rate. In the retrofit situation, the 32 point FFT provides adequate compromise between azimuth output rate and MDV. However, installations which furnish adjustable (slower) scan rates may equivalently oversample in azimuth (that is output a result in azimuth at a rate greater than the time taken to scan the 3 dB. beamwidth) at a larger FFT point size at the stressing of the oscillator 50 vibrational stability limits on MDV. A 100 Hz. break point on the paired echo sideband spec. under vibration means allow a longer CPI of about 20 msec. (64 pt. FFT) and its attendant marginally lower MDV. As a result, the FFT size can be programmable and dependent upon the (controllability of the scan rate of the antenna) installation. The corner turn memory stores time samples in 300 m. range bins over a swath from the minimum range of the receiver out to 15 km. This range swath provides the opportunity to detect a hazardous area 9.25 km. (5 nautical miles) in advance with outflows extending over 5 km. This requires a corner turn memory of 32 complex time samples $\times$ 50 range bins. The data rates into the corner turn memory will vary depending upon the two PRFs: a) the high PRF has 127 range gates at a frequency of 3937.0079 Hz; and b) the low PRF has 139 range gates at a frequency of 3597.1223 Hz. These PRFs furnish an unambiguous Doppler velocity coverage of $\pm$28.8 m/sec. ($\pm$56 knots or 64.4 mph.) After weighting, the filter spacing at 1.8 m/sec. furnishes about a 3.0 m/sec. (3 dB.) resolution and furnishes a minimum detectable velocity of less than 5 m/sec. The weighing on the FFT is selected to place the visibility at a Doppler filter away from 0.0 m/sec. of the largest input signal level (e.g. mainbeam STAE urban clutter, microburst reflective core after range gated attenuation) well below noise. Combined PDI and coherent integration furnishes signals at receiver saturation input levels about 77 dB. above noise. However, the mean level of this should preferably be held at about 65 dB. max by the range gated AGC. The output of the process 100 is the amplitude (voltage) envelope obtained by linear detection [SQRT(I*I+Q*Q)], as conventionally approximated, which is scaled to place noise at 1.4 quanta. The scaling is only a function of the weighing function for the FFT and the number of points, i.e. a multiplicative constant.

Once the FFT processing 100 is completed the system performs 102 an azimuth sliding window non coherent, post detection integration (PDI) update with respect to the particular PRF over several looks. A sliding window of three degrees in azimuth width (6 looks) is used to integrate (sum) the respective PRF returns from the beam to improve the signal to noise ratio noncoherently. This technique has been used in military aircraft for ground mapping. This process as applied to microburst detection will be described in more detail with respect to FIGS. 8A-8C.

Figure 9:
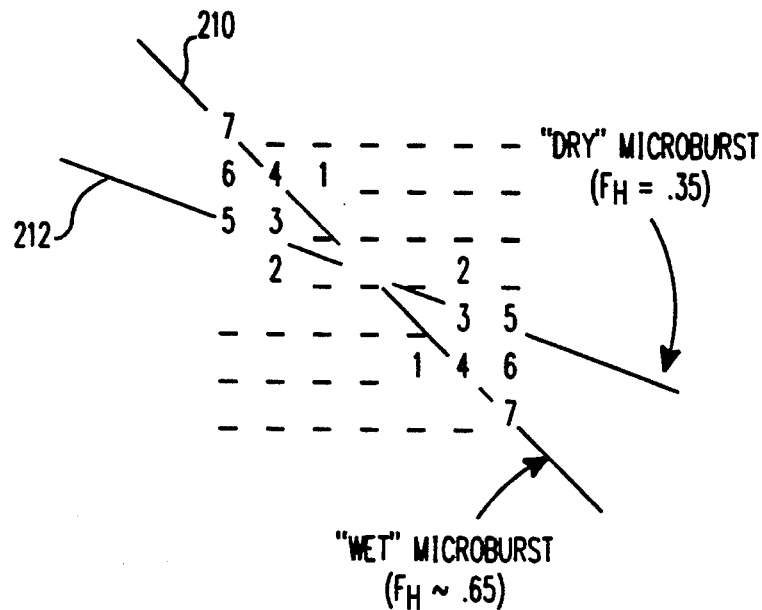
FIG. 9 depicts the oriented and bow tie shaped constant false alarm rate processing window.
Figure 10:
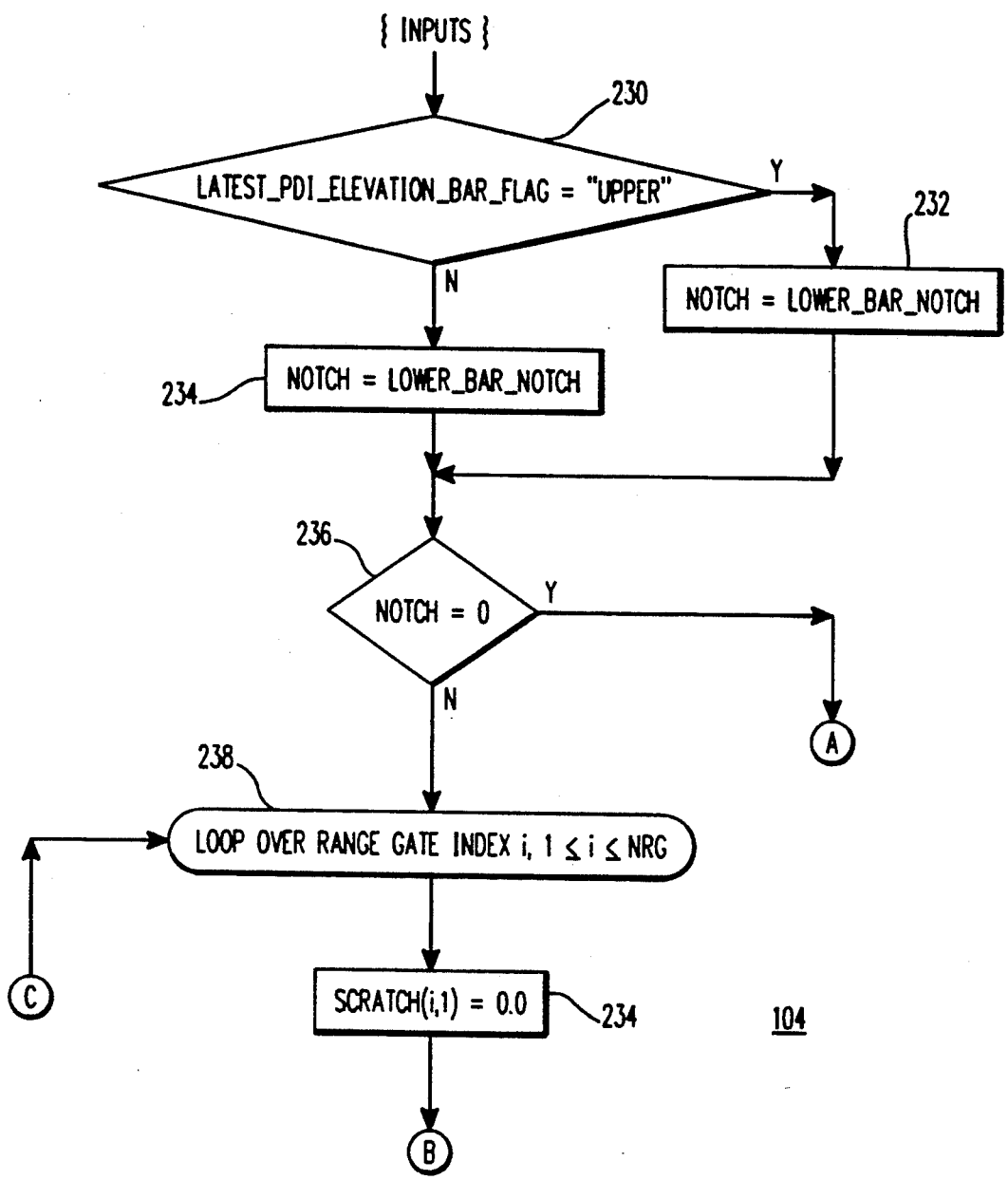
FIGS. 10A-10F illustrate the oriented modified ordered constant false alarm rate processing 104.
Figure 10B:
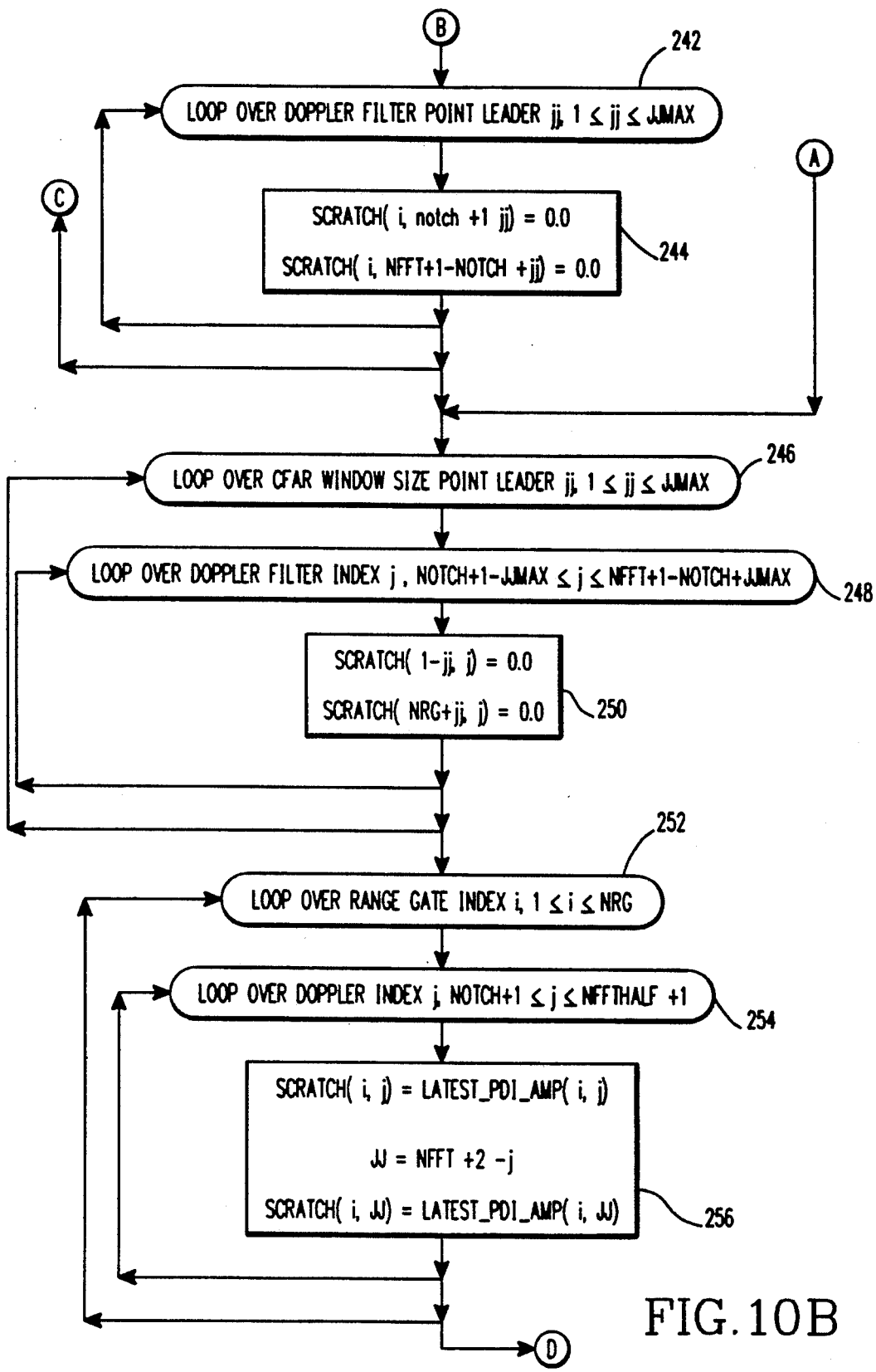
Figure 10C:
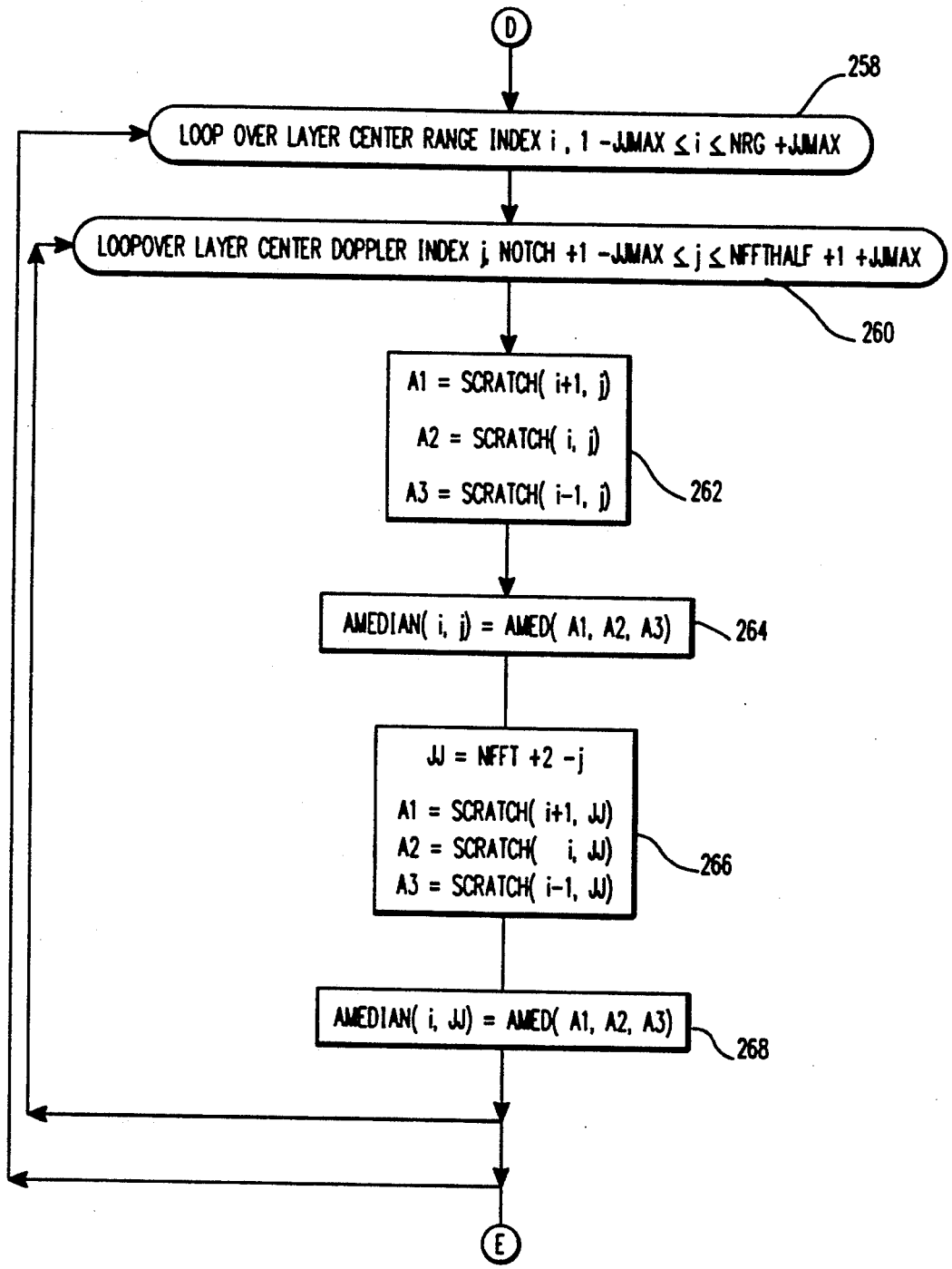
Figure 10D:
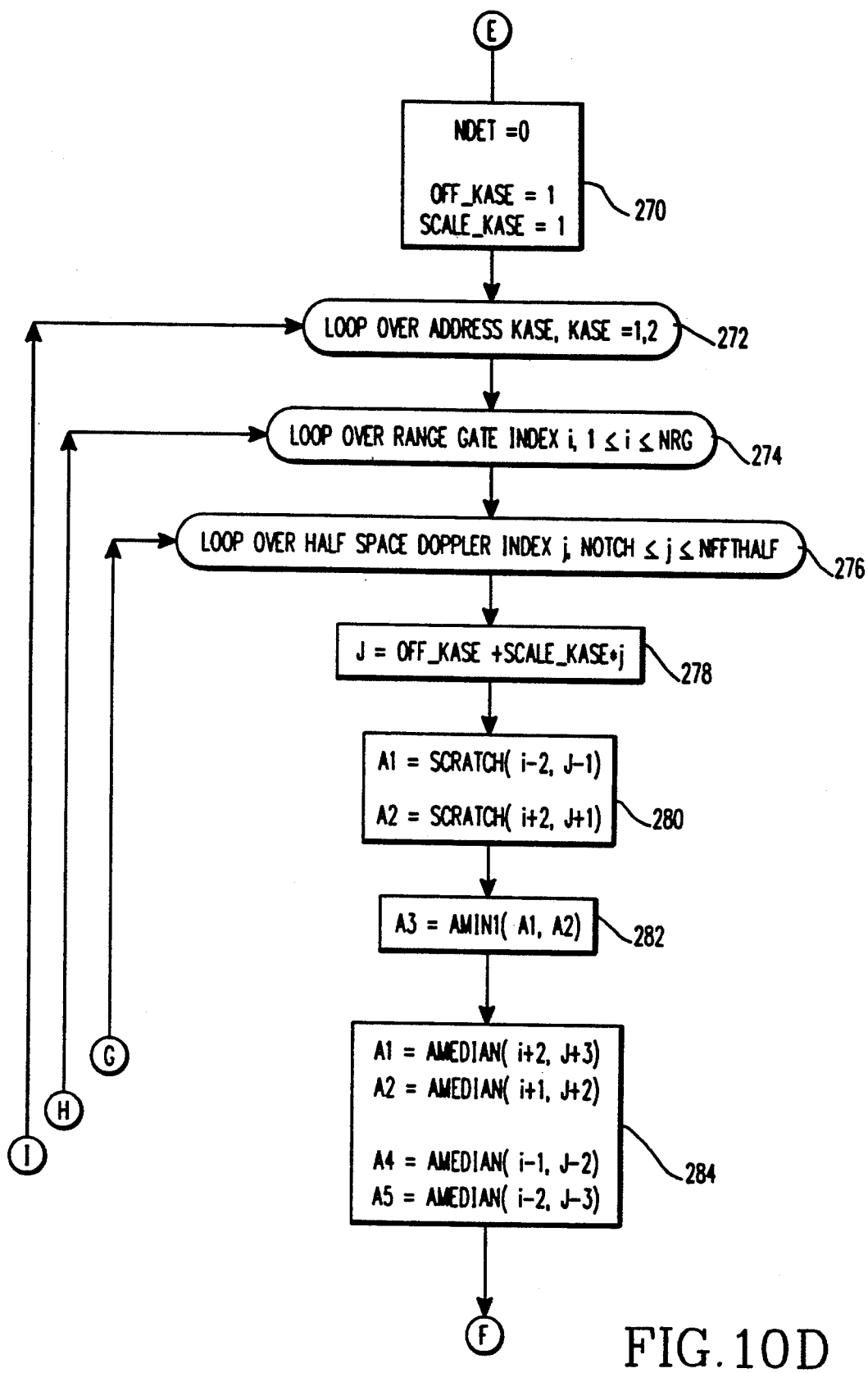
Figure 10E:
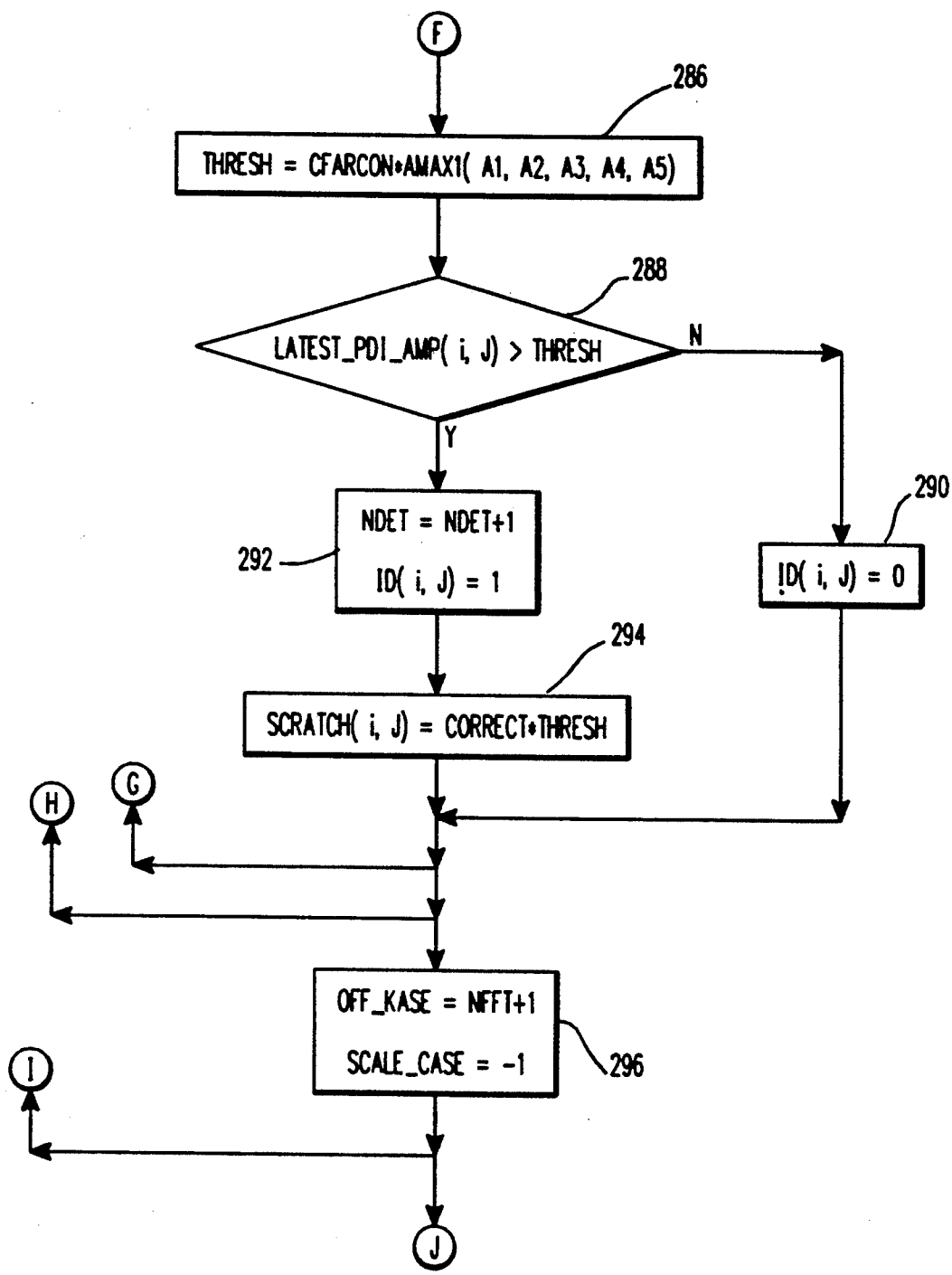
Figure 10F:
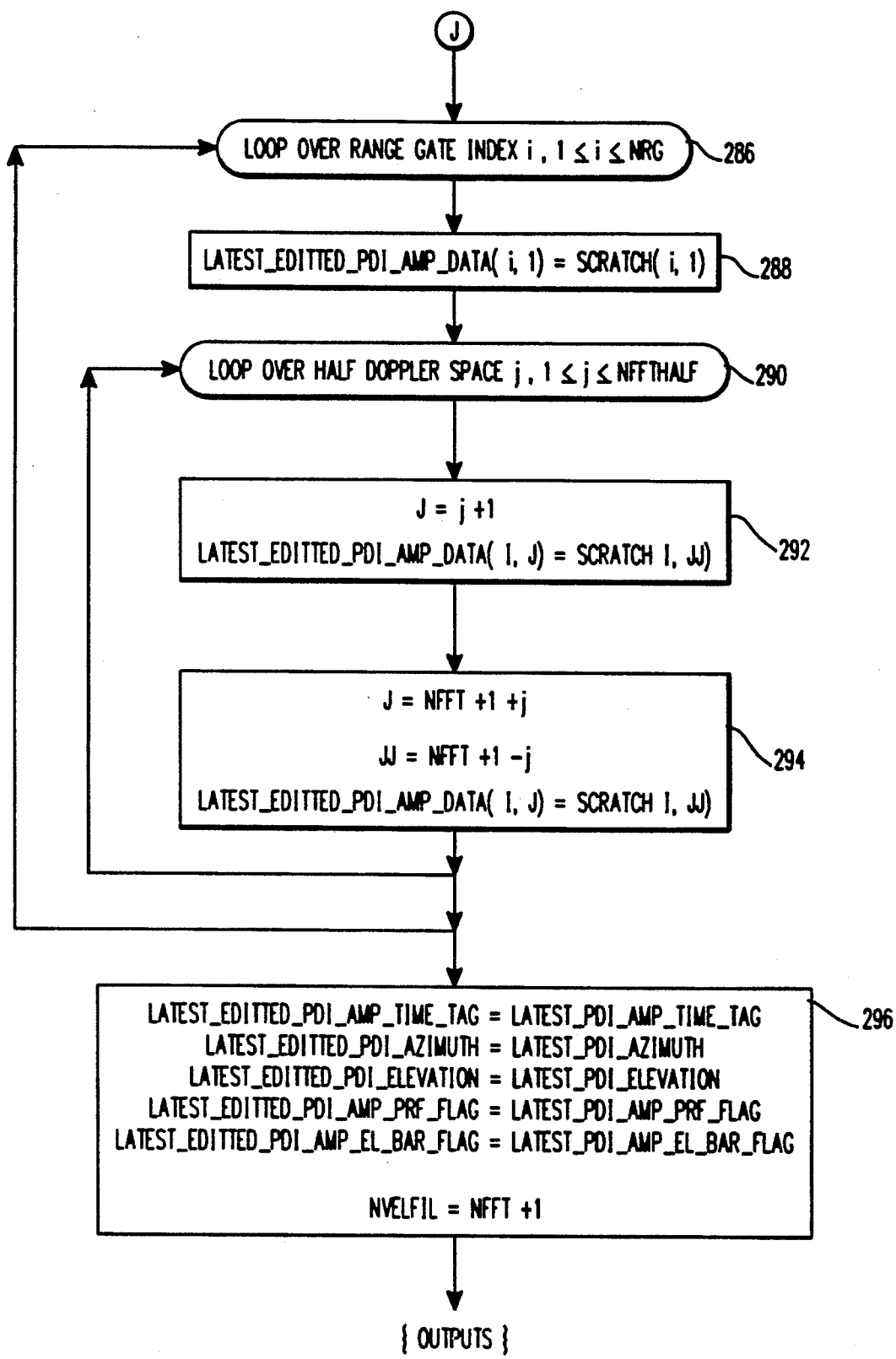
Figure 11A:
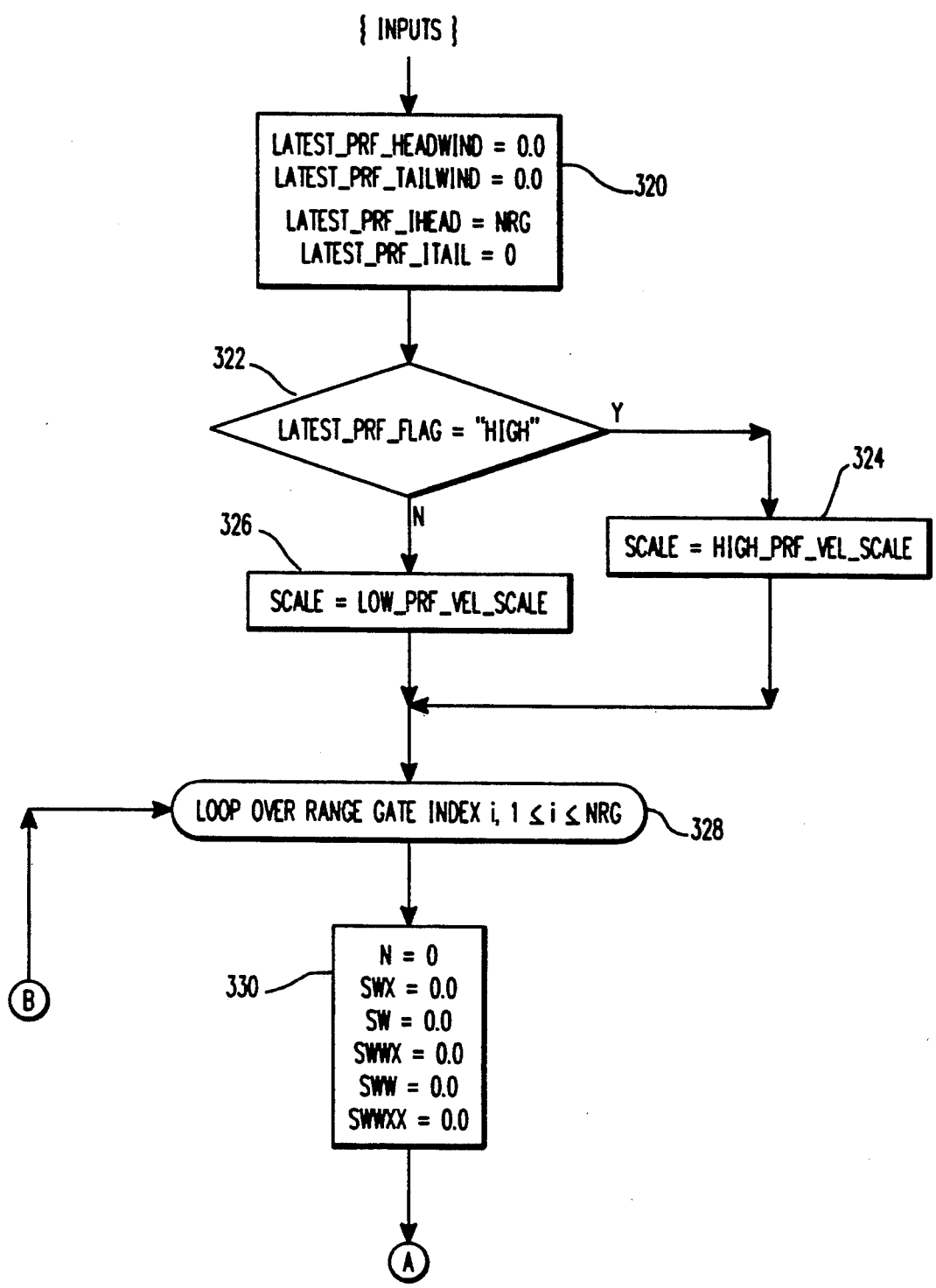
FIGS. 11A-11E is a flowchart of the velocity weighting process 106.
Figure 11B:
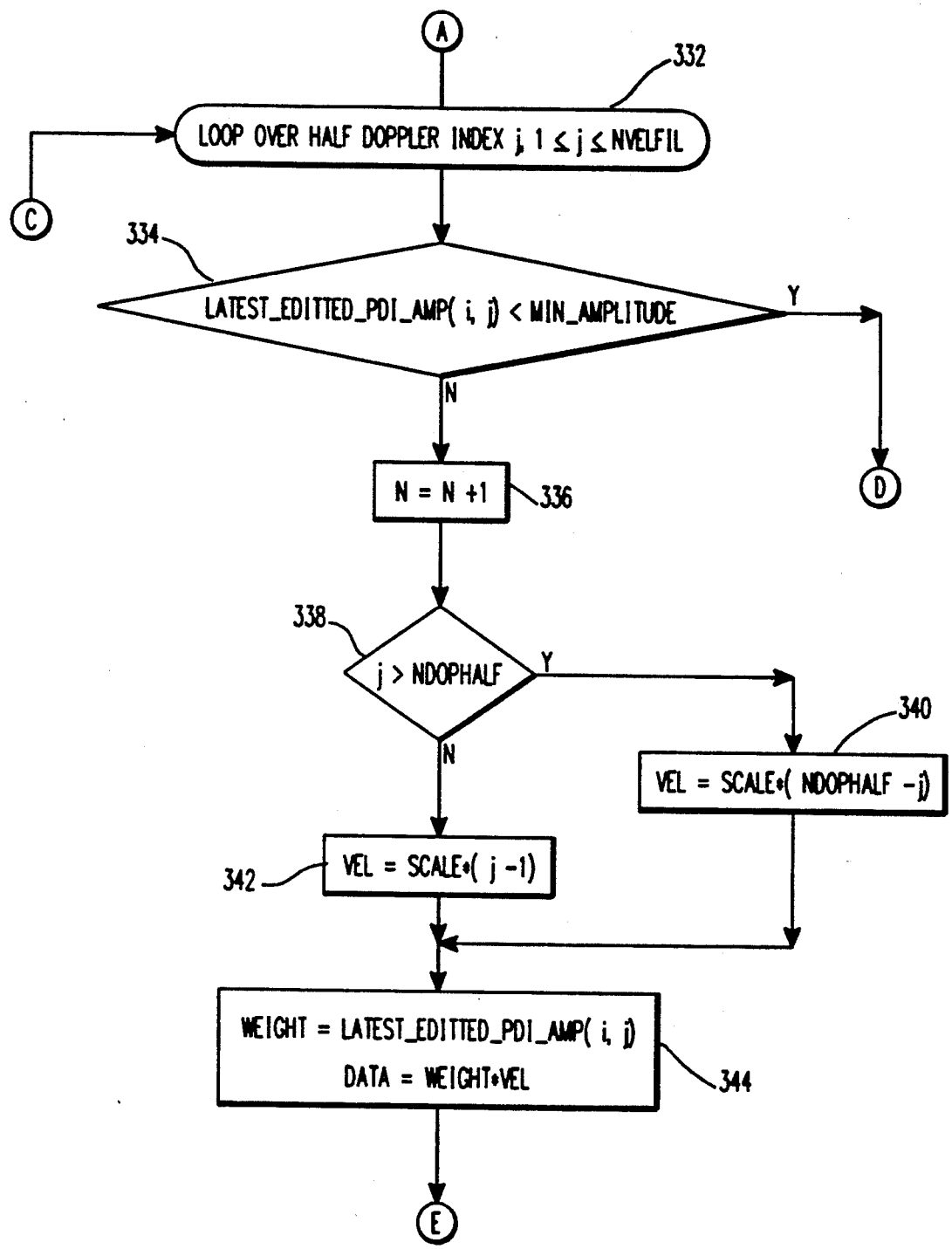
Figure 11C:
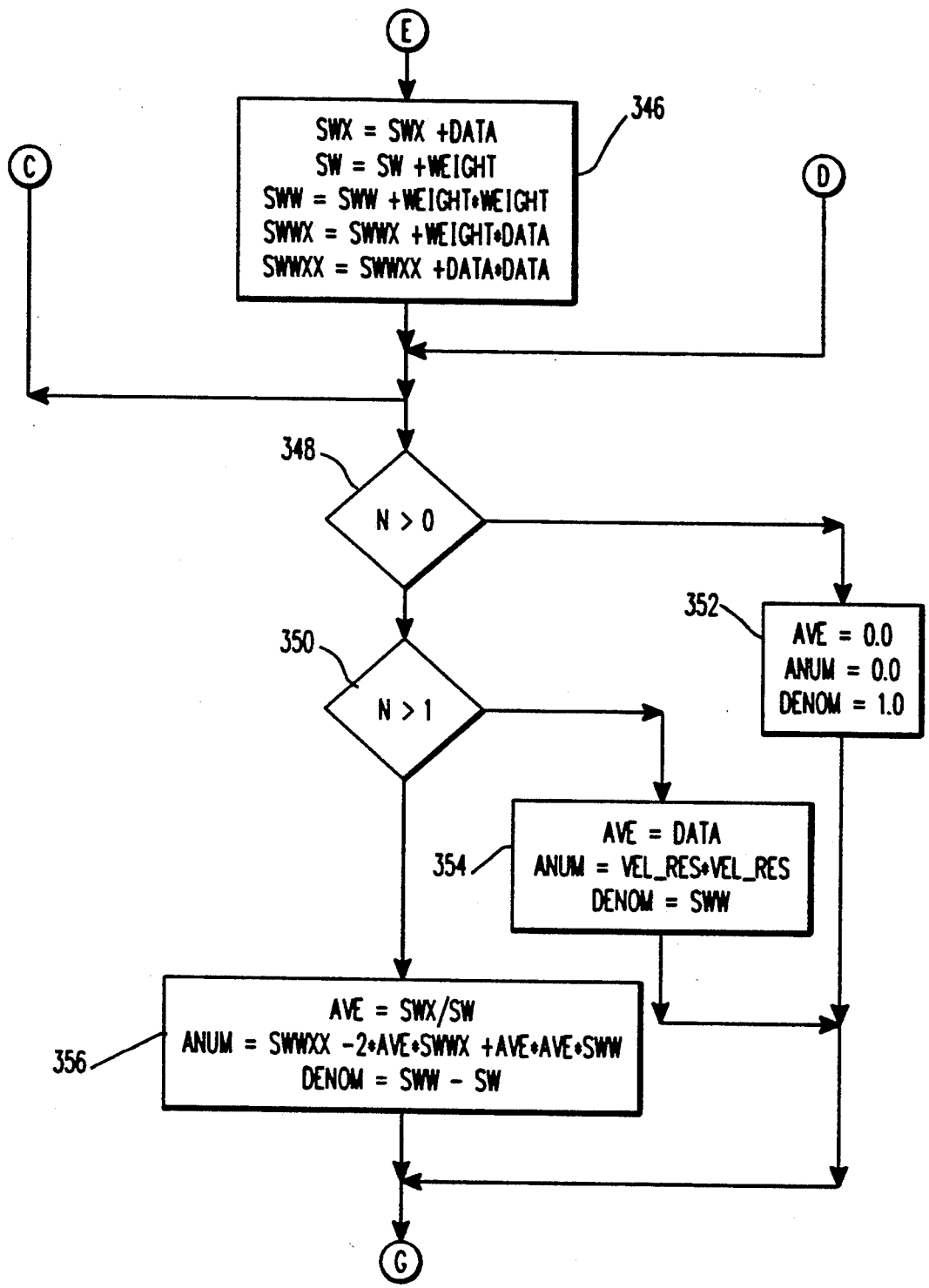
Figure 11D:
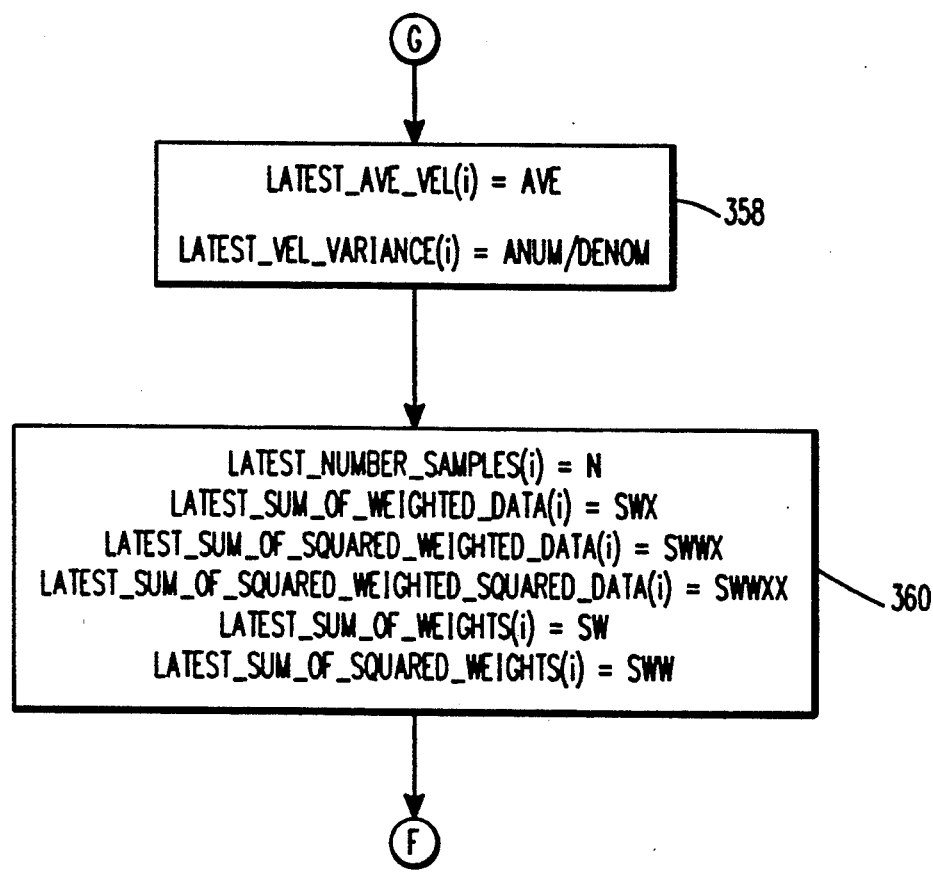
Figure 11E:
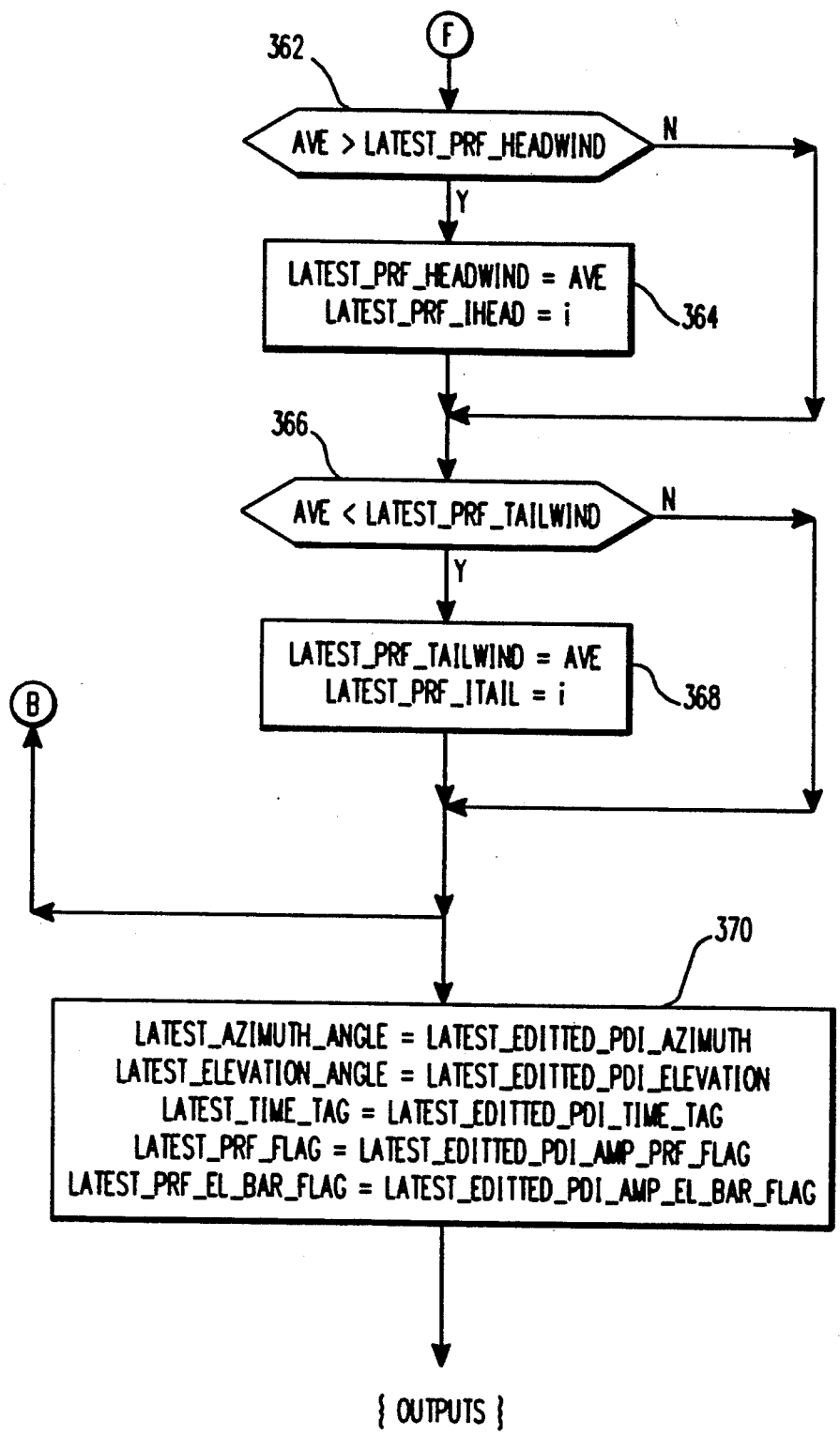

To reduce the interference in the return signal due to clutter the present invention performs 104 a windshear oriented, modified, ordered statistic, constant false alarm process which includes discreet target detection and editing. The detection/enunciation of the microburst windshear hazard is based on features of the radar return from a microburst. Confidence in the accuracy of those features is accrued from signal to noise only indirectly. This process 104, which will be described in more detail with respect to FIG. 10A-10F, eliminates or reduces the false alarm and/or velocity bias effects of discrete moving targets on the power weighted velocity and subsequent areal features of the microburst. The idea is that discrete targets, sidelobe or vehicular, will appear as thumbtack responses and will be detectable with constant false alarm rate (CFAR) local neighborhood window processes. The definition of the CFAR neighborhood desensitizes the detection list from accepting hazardous wind return, which should be relatively continuous, oriented, and extended. The CFAR neighborhood is an orientation of the window in range - Doppler space which is designed to parallel expected hazardous windshear. The windshear hazard will always appear as a diagonal fanning from regions of close range and positive (or less negative) Doppler to farther range and negative (less positive) Doppler, even in the presence of a prevailing wind (asymmetry). Orienting the CFAR window subscripts along the expected locus of the windshear hazard desensitizes detection of low level wind shear returns. The window is a parallelogram or bow-tie shaped window, as depicted in FIG. 9 and designed to span hazardous windshears. The threshold is formed by sorting the amplitudes of the cells in the neighborhood and choosing the one of the cells which is biased away from the maximum (which may contain other thumbstacks) and near the median, hence a result much like an average over the neighborhood in a uniform amplitude case. This process 104 forms the local neighborhood threshold estimate as a modified ordered statistic and "detects" discrete returns. These returns form a detect list. As discretes, the cells on the detect list are edited, i.e. omitted by amplitude substitution, from becoming otherwise strong erroneous biases in the mean velocity extractor.

Next, the system performs an amplitude weighted mean velocity slice operation 106 for each PRF which essentially collapses the amplitudes in the Doppler filters (matrix) of a range gate into a single velocity which represents the value of windspeed at that range. The Doppler velocity as evidenced by the index of the filter is weighted by the amplitude of the return in that filter and averaged over all filters of the range gate to get output value. Intermediate results of the weighted mean calculation performed by this operation permit feature extraction, confidence assessment and two of two PRF windmap slice formation. The details of this step 106 will be amplified on with respect to FIGS. 11A–11E.

The system then creates 108 a two of two windmap slice by essentially determining whether the mean standard deviation for a velocity return (the weighted average velocity return) in a range cell at one PRF (in one PRF velocity map) sufficiently overlaps the standard deviation of a velocity return at the other PRF for that range cell (in the other PRF velocity map) and, if sufficient overlap exists, the returns are combined otherwise the return is nullified or blanked. The data entering this process 108 (See FIGS. 12A–12F) has been integrated across adjacent looks at the same PRF in azimuth corresponding to common beamwidth (target correlated) illumination. These PRF looks are interlaced with looks at the other PRF which will also contain correlated target returns. Because the PRFs differ, the PDI results from the respective PRFs will be correlated in range only at unambiguous ranges and any ambiguous ranges of the common integer divisor. Since the PRFs have preferably been selected to be prime number multiples of the range gate, the first ambiguity at which the returns will be correlated should be the range gate multiplied by the product of the two constructing prime numbers. Because these constructing prime numbers are both nearly equal to 130, that range is about 100 ambiguities away. There will be returns in each PRF from the near ranges (of principal interest for pilot time-to-go warning) and far ranges, especially the second time around range (STAE). Some of the returns will be correlated and some will not. The principle employed here is that returns from the unambiguous ranges will correlate, i.e. replicate the same weighted statistics concerning the return for that range cell, as independent samples, while the returns from STAE will de-correlate, i.e. will not replicate and hence will spread the weighted statistics. This correlation at the slice statistic level is preferred as opposed, say, to forming separate, complete wind maps at each PRF, extracting range location features (over all azimuth samples) of greater statistical significance, because a two wind map comparison requires a large high speed memory and, if it were decided the separate wind maps were uncorrelated, then the entire look would be discarded. The correlation in step 108 is conducted on a range gate basis. For each range gate, there exist complete intermediate statistics for computinq a resultant weighted mean and variance. There are statistical significance tests for inferences on both these statistics as discussed below. A judgement is made on a range gate by range gate basis whether the two sets of statistics appear to be from the same population (i.e. correlated returns) or whether they appear to be drawn from two independent distributions (returns from different ranges). In concluding the former, the two data statistics are combined. If the latter is concluded, the range gate is blanked or zeroed.

The statistical comparison can use one or both of the following tests to accept or reject a return for the same range gate and different PRF's. If the returns are from the same object:

$$\mu_1 - \mu_2 = 0,$$

where the mean value of velocity $\mu$ in a range gate at one PRF equals the mean $\mu_2$ of the other PRF. This first test uses the statistic $$t = (x_1 - x_2)/s_{1-2}$$

where $x_1$ = mean velocity of PRFI, $x_2$ = mean velocity of PRF2

$s_{1-2} = \text{SQRT } [(VAR_1/N_1)^2 + (VAR_2/N_2)^2]$ which is the standard deviation of the combined sample set where $N_1$ is the number of filters used in the mean calculation of PRF1 and $N_2$ is the number of filters used in the mean calculation of PRF2.

At a significance $\alpha$ ($\alpha$ will equal a small number, e.q 0.01, signifying a failure or incorrect rate in the conclusion produced by the test), the. returns should be rejected as uncorrelated if:

$$-t_{\alpha/2} > t > t_{\alpha/2}$$

where t is the conventional student's t distribution for $N_1 + N_2 - 2$ degrees of freedom. The second test uses:

$$\sigma_1^2 = \sigma_2^2$$

relying on the variances $\sigma_1^2$ and $\sigma_2^2$ of the two samples being equal enough to support a conclusion that the data were drawn from similar circumstances. The second test uses the statistic:

$$F = s_M^2/s_m^2$$

where $s_M^2$ is the larger of the two variances and $s_m^2$ is the smaller of the two variances. The returns for the two PRF's will be rejected if:

$$F > F_{\alpha/2}(n_M - 1, n_m - 1)$$

where F is the conventional F-Distribution

Both these tests are very tolerant of fluctuations due to sampling noise. For both of these tests when STAE returns dominate a range gate, changes in the mean and variance of the range gate will lie outside the confidence intervals and lead to the rejection of the returns as uncorrelated. The first test, using the mean, is preferred and the performance of the steps of this test will be described in more detail with respect to FIGS. 12A-12F. Once the range gate data has been accepted, the combined intermediate statistics furnish a final value of improved accuracy, and the slice (range at an azimuth angle) may then be used to nominate outflow features.

When the upper bar is processed a list of candidates is produced, that is, the velocity and amplitude maps of the upper bar are searched for a possible microburst. When the lower bar is processed the system produces 112 a horizontal windshear map which is a range by azimuth map of the horizontal windshear hazard.

The velocity and amplitude maps and the feature candidate vectors accompanying them are condensed in steps 110 and 114 into estimates of: a) radius of downdraft/precipitation core; b) drift velocity of downdraft (ambient prevailing radial wind component) c) range to downdraft center; d) azimuth angle to downdraft center; e) altitude of downdraft estimates; f) peak downdraft core reflectivity; g) range to peak outflows (head and tail wind); h) azimuth to peak outflows; i) altitude to peak outflows. The upper bar processing 110, shown in FIG. 4B, performs downdraft core identification using an up-look geometry, precluding STAE returns and near sidelobe returns. It does not, however, seek the steepest up-look angles available. Estimates of the prevailing wind velocity are conducted on the lower bar. The upper bar will avoid STAE mainbeam ground clutter and other errors with a modest up-look. Based on measured data using Bendix 30 inch antenna array, ground clutter return from STAE will be a minimum down 54 dB., two way, over the RF band 9.325 GHz. if the beam is elevated 5 degrees above the horizon. As a result, any return at even relatively low Doppler velocities can be attributed to the core winds. The radius of the core is determined from the scan history and range profile of the amplitude maps of the upper scan. When the aircraft is still at relatively high altitudes, the lower edge of the upper antenna mainbeam illuminates altitudes above those of the lower bar. For expected hazardous "wet" microbursts, these altitudes will lie near or above the depth of the outflow and/or vortex. Although returns may be weak, their Doppler content indicates a change over altitude of the outflow, that is, this Doppler information permits a regressive estimation of the coefficients of the function modeling (for example, power series, analytic) the outflow in altitude. The absence of upper bar outflow return, given a velocity couplet on the lower bar, an evolved "dry" microburst (for example, see the reflectivity and velocity profiles of NASA model T26) and is interpreted with a bias to a lower depth of outflow. As the aircraft lets down in altitude, the altitudes illuminated by the upper bar will lie closer to the altitudes being examined by the lower bar (i.e. the lower bar elevation angle rotates up as the aircraft descends). For the "wet" microburst, the two beams should provide superior altitude profile estimations of the outflows. This process 110 is concerned with extracting data from the velocity, amplitude, and the variance map matrices, to support the total hazard estimation and logical enabling of hazard enunciation. The processes on the upper bar data by themselves, however, will reach no conclusion about the depth or the peak velocity of the outflow. Those conclusions and calculations are formed at the frame feature extractor step 114, to be discussed later and which receives updates from the respective bars, as available.

The data produced from the latest upper bar elevation angle consists of a velocity map, an edited amplitude map, a variance (or standard deviation) map, and lists of candidate outflow features. These are to be reduced by process 114, to estimates of: i) the downdraft core size, location, radial motion, and reflectivity; and ii) coefficients for the height profile model (altitude AGL) of the outflow. During the CFAR process 104 only wind returns are passed un-edited, and, as a result, the processing 110 becomes a matter of distinguishing outflow, circulating vortex, and downdraft core returns. For the azimuth direction containing the microburst center, there will be range gates with minimal Doppler and large amplitude bounded at both shorter and longer range by greater Doppler velocities of lesser amplitude (i.e. a rather typical "clump" description). To allow for possible Doppler bias from prevailing radial wind, the range gates containing the reflective downdraft core are distinguishable from outflow cells on the basis of reflectivity change about the median Doppler. Upper bar outflow cells must be offset from the Doppler centroid and have smaller reflectivities, relative to the core. In the case of the "wet" microburst, there may be less marked

- 27 - 57,000 amplitude change from the core to the outflow, but the slice will evidence significant range and Doppler extent (and continuity).

The velocity fields for analytic models of a microburst have been described by four parameters: 1) a characteristic horizontal dimension; 2) maximum wind velocity; 3) altitude of maximum outflow; and 4) depth of outflow. [See TSO-C117, Appendix 1, p 36] Respectively, these may be identified as: 1) R, the downdraft radius (at depth of outflow); 2) $\mu_m$, the maximum outflow velocity; 3) $z_m = 0.22 z^*$, the altitude of peak velocity ($z^*$ is the altitude of half velocity); and 4) $z^*$, the altitude of maximum vertical velocity, the depth of outflow. It is not necessary to know all four to address the problem of total hazard factor. To model the vertical velocity component as a function radius and altitude:

$$w(r,z) = \lambda\, z^8\, e^{-(r/R)^2}\,[(e^{-z/z^*}-1)-(\epsilon/z^*)(e^{-z/\epsilon}-1)]$$

The boundary layer height, $\epsilon$, is related to the half velocity height of the outflow (out of the boundary layer) according to $$z^* = 12.5\, \epsilon$$

and the scaling constant $\lambda = 4.243\, u_m/R$.

Furthermore, the radius of the downdraft is related to the radius from microburst center at maximum outflow velocity, for any altitude, $$r_m/R = 1.1212$$

Given these relations and the relation for outflow velocity as a function of radius and altitude, measurement of $u^m$, $z^*$, and R, that is, the determination of three unknown model coefficients by three independent measurements, will suffice for a description of the vertical wind fields at low altitudes. This follows from lack of sensitivity at higher altitudes of the outflow to the details of the boundary layer flow. The characteristic height of the outflow can be determined from measurements of the peak outflow velocity at two different altitudes. Consider, $$u(r,z) = (\lambda R^2/2r)[1 - e^{-(r/R)^2}][e^{-z/z^*} - e^{-z/\epsilon}]$$

radial outflow velocity, from two measurements of radius and velocity of peak outflow at two different altitudes which may be solved for to yield $u_m$ and $z^*$. For $z \gg > \epsilon$, employing the results for the scale factor $\lambda$ as a function of peak outflow velocity and downdraft core radius, the peak outflow at altitude AGL $z_1$ is $$u_1 = u(z_1)\delta 1.354 \, u_m \, e^{-(z_1/z^*)}$$

The Taylor's Series Expansion about the point $z = z^*$ gives, to first order, $$u_1 = u(z_1)\delta 0.4981 \, u_m \, [2 - (z_1/z^*)]$$

$$u_2 = u(z_2)\delta 0.4981 \, u_m [2 - (z_2/z^*)]$$

Then $$z^* = 0.5^*[u_1^*z_2 - u_2^*z_1]/[u_1 - u_2]$$

and $$u_m = 1.004^*[u_1z_2 - u_2z_1]/[z_2 - z_1]$$

It may be stated, then, that, given the analytic functions and their coefficients of the Oseguera-Bowles description of microburst flow, the model coefficients $u_m$ and $z^*$ can be determined by two measurements of outflow (u) and altitude (z) since the complexity of the analytic functions is reduced. With respect to sensor processing design for real world hazard characterization, the selection of an appropriate model for which coefficients are to be determined from measured data should reflect the essential features of the phenomena being modeled. A notable failure in the exponential model for the vertical profile of the Oseguera-Bowles equations is the absence of vortex description. Both real world observations and numerical simulation of microbursts include vortex formation which truncates the exponential decay and can lead to inflow at altitudes above the vortex center. The functional dependence of the Oseguera-Bowles equations for the outflow in the vertical dimension is not in good agreement with observation at altitudes much above the altitude of peak outflow, $z_m$. Good models will furnish two properties. First, they must provide good fit, in the usual meaning of least mean square curved fitting to the observed data. In general, better fits will be obtained by increased complexity, for example, additional power terms. Secondly, they must be robust and the unknown coefficient values must be readily solvable in terms of the data.

The most simple model is to assume the outflow is constant over altitude. In principle, a single, lower elevation bar of data can provide a single point of data, and, given a determination at the lower bar of the characteristics radius, an estimate of the vertical wind and hazard can be produced. This is essentially the result described by Bowles (29th IEEE Conference on Decision and Control, Dec. 5-7, 1990—equation 9) where a linear dependence for vertical velocity results.

Operation of two elevation bars provides a superior means to obtain data for the coefficients of the functions modeling the outflow in both radial and vertical dimensions. First, determination of the characteristic radial dimension in the absence of ground moving traffic and mainbeam clutter at the upper bar will be more accurate than otherwise us solely the lower bar approach. the second, upper, elevation bar may furnish an additional data point in the altitude profile. An additional data point is tantamount to being able to describe the vertical profile with an additional degree of modeling freedom.

A linear model in the vertical dimension for the outflow is used in the present invention. Other functions, with only two unknown coefficients, may be considered possible. Indeed, the details of the actual model include non-linear modeling of the outflow in the boundary layer, but without additional unknowns. An important feature of the linear model is the agreement with numerical simulations and the relative insensitivities of its coefficients to pertubations in data relative to other, non-linear models with only two coefficients. Models with three unknown coefficients in the vertical dimension, which may be solvable with three independent altitudes of data, would appear to offer little in terms of model fidelity. Data from numerical simulations indicate that the vertical velocity may be expected to be quite linear at lower altitudes and shows a decreasing quadratic trend, all evidence of the suitability of linear outflow modeling. A linear model for outflow as a function of altitude will economically produce the essential features desired for vertical wind accuracy with two elevation bars of outflow data.

The understanding of above relationships recognized by the inventors hereof resulted in designing the system to use the upper and lower bar measurements. In principle, the two elevation measurements permit determination of the peak outflow and one of the characteristic altitudes. In general, the lower bar measurement determines the outflow radius and peak outflow velocity because that measurement is at lower altitudes where the TSO equations are most effective. Whether through a formal or approximating regressive solution (as outlined above) or through a look-up table, the characteristic outflow altitude may be obtained.

Initially, during the process 110, as discussed in more detail with respect to FIGS. 15A-15I, candidate microbursts are located in angle by looping over the angle slices of the map. Potential microbursts are defined by continuous runs in the sense of the ordering of their outflow range features. This means that each slice is classified as follows: a) "normal", (+1) where the range to peak tail wind is greater than the range to peak head wind, that is outflux, b) "inverted", (−1) where the range to the peak tail wind is less than the range to the peak head wind, that is influx, and c) "indeterminant", (0) where, for various reasons, there were no reports for tail and head wind ranges, for example the presence of only noise in all range gates may produce zero Doppler reports. Runs are defined as sequences of slice across the beam width ordering classification with identical or compatible of classifications. The slices are contained within azimuth beam boundaries For example, consider the following runs: A) +1 +1 +1 +1 0 −1 0 +1 −1 −1 +1 0 0 B) +1 −1 0 +1 −1 0 −1 +1 0 0 0. Case A suggests that the first 4 or 5 beam directions have at least the sense of their outflows relating with each other. The ninth and tenth angle slice may furnish a candidate (since the series of positives are followed by a series of negatives), but the others appear to be noise. Case B appears to be entirely noise. Case A may be said to start at slice 1 and stop at slice 5 because the termination condition for a run is a change in sign. For a given number of azimuth slices in a bar, there is a bound on the number of microburst candidates as disjointed contiguous strings or runs, depending upon the number of contiguously classified cells used to define a microburst candidate. Defining the number of contiguous cells for such a string becomes a limiting factor in accepting microburst candidates. Note, however, that at closer ranges, the same diameter downdraft reflective core will excite more cells than at max range. For a 30 sec. time-to-go warning on a 400 m. small downdraft, the process accepts or indicates a small microburst core at a range of about 3.2 km., i.e. an angle extent of 0.125 radian (7.1 degrees). A small microburst reflective core (+20 dBz.) excites angle slices within the 3 dB beam width of the beam center. Since an excited slice is output for each 0.418 degrees of return extent, a point return should excite 7 contiguous slices and the dry microburst at 3.2 km range should excite 7.2+16.99=24 cells (out of a total of 110 for roughly ±23 degrees coverage). The process 110 thus detects a microburst core 0.5 km in diameter at a range of about 3 km. Adjoining contiguous strings of like sense, separated by a brief disruption, are candidates to be combined using conventional string interpolation functions,k such as setting all candidates in a string of seven candidates to the same classification when six out of seven are the same classification and the non-matching candidates is in the middle. Other combining methods could of course be used. As will be seen below, the angle extent of the string will influence angle averaged outflow features. The upper bar is much less susceptible to ground moving target indications (GMTI) than the lower.

Emerging from the loop over angle slice processing is a list of candidates (contiguous runs) of observed extent (start and stop). These are ordered by size, and, to limit subsequent processing, the number of candidates considered subsequently may consist of only the largest few. Note that for a criteria of 17 contiguous cells minimum (since the upper bar CFAR process will employ no notch blanking, there will be no minimum detectable velocity limits to the angle extent of the downdraft core), there can be no more than 8 microburst candidates maximum, allowing fractions of contiguous runs on the boundaries. Each candidate is then examined for its upper bar features. These shall include: i. amplitude weighted azimuth centroid, ii. amplitude weighted average radial (drift) velocity, iii. amplitude weighted range centroid, iv. amplitude weighted range standard deviation (downdraft core radius), v. string averaged peak outflow ($v+$, $v-$), vi. string averaged radius of peak outflow ($R+$, $R-$), and vii. amplitude weighted altitude of peak outflow data. The quantities above labeled "string averaged" refer to averaging over the outflow features of the slices in a candidate. For both the outflow radius and the outflow speed, it is assumed that the microburst is an axial-symmetric cylinder, however, an ellipse, with additional model coefficients, could be used. Outflow peak velocities may differ in magnitude due to average drift. For each slice, the peak outflow velocities and ranges represent samples to be fit by the axial symmetric model.

Figure 13:
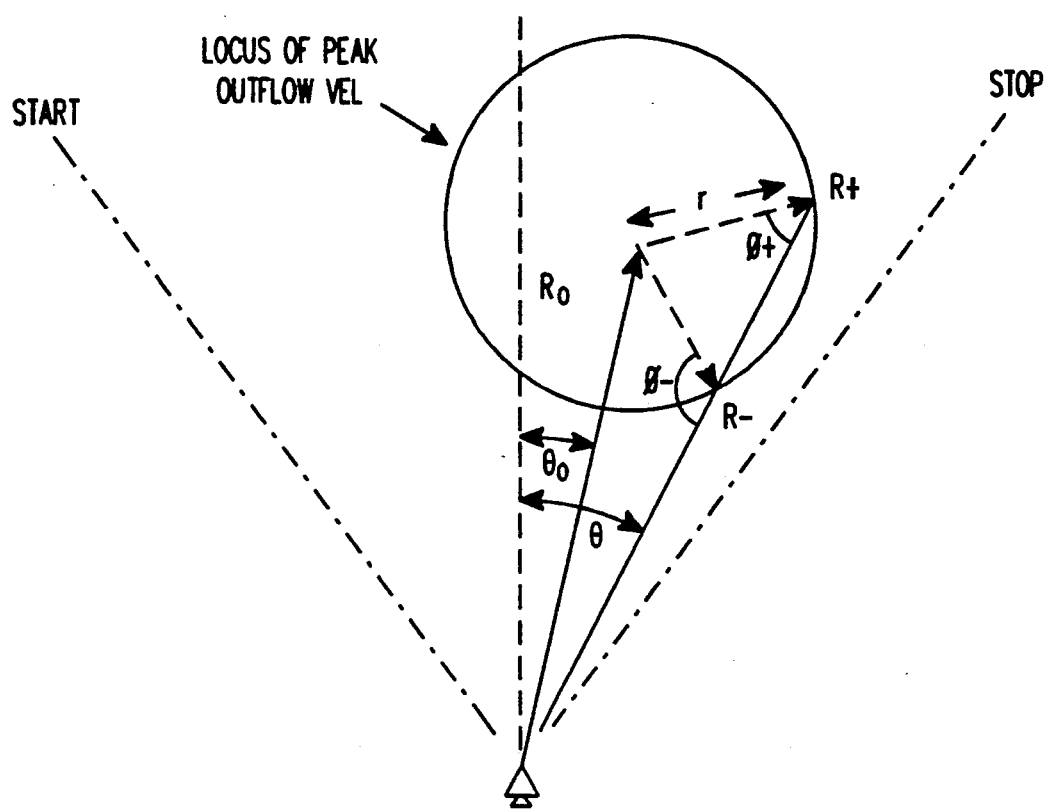
FIG. 13 depicts the geometry of a microburst.

The radius and radial velocity of the peak outflow are determined from summations over the angular extent of the candidate slices. These may be described as functional or spatial averages. For the geometry of a radial symmetric microburst, as shown in FIG. 13, the projection of the outflow radius on to the line of sight requires the system to report ranges for the outflow of (assuming a headwind at near range):

$$R^-(\theta) = R_o \cos(\theta) + r \cos[\phi^-(\theta)]$$

$$R^+(\theta) = R_o \cos(\theta) + r \cos[\phi^+(\theta)]$$

where $R^-$ = the range to head wind outflow, $R^+$ = the range to the tail wind outflow, $R_o$ = the range to the center of the microburst, $r$ = the radius of the outflow maximum, $\theta$ = the azimuth angle off the line of sight between the radar and the center of the microburst, $\phi(\theta)$ = the angle between the microburst radius to the outflow point and the line of sight between the radar and the outflow point. For such a geometry, there are two values for $\phi(\theta)$ corresponding to either the head or tail wind outflow point, i.e.

$$\sin[\phi(\theta)] = (R_o/r) \sin(\theta)$$

$$\cos[\phi \pm (\theta)] = \pm \{1 - \sin^2[\phi(\theta)]\}^{0.5}$$

This means that the integral of the sum of the ranges to both outflows over the angular span of the microburst ($\sin[\Delta\theta] = 2r/R_o$) is determinant, $$2 \int_0^{\Delta\theta/2} [R^+(\theta) + R^-(\theta)] d\theta = 4R_o \sin[\Delta\theta/2] \approx 4R_o \sin(r/R_o)$$

$$\approx 4r$$

The integral over the angle span may be approximated by the finite summation over the angle span, i.e.

$$2 \int^{\Delta\theta/2} [R^+(\theta) + R^-(\theta)] d\theta \approx \sum_{i=1}^{N_j} [R_i^+ + R_i^-] \delta\theta_i$$

where $N_j$ = the number of azimuth slices for the expanse of the $j^{th}$ candidate microburst string, $\delta\theta_i$ = the azimuth angle width of the $i^{th}$ slice, i.e. the change in angle between adjacent outflow estimates, and $R_{-i}^+$ = the range from the radar to the tail (+) or head (−) wind outflow $$r \approx R_o \arcsin\left\{(.25/R_o) \sum_{i=1}^{N_j} [R_i^+ + R_i^-] \Delta\theta_i\right\}$$

In a more general fashion, which anticipates the truncation of at least one of the angle boundaries, the summation over the outflow ranges may be used to estimate the radius of the outflow at altitude as $$r = R_o \arcsin[(K1 \cdot \Sigma/R_o) + K2]$$

where $$\Sigma = \sum_{i=1}^{N_j} (R_i^+ + R_i^-)$$

and the constants K1 and K2 are defined:

i) for normal conditions (subtended angle lies within boundaries)

K1 = 0.25,
K2 = 0.0 ii) for the condition where $\theta_1$ is on the (start) boundary,
K1=0.50,
K2=$\sin(\theta_1-\theta_o)$
iii) for the condition where $\theta_2$ is on the (stop) boundary,
K1=0.50,
K2=$-\sin(\theta_2-\theta_o)$ The extraction of r, the outflow radius, is dependent on at least one edge of the microburst not being eclipsed by the boundary (and that the angle centroid is within the scan). If the entire scan is filled by a single string (both boundaries are eclipsed), then it is assumed that there is no boundary eclipsing. The difference between the outflow velocities at any radar azimuth are related, in fashion as the radius, by:

$$v^+(\theta) - v^-(\theta) = 2v_r[1-(R_o/r)\sin^2(\theta)]^{.5}$$

$$\sum_{i=1}^{N_j}(v^+ - v^-)\delta\theta_i \approx 4v_r\int_O^{\Delta\theta/2}[1-(R_o/r)\sin^2(\theta)]^{.5}d\theta$$

This integral does not simplify quite as easily, however. It is a function of the ratio of the outflow radius (r) and the distance to the microburst center ($R_o$), i.e. the angular expanse of the microburst [$\Delta v/2 = \arcsin(r/R_o)$], and can be tabulated with a look-up table for a curve such as in FIG. 14. In a fashion anticipating boundary condition conflicts, $$v_r = \frac{(\delta\theta/2)\sum_{i=1}^{N_j}(v_+ - V_-)}{I(x, \theta_2-\theta_o) + I(x, \theta_1-\theta_o)}$$

where $$I(x, \theta_2-\theta_o) = \int_O^{\theta_2-\theta_o}[1-x\sin^2(\theta-\theta_o)]^{.5}d\theta$$

where $x=R_o/r$, and $\delta\theta$=the angle step between slices. The integral may be viewed as a tabulated function in x and the range of integration. The value of this integral is very nearly equal to the sine of the upper bound on the integration and may be suitably modelled as:

$$I(x,\theta) = I(\theta) = \sin(\theta).$$

Given the r and $R_o$ have been determined previously, $v_r$ may be found. This calculation is not dependent in principle upon eclipsing of the angle boundaries, but it will suffer under eclipsing because of its use of the outflow radius.

The horizontal windshear contribution to the aerodynamic hazard, as determined in step 112, following criteria set forth by R. L. Bowles of NASA (R. L. Bowles, Windshear Detection and Avoidance: Airborne Systems Survey, 29th IEEE Conference on Decision and Control. Honolulu Hi. Dec. 5, 1990 incorporated by reference herein.) to be proportional to the range rate of change of the horizontal wind velocity. The final output hazard quantity is further scaled by the aircraft velocity projected along the particular azimuth slice, and the acceleration of gravity. These dimensional scales serve first to convert the result from a space derivative to a time derivative (hence an acceleration) and then to express it in units of the acceleration of gravity. The complete azimuth by range wind velocity map, and the corresponding scaled amplitude (loosely, the radar cross-section map), are updated at the look rate and stored in step 108. The main task in converting 112 the velocity map into a hazard map is the extraction of a velocity gradient along the radial lines. This is accomplished by means of a linear fit over a variable window of at least three points. The window is chosen so as to assure a significant radar measurement on each side. To this end, a test is used which involves the corresponding radar amplitude map. A variable-sized moving window is used because it is a computationaly simple way to insure that the hazard factor interpolates in a reasonable way across a 'gap' or weak spot in the radar return. Such a situation will be encountered in the lower bar when a clutter notch (a range cell where the processing of mainbeam clutter has caused the cell to be blanked) is contained in the velocity map. The criterion for choosing a window about a point is that there be enough power on each side. To be precise, a window is acceptable for the estimation of the velocity gradient if the sum of the amplitudes $\sigma(j,i)$ of cells closer in range, and the sum of amplitudes in cells further in range exceed the threshold.

$$T = \frac{K}{2n}\sum_{i=1}^{n_r}\sigma(j,i)$$

where i is the index of the range cell, j is the index of the azimuth cell, n, is the number of range gates, $n_a$ is the number of azimuth cells, $\sigma$ is the wind map slice and K is the average number of cells in the variable window. The threshold T must be computed for each azimuth slice "j" individually. In determining the power sum in the near and far portions of the range window, the gate upon which the computation is centered will contribute half its amplitude to each side. The only additional complication comes from the near and far edge conditions. These are handled at the outset by figuring out how many cells on each edge will be necessary to capture power 2T. These edge regions are computed all at once, and the body of the computation proceeds from the first cell after the near edge region to the last cell before the far edge region.

One computational enhancement which is employed is to compute an array:

$$S(i) = \sum_{i=1}^{i}\sigma(j,i)$$

at the start of each slice. All of the sums which must be calculated in determining the variable windows are differences between terms in the vector 'S'. This saves a good deal of computation at the expense of a modest amount of intermediate storage. The exact details of the windowing algorithm are described with respect to FIGS. 16A-16G. Within an individual window, the system determines an estimate of the radial gradient of the velocity. This requires a linear least square fit, and as long as the amplitudes are available, they can be used to weight the points in the fit. The procedure is standard. Consider the weighted sum of squared deviations from a hypothetical line to be a function of the variable slope and intercept. We can take this opportunity to define our independent variable with the proper units of time. Let:

$$t_i^2 = \frac{i\Delta R \cos(\theta)}{V}$$

where $\Delta R$ is the range gate size in meters and V is the aircraft velocity in meters meters/second, respectively and $\theta$ is the azimuth slice. In the following equations the indices "f" and "s" denote the first and last range gates in the window. The sum of squared deviations from a hypothetical line can be determined and by construction the derived slope will be the desired estimate of acceleration:

$$\psi(m,b) = \sum_{i=s}^{f} \sigma(i,j)\{mt_i + b - v(j,i)\}^2$$

$$\frac{\partial \psi(m,b)}{\partial m} = 0$$

$$\frac{\partial \psi(m,b)}{\partial b} = 0$$

From this a matrix equation can be produced which we need only the slope for our purposes:

$$m = (\Sigma v(j,i)t_i^2 \sigma(j,i)\Sigma \sigma(j,i) - \Sigma t_i \sigma(j,i)\Sigma v(j,i)\sigma(j,i))/$$
$$(\Sigma t_i^2 \sigma(j,i)\Sigma \sigma(j,i) - (\Sigma t_i \sigma(j,i))^2)$$

The desired horizontal windshear hazard for the range and azimuth cell determined by step 112 m/g, with g being the acceleration of gravity, or 9.8 meters/sec.

Extraction 114 of features from the lower bar considers only those sub-regions of range-azimuth space in the lower bar which lie "under" microburst candidate regions from the upper bar (i.e. highly reflective downdraft cores). There is no "which came first, the chicken or the egg?" contest between the respective elevation bars. The process 114, which will be discussed in more detail with respect to FIGS. 17A-17G, will employ the latest velocity map data from the lower bar and the latest upper bar features. In either case, the output of the process cannot be considered valid until both sets of data exist. Subsequent to the first bar, the process 114 is executed at the completion of the latest bar with the upper and lower bar data sets leap frogging each other for the honors of newest information. No matter which frog is ahead, the extraction of features from the lower bar data is updated. If the upper bar is the leading frog, the old lower bar map data is reprocessed under assumption that new upper bar candidates are present. If the lower bar frog leads, the newer map data may contain evolved feature information. The extraction of outflow features from the lower bar data is analogous to the methods employed for the upper bar. Having identified a region of space lying under a downdraft core candidate, the respective lower bar region is accepted as a microburst outflow candidate only if it indeed is an outflow (i.e. vortex possibilities are excluded) and is expanded by outward searches in range and azimuth for neighboring outflows. The expanded regions are then reduced by geometrical functional averaging and amplitude weighing routines to yield outflow centroids in range, radial (drift) velocity, and azimuth angle and outflow estimates for average peak outflow velocity, average range of peak outflow. The altitude of the peak outflow is determined for the beam height AGL at the fit ranges for the peak outflow.

The upper and lower bar features are grouped and condensed into output groups for subsequent use. The process 116, as described in more detail with respect to FIGS. 18A-18C, characterizes the hazard from the downdraft along the glideslope uses the axial-symmetric model of flow from the reactive windshear detection equations TS0-C-117, which are the so-called Oseguera-Bowles equations. Three parameters are needed to define the vertical velocity at any radius and altitude AGL (below 1000 ft.): i) altitude of half velocity outflow (outflow of the boundary layer) ii) downdraft (precipitation) shaft radius and iii) peak outflow. For reasons of logical operational separation, the process containing the downdraft estimation along the glideslope will determine the altitude of half velocity outflow and the peak outflow velocity from inputs of peak outflow at the different altitudes. The scaling of horizontal velocity (and wind shear) as a function of altitude is solely a function of the half velocity height of the outflow. Also emerging from the downdraft estimation will be outflow features, especially peak wind change ($\Delta v$) and radius of outflow which can furnish an estimate of the peak hazard factor. Processes prior to step 116 have determined certain features of microburst candidates, especially the radius of the downdraft (precipitation) core, the radius of peak radial velocity, and the magnitude (and sense) of that peak outflow. The location of these candidates in the upper elevation bar was used to initiate restricted searches in the lower bar. At this point, the radius and outflow are known for both elevation bars, i.e. at least two different altitudes about ground level. Knowing the outflow velocities at two altitudes will permit the determination of modeling functions of the altitude profile which have two degrees of freedom, i.e. two modeling coefficients. Of such functions, a linear model is important here for its agreement with numerical simulations and measured data on microbursts containing vortices. These data may be interpreted as establishing the area of influx at the top of a cylinder for the vertical flow sustaining the microburst and the altitude profile along the circumference of the cylinder for the outflux. Given mass continuity as a good characterization of the flow, estimates of the vertical wind can be obtained. The assumptions made in this process 116 include the following: i) the depth of outflow (height of vortex ring) is a function of the downdraft radius; ii) the altitude AGL of the peak outflow is a function of the outflow peak velocity; iii) the peak outflow is a simple function of height above the altitude of max outflow; iv) the vertical and radial velocities are simple, symmetric functions in the radial domain; and v) the shape functions for the velocity functions are separable in altitude and radial dependencies. In particular, a linear dependence of radial outflow in altitude means that knowing the peak radial outflow at two different altitudes is sufficient to establish the total hazard factor at all points interior to the cylinder defined by the depth of outflow (i.e. height of the ring vortex) and the radius of peak outflow. In fact, if the models are assumed to be simple enough, the measured feature data may over determine the unknowns in the models, and a least mean square (LMS) solution may be invoked. The fidelity of the modeling (i.e. increasing the number of unknown coefficients) may be increased with the result of more accurate hazard portrayal. However, the pertinent measure of a model's usefulness is the robustness with which it will continue to model the winds of a microburst which deviate from the ideal assumptions of both the analytical and numerical models e.g. multiple vortices, asymmetric, various boundary/environmental dependencies).

The remainder of this section introduces the key links in the chain of models and concludes with complete mathematical operations for converting the feature data into total hazard prediction along the glideslope.

Figure 5:
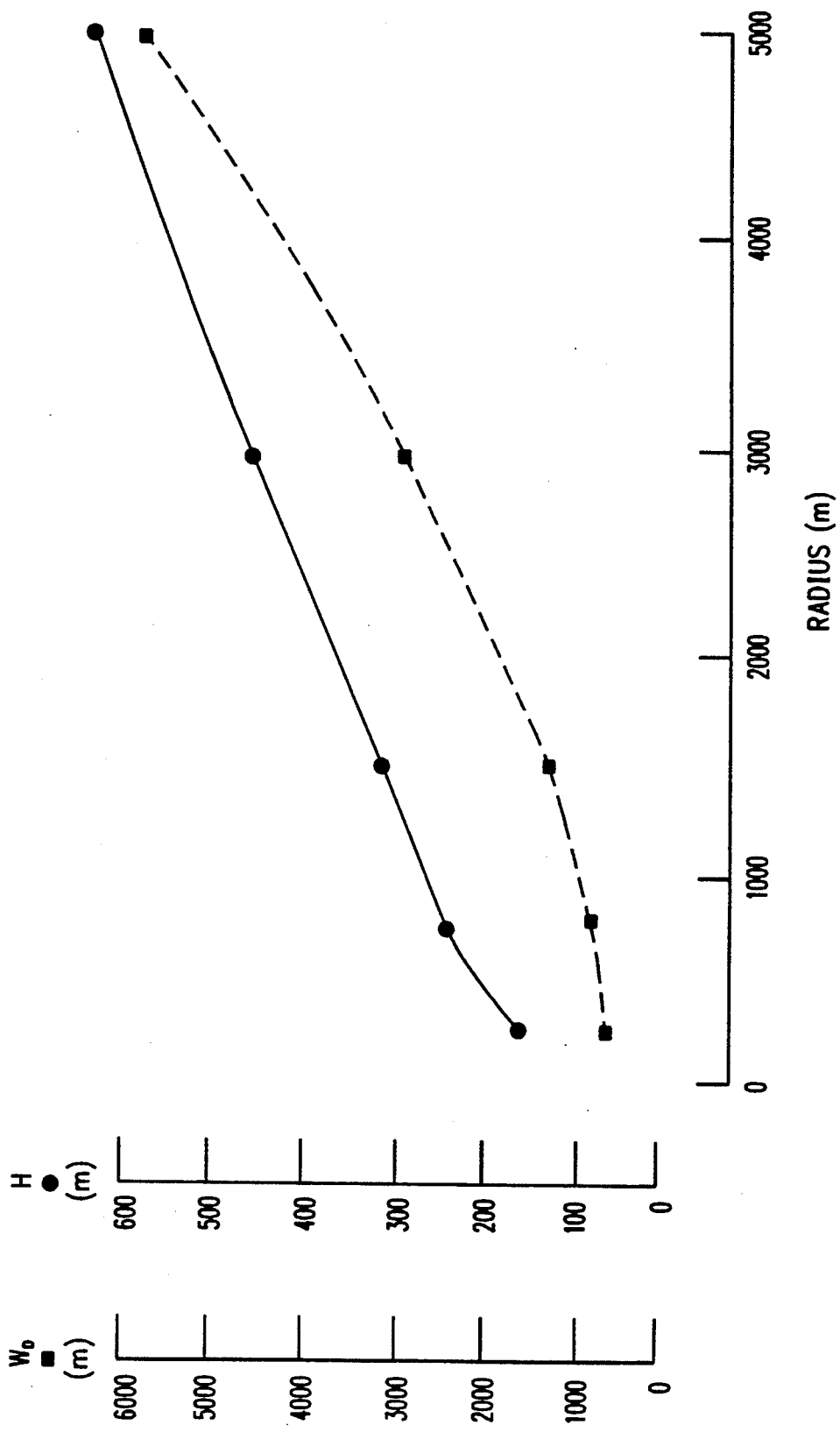
FIG. 5 illustrates a relationship between precipitation core diameter and depth of outflow.
Figure 6:
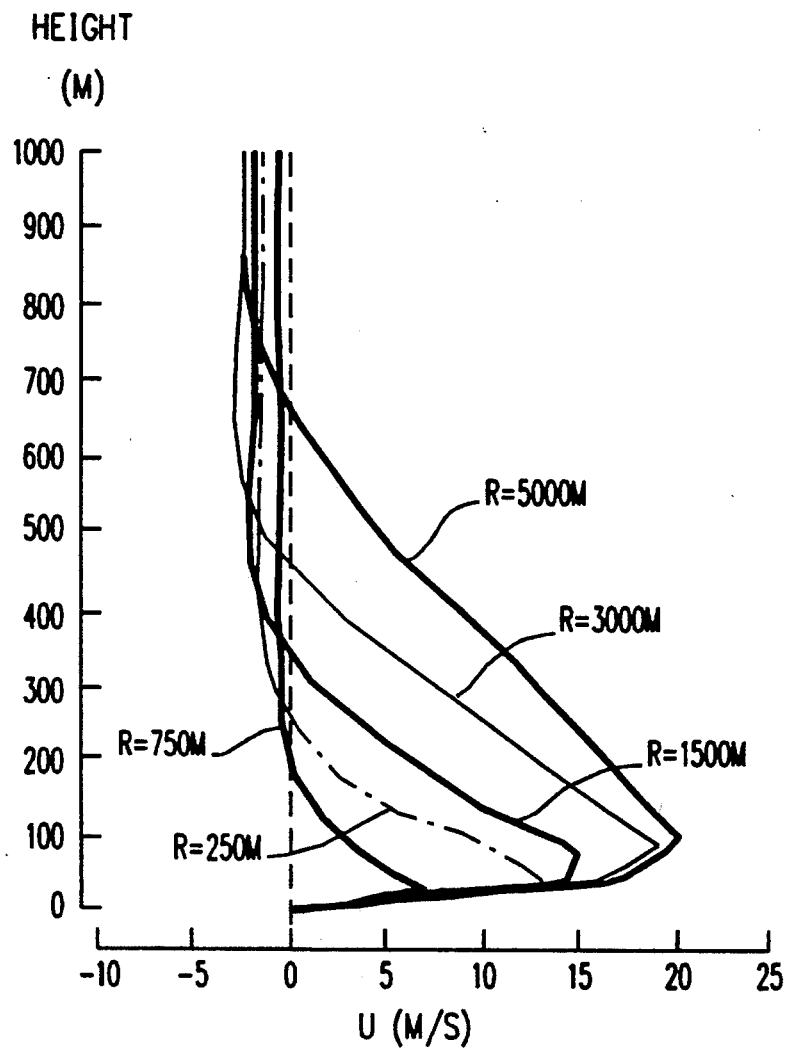
FIG. 6 illustrates the altitude of peak outflow.

Mathematical models for axial symmetric microburst flow have been proposed. The Oseguera-Bowles equations (Rosa M. Oseguera, and Roland L. Bowles, A Simple, Analytic 3-Dimensional Downburst Model Based on Boundary Stagnation Flow, NASA TM-100632, July 1988) satisfy mass continuity and introduce boundary layer effects. Recently, Vicroy (Dan D. Vicroy, A Simple, Analytical, Azisymmetric Microburst Model for Downdraft Estimation, February 1991) has refined those equations in the radius dimension. A fact of both these models, immediately apparent when observing field measurements and finite element/difference numerical simulation results, is the absence of a vortex ring. As shown by Vicroy, the simple analytical modeling in the altitude dimension over-estimates the magnitude of the peak radial outflow above the boundary layer. By mass continuity, the model also will overestimate the vertical component in the downdraft core regions. There is also a limited base of sensitivity observations of axial symmetric microbursts from numerical simulation by Proctor (Fred H. Proctor, "Numerical Simulations of an Isolated Microburst. Part II: Sensitivity Experiments", J. Atmospheric Sciences, vol. 46, No. 14, 15 July 19898, p. 2143-2165.). This simulation includes a complete meteorological initial condition set of the instabilities aloft driving the downburst. By varying those conditions, axial symmetric microbursts of various kinds can be simulated and observed for dependencies. As shown in FIG. 5, the depth of the outflow (height of vortex ring) is a fairly simple function of the precipitation shaft radius. The wetness or dryness of the microburst does not alter the depth of outflow. As shown in FIG. 6, the radial outflow as a function of altitude is fairly linear and does not persist with a exponential tail as suggested by the analytic models. For data altitudes below the depth of outflow, the variation of peak radial outflow as a function of altitude may practically be determined by the endpoint conditions: a) at the height of outflow, the radial outflow is zero; and b) near the ground, the outflow is maximum. The error in assuming the maximum outflow occurs at ground level is small, especially for determining the vertical velocity (See Roland L. Bowles, "Windshear Detection and Avoidance: Airborne Systems Survey", 29th IEEE Conf. on Decision and Control, Honolulu, Hi. Dec. 5, 1990) and is an assumption which can be improved without an additional degree of freedom, i.e. unknown.

There are two cases of paramount interest: i) the case where both elevation bar outflows are outward, i.e. both elevation bars can be recognized to have taken data within the outflow, and the linear assumption of the outflow dependence on altitude means that such data can determine the model coefficients for the peak outflow as a function of altitude (AGL); and ii) the case where the lower bar outflow is outward and the upper bar data is either at out-of-bound higher altitudes, indeterminant, or inward. An assumption of the dependence of the height of outflow on the precipitation shaft radius allows the model coefficients to be determined. These two cases furnish the basis for determining the modelling coefficients of peak outflow as a function of altitude. Once dependence of outflow on altitude is accepted, all that is needed to predict the vertical velocity in the downdraft/reflective core is a model of vertical velocity radial dependence over the downdraft. The remainder of this section elaborates these two approaches and delineates the solution for vertical velocity. It will be seen that the principle difference in these two cases is the reliance they respectively place on assumptions of microburst dependence.

The first case involves the greatest amount of data and the fewest and least controversial assumptions about microburst dependencies. From FIG. 6, the dependence of the presence of a vortex ring, is seen to be very linear above the boundary layer:

$$u(r_m,z)) = A - B*z$$

where $r_m$ = the radius of peak radial outflow and $z$ = altitude (AGL):

$$A = u_{max} H/(H - z_m)$$

$$B = u_{max} / (H - z_m),$$

where $u_{max}$ = the global peak velocity of the radial outflow, H = the depth of the outflow and/or height of vortex ring, essentially, H is the altitude at which the radial outflow has decreased to zero, and $z_m$ = the altitude of $u_{max}$. This altitude marks the edge of the boundary layer. For two data points $(u_1, z_1)$ and $(u_2, z_2)$:

$$A = (u_1 z_2 - u_2 z_1)/(z_2 - z_1)$$

$$B = (u_2 - u_1)/(z_1 - z_2)$$

$$H = A/B.$$

For the model of the first case, a pair of measurements can determine the set of model parameters $u_{max}$ and $z_m$ only if a third relation is cited. By analytical modeling, the altitude of peak outflow is independent of the outflow velocity, usually about 60-100 meters. From Proctor's data in FIG. 6, the altitude of maximum outflow is a function of the peak outflow (especially true for small macrobursts):

$$z_m \approx C \, u_{max}^2$$

where $C = 0.122$ meters/(meters/sec.)$^2$, then $$u_{max} = \frac{-1 + SQRT[1 + 4 B^2 H C]}{2 B C}$$

for altitudes peak outflow altitude (i.e. $z < z_m$, in the boundary layer), the outflow velocity may be modelled $$u(z) \approx u_{max} \, SQRT[z/z_m]$$

and the model is complete.

Figure 7:
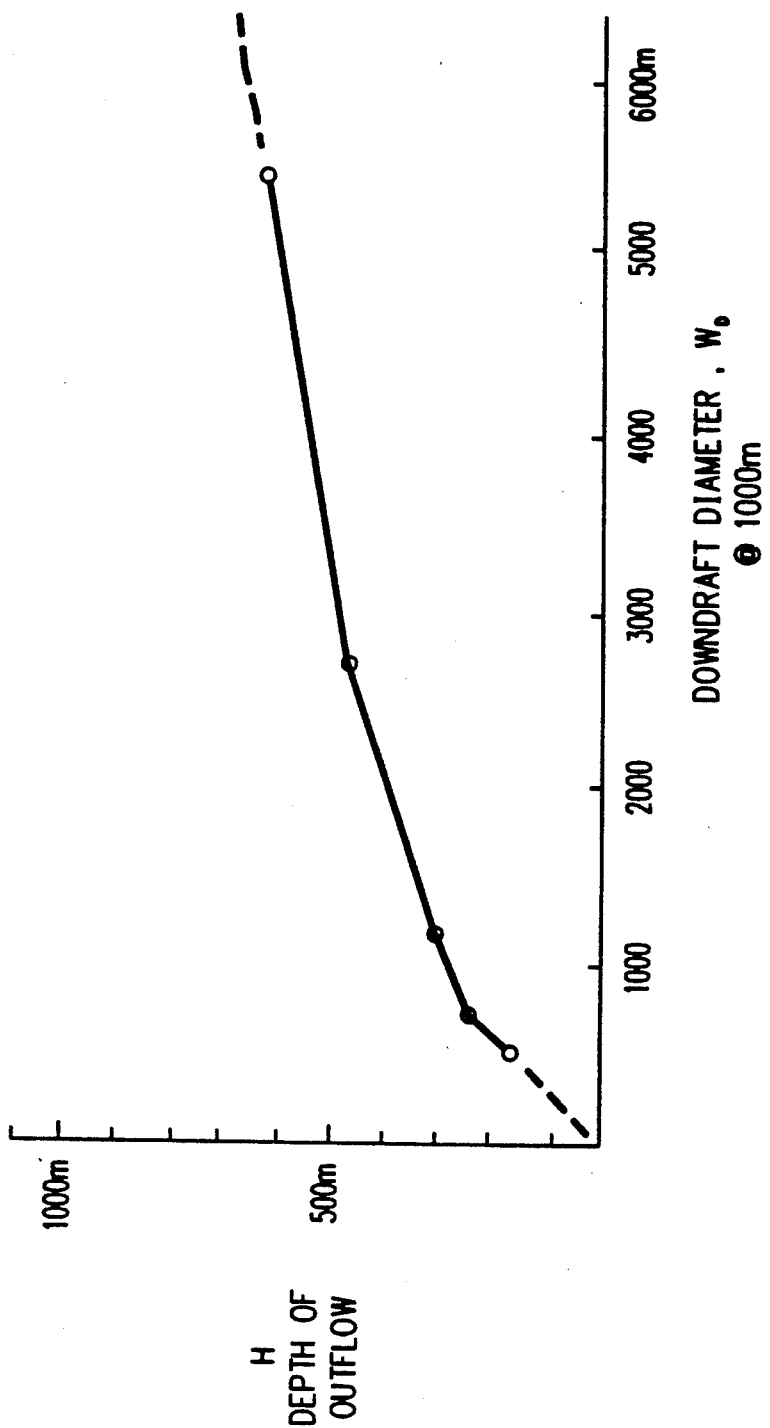
FIG. 7 illustrates the contents of a lookup table for determining the depth of outflow.

In the second case, only a single point $(u_1, z_1)$, from the lower bar, is safely considered to lie within the outflow. An additional assumption or relation is required. From Proctor's work portrayed in FIG. 5, redrawn in FIG. 7 to relate the diameter of the downdraft (at 1000 m. AGL—the altitude through which the upper bar should scan) with the depth of outflow, the relation between the downdraft radius and the depth of outflow is relatively simple. Employing the radius of the downdraft as obtained from the upper bar reflective core, either by a look-up table or by a simple power series model, then the following is used to establish the outflow model coefficients over altitude: 1. given downdraft diameter from the upper bar, $W_D$ find depth of outflow $H(W_D)$; and 2. using the lower bar radial outflow feature, $(u_1, z_1)$, find model coefficients:

$$B = u_1/[H(W_D) - z_1]$$

$$A = B*H(W_D)$$

and the modeling coefficients can be further understood as before (i.e. $u_{max}(A,B)$ and $z_m(A,B)$ ).

It remains to determine the total hazard factor along the glideslope. To perform this estimate, the horizontal hazard factor at the altitudes of the lower bar is known by direct processing and the radial outflow as a function of altitude is known. Basically, the horizontal factor from a higher altitude is linearly scaled (increased) for a lower altitude, unless the altitude of the scaling is in the boundary layer. This follows from the feature of the analytic models that the peak outflow at any altitude occurs at the same radius (i.e. the radial shaping function and the elevation shaping functions are separable). Given the determination of the model coefficients A and B, the vertical wind at any point relative to the center of the microburst located at $\theta_o$ in azimuth and $R_o$ in range is $$w(r - R_o, z) = w(z)g(R)$$

where $g(R) = g(r - R_o)$ is the radial shaping function of the analytical model and $w(z)$ is the vertical velocity on the axis, to be found by mass continuity over a cylinder centered at the microburst axis:

INFLUX = OUTFLUX $$INFLUX = \int_O^{R_1} 2\pi \, r \, w(z) \, g(r) \, dr$$

$$OUTFLUX = \int_O^z 2\pi \, R_1 \, u_{max}(h) \, dh$$

assuming the model for outflow velocity within the boundary layer,

OUTFLUX =

$$2\pi R_1 \left\{ \int_O^{z_m} u_{max} (h/z_m)^{.5} dh + \int_{z_m}^z (A - Bh)dh \right\}$$

where $u_{max}$, $z_m$, A and B have already been related to each other. Then, above the boundary layer ($z > a_m$), $$w(z) = (R_1[a_2z^2 + a_1 z + a_o])/G(R_1)$$
$$R_1[a_o + z(a_1 + a_1 + a_3z)]/G(R_1)$$

$a_o = 0.667 \, u_{max} \, a_m - A \, z_m + B z_m^2/2$
$a_1 = A$
$a_2 = -0.5 \, B$
$R_1 =$ the radius of the peak radial outflow, and independent of altitude $$G(R_1) = \int_O^{R_1} r g(r) \, dr$$

The vertical hazard factor may be written for any point in radar range and altitude coordinates $(\theta, R, z)$ as $$F_v(R,z) = (1/V) \, g[r(\theta - \theta_o, R, R_o)] w(z)$$

where $$r(\theta - \theta_o, R, R_o) = sqrt \, [R^2 + R_o^2 - 2 R R_o \cos(\theta - \theta_o)]$$

$\theta_o =$ the azimuth angle to the center of the microburst,
$R_o =$ the radar range to the center of the microburst, and
$V =$ the aircraft air speed (Note: the convention for the influx assumes positive values for $w(z)$ when oriented in the downward vertical direction. A positive hazard factor is performance decreasing.)

For example, using the Oseguera-Bowles equations, the radial shaping function is $$g(r)_0 = exp[-(2r/W_D)^2] \approx 1 - (2r/W_D)^2$$
$$G(R_1)_0 = (W_D^2/8)\{1 - exp[-(2 R_1/W_D)^2]\}$$

and, since $2R_1/W_D$ equals 1.1212, $$G(R_1)_0 = .089 \, W_D^2$$
$$= .283 \, R_1^2$$

Using the Vicroy equations ($\alpha = 2$) ($r_p = R_1$), near the center of the downdraft ($r << r_p$)

$$g(r)_v = [1 - 0.5(r/r_p)^4] \, exp[-0.25(r/r_p)^4]$$
$$\approx 1 - 0.75(r/r_p)^4 + 0.156(r/r_p)^8 + \ldots$$

$$G(R_1)_v = 0.303 \, R_1^2$$

The remaining item to be furnished by this process 116 is the scaling of the horizontal hazard factor at the elevation angle (i.e. altitudes) of the lower bar to the elevation of the glideslope, presumably 3° or near ground level for the case of take-off. The separation of variables implies that the horizontal hazard factor at any altitude may be scaled to another altitude simply by the ratio of the peak outflows at those two altitudes, i.e. given a horizontal hazard factor function along the lower bar $$F_H(\theta, R, \phi_o) = (V/g)\beta(\theta, R, \phi_o),$$

where V = the aircraft air speed, g = the acceleration due to gravity (9.8 m/sec$^2$), $\beta(\theta, R, \phi) =$ the change in horizontal wind for a change in distance, ($\Delta u/\Delta x$) along the line of sight to the azimuth, range, elevation co-ordinate, by definition, a wind directed along the flight vector (i.e. a tailwind) is positive, $\theta =$ the azimuth angle in radar co-ordinates, R = the radar range, and $\phi_o =$ the radar depression angle of the lower bar where depression angles $\phi_o$ and $\phi_1$ have positive values for downlook geometries.

Note that the altitude of any data point along the lower bar is found from the aircraft altitude (AGL) h by $$z(R) = h - R \sin (\phi_o)$$

Considering only horizontal winds, $u(r,z) = f(r) [A - B z]$ so $\beta(r,z) = \Delta u/\Delta R = [A - B z] d[f(r)]/dR$ For the data altitude above the altitude of maximum outflow ($z > z_m \approx 100$ m.) the horizontal hazard factor may be scaled:

for radar data at $z_o(R) = h - R \sin(\phi_o) \geq z_m$
to new altitude $z_1(R) = h - R \sin(\phi_1) \geq z_m$ $$F_H(\theta,R,\phi_1) = F_H(\theta,R,\theta_o) \frac{\{A - B^*[h - R \sin(\phi_1)]\}}{\{A - B^*[h - R \sin(\phi_o)]\}}$$

if $0 < z_1(R) < z_m$, then use $F_H(\theta,R,\phi_1) =$ $$F_H(\theta,R, \phi_o) \frac{\{A - B^*[h - R \sin(\phi_o)]\}\{h - R \sin(\phi_1)\}}{\{A - B^*z_m\}z_m}$$

In general, the case where the lower bar data will include altitudes below $z_m$, i.e. about 100 m., is not expected to arise. Also, it is debatable whether the hazard factor should be represented as less than the maximum (i.e. at $z = z_m$).

In summary, mathematical details and physical principles have been provided herein which will allow estimation at any altitude of the total hazard factor along the glideslope angle $\phi_1$ from radar data at a downlock angle $\phi_o$:

$F_T(\theta,R,\phi_1) = F_v(\theta,R,\phi_1) + F_H(\theta,R,\phi_1)$ for the preferred Vicroy model, $F_v(\theta,R,\phi_1) = (1/V)[1 - .75 y^2]$ $$\left( \frac{\{a_o + h(a_1 + a_2h) + R \sin(\phi_1)\{a_2 [R \sin(\phi_1) - 2h] - a_1\}\}}{.303 R_1} \right)$$

$$F_H(\theta,R,\phi_1) = F_H(\theta,R,\phi_o) \frac{\{A - B^*[h - R \sin(\phi_1)]\}}{(A - B^*[h - R \sin(\theta_o)]\}}$$

$y = (R^o/R_1)^2 + (R/R_1)^2 - 2(R_oR/R_1^2)\cos(\theta - \theta_o),$ $R_1$ = radius of the peak outflow, (as measured by feature extraction), $R$ = the radar range, $R_o$ = the radar range to the center of the microburst (as measured by feature extraction), $\theta$ = the azimuth angle in radar beam pointing co-ordinates, $\theta_o$ = the azimuth angle to the center of the microburst (as measured by feature extraction), $\phi_o$ = the depression angle of the lower bar, $\phi_1$ = the depression angle of the glideslope, $h$ = the aircraft altitude, and V = the aircraft air speed and the other quantities are the model coefficients determined from the data of the two cases (i.e. both bars lie within the outflow or only the lower bar lies within the outflow). As previously mentioned the details of the computations will be discussed with respect to FIGS. 18A–18C.

Once the vertical hazard has been estimated and scaled 116 the system performs the detection process 118. The detection process 118, as discussed in more detail with respect to FIGS. 19A–19H, first forms the total hazard map along the glideslope of the aircraft (in the take-off mode, there will be a different angle of interest). The second function of step 118 is: i) to detect the occurrence of areas with large average hazard factors, and ii) to assess the time criticality for pilot action. The detection and assessment criteria use the definitions of forward looking windshear warning, avoidance, and caution of the SAE ARP 4102/4 (SAE Committee S-7, ARP 4102/11, rev. 1, draft 9, Airborne Windshear Subcommittee, TEAS7-6, project S7-84-8, ref. no. 88-103, May 11, 1988, Steve Schmitmejer) Through the analogy of the filtering time constant permitted for reactive (in situ) windshear sensors to reject turbulence, a linear dimension for the extent of a hazard factor is defined by the motion of the aircraft over such a filtering time. This constitutes the minimal detectable hazard for reactive systems and is applied to the forward looking sensor (as well as the false alert number). For a 5 second delay time and an 80 meter/second velocity, a total hazard factor averaging above 0.15 over an area 400 meters×400 meters along the glideslope should be declared a hazard and failure to do so is interpreted as a missed opportunity. Such a hazardous area is converted into an alert by assessing the time or range-to-go until encountering the leading edge of the hazard. Of course a hazard could be alerted if the hazard area lies near, but not on, the glideslope. Different kinds of alerts may be issued based on the need for immediate pilot action. Any hazard within the azimuth scan of the radar is to be equally avoided. All detection problems involving stochastic phenomena will admit to false alarm potential, i.e. alerts issued when in fact there is no dangerous condition. In general, false alarms may be reduced or eliminated by additional test criteria. For example, a pixel with a large hazard factor may be dismissed as a false alarm (i.e. non-microburst) if that cell furnishes contradictory evidence, e.g., a large reflectivity in the lower bar outflow with an absence of a suitably reflective precipitation core.

The first operation of the hazard detection process 118 is the formation of a scaled total hazard map along the glideslope. Since the identification of microburst candidates excludes overlapping downdraft cores, the vertical component of the hazard factor is separately calculable in azimuth and range. A loop over the candidates initializes the total hazard map with the vertical component. Each candidate centroid and downdraft radius is used to define an azimuth and range extent for vertical hazard factor determination. To restrict false alarms, horizontal hazard factors are obtained only for those cells lying within a small multiple of the candidate outflow radius. Hence, the total hazard factor map utilizes only loops over pixels within a locus of the candidates. It is possible that this operation could be changed to allow perception of all horizontal hazard pixels by the hazard detection window. For each pixel within the candidate downdraft locus, the vertical hazard factor is determined using the Vicroy model for radial dependence within the downdraft. This necessitates determination of the range from the downdraft core centroid to the field point within the outflow. Both the horizontal and vertical hazard factors are computed for the appropriate altitude at that radar range for the glideslope. Two important aspects of hazard detection are averaging in the range dimension and control over the cross range window size. In the range dimension, a window for computing the average hazard factor is maintained on the center of the range in question. This will provide some overlap into (leading and trailing) neighboring range gates. The total hazard factors of these neighbors are weighted according to their proportion of area within the warning range scale window. In the azimuth dimension, the centroided azimuth swath is used for computation of the average hazard factor. Consequently, range pixels at the edge of the scan coverage will not have average hazard factors computed. Only those pixels which lie sufficiently interior to the scan boundaries will be allowed to form hazard indications. For each range gate index of the centering window, a swath, is determined. For each azimuth centering slice index, a relative window is constructed in azimuth slice index space. This window is computed for the centering range gate index and is not adjusted for the neighboring range gate indices. The hazard detection and sorting makes explicit use of the range ordering of the sliding window process. Only the nearest hazard of any single category will be reported. If a warning alert situation is detected, the process ceases immediately and the output includes the time to go to the nearest range of a qualified hazard (within the azimuth scan) without consideration of whether the flight path actually intercepts the hazardous area.

Figure 8A:
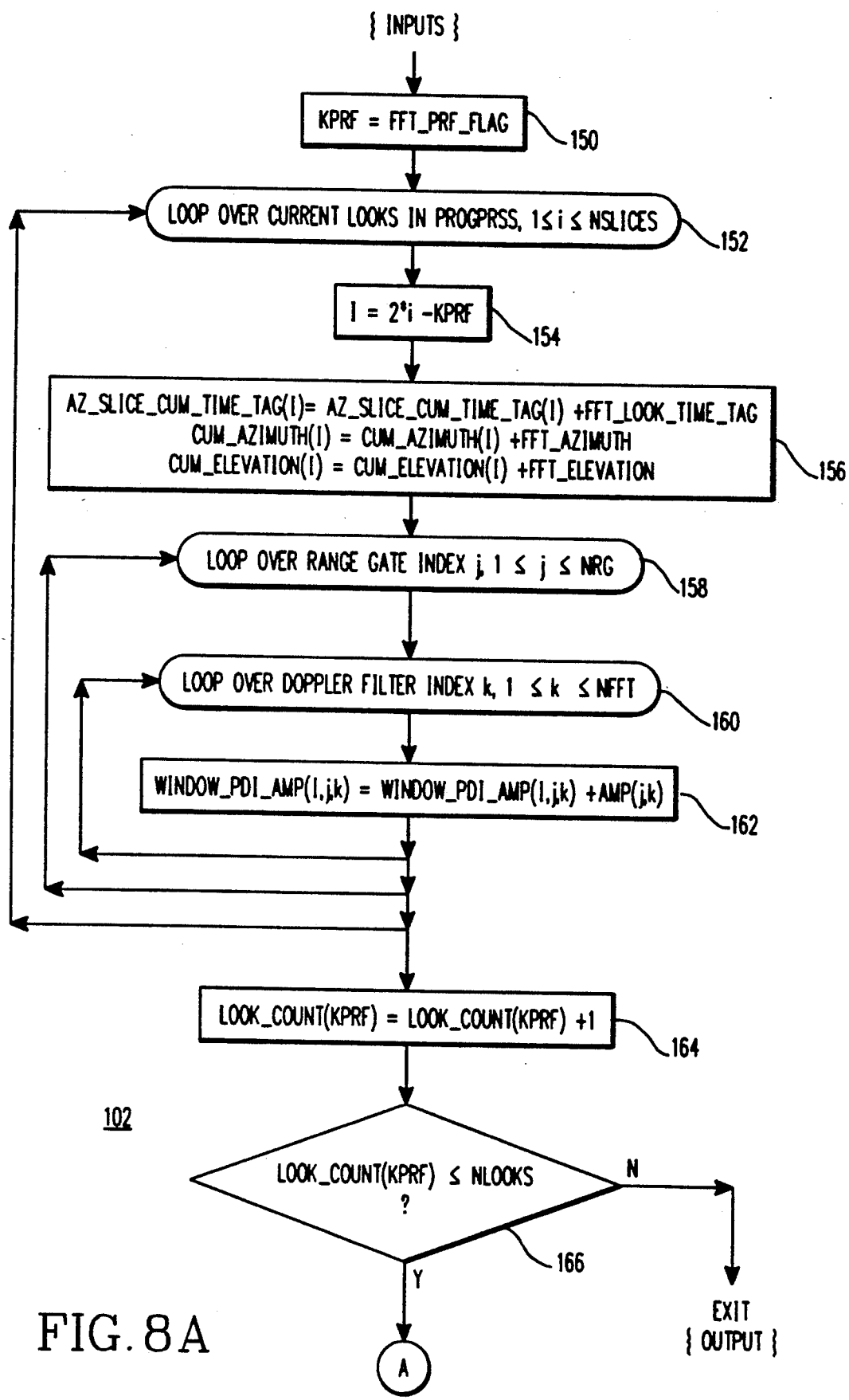
FIG. 8A-8C illustrates the sliding azimuth post detection integration processing 102.
Figure 8B:
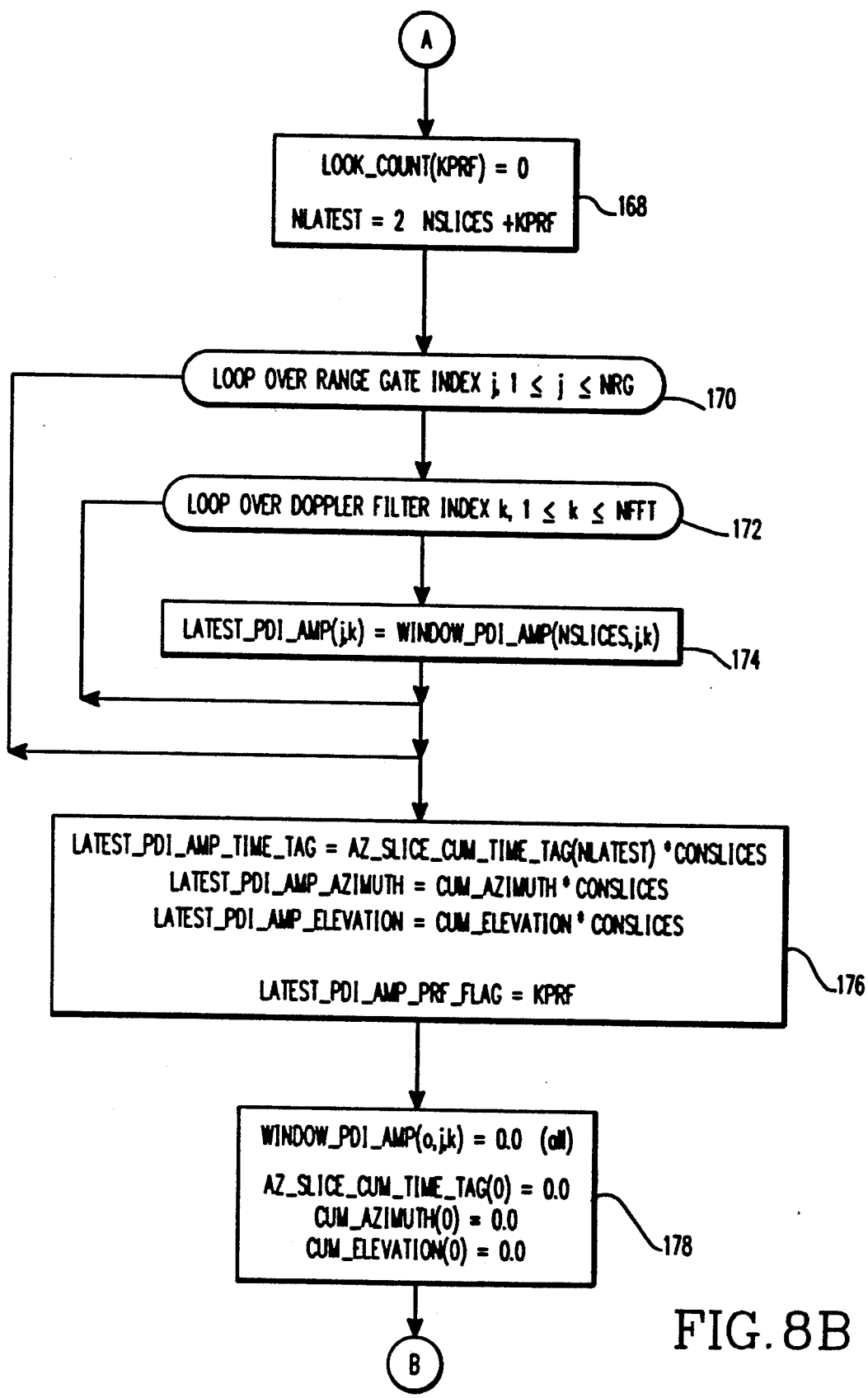
Figure 8C:
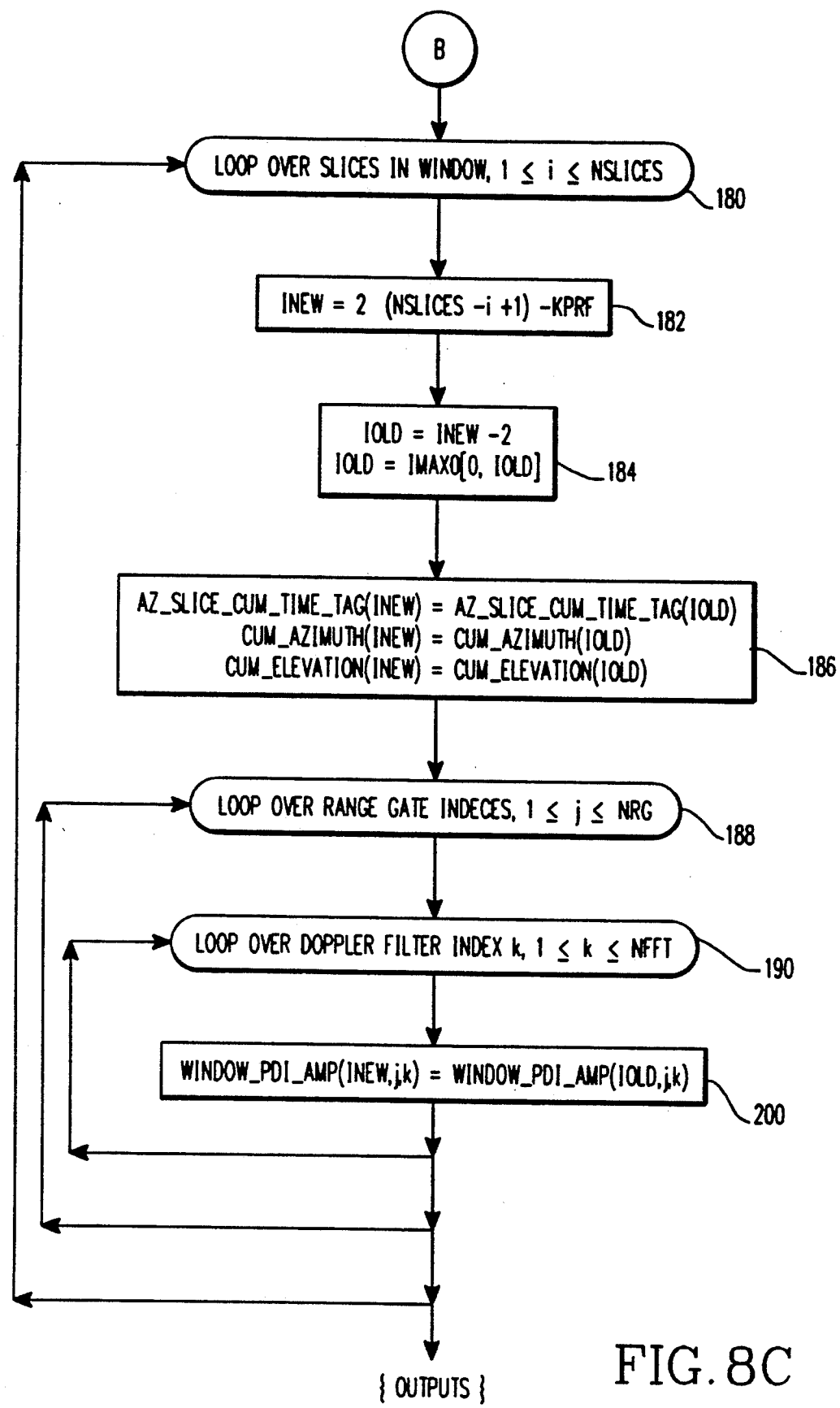

The sliding window of step 102, as illustrated in FIGS. 8A-8C, maintains concurrent post detection integrated (PDI) for a number of azimuth slices (the minimum angle step of output PDI data) during the dwell time of the antenna beam during its scan. When a slice has been completed an output record is written. Upon bar initiation the vector of PDI amplitudes is zeroed and the process 102 outputs the completion of a single look. In this process the slices are accumulated with respect to the PRF. There are a total of two times the slice number of PRF respective slices in the sliding window. An azimuth sliding window has been used for ground mapping in military aircraft. The process 102, as used in a weather radar, begins by setting 150 a flag which indicates whether the PRF being processed is the high or low PRF where zero indicates the high PRF. The system then enters a loop 152 which is executed for the number of azimuth direction slices being accumulated. Next, the system computes 154 a PRF index for accumulating the slices. In step 156 a cumulative time tag counter value for estimating the nominal time center of the azimuth slice is calculated along with the cumulative azimuth and elevation of the look in the respective PRF PDS PDI slice for estimating the center azimuth of the line of sight and the cumulative value over the PDI looks of the window slice of the elevation angle. The system then enters a subloop 158 which is controlled by the number of range gates in the FFT range swath for the microburst detectio,n. The system then enters a further subloop 160 controlled by the number of time samples in the corner turn memory. In step 162 the envelope amplitude for the range X Doppler matrix of the azimuth slice of the integrated data is computed. The system then updates 164 the look count and tests 16 the look count to determine whether to exit. The look count is the total number of looks which have been integrated into the current azimuth sliding window configuration respective of the PRF. An index value of zero in the look count indicates the count for the high PRF while an index value of one indicates the low PRF count. When this value has been incremented and equals one, an output is written and the azimuth window indexing will slide forward. Next, the look count is set 168 to zero and an index pointer to the most recent slice is computed. The system again enters the range gate 170 and time sample 172 loops to store 174 the ordered matrix of range gate by Doppler filter amplitude data for each slice of the accumulation. The system then computes the averages 176, with a multiplicative constant being used to avoid division where the multiplicative constant is one divided by the number of slices for a PRF in the sliding window, and the PRF flag is stored. In step 178 the accumulation values are zeroed. Steps 180-200 slide the window pointers, flags and amplitudes forward in anticipation of the next operation.

The oriented, modified, ordered CFAR detection process 104 employs a bow tie or parallogram shaped window (FIG. 9) to defeat edge detection of the windshear. The amplitudes of the cells within this window are sorted in a specific efficient fashion to produce a modified ordered statistic CFAR threshold. (For reference to ordered statistic CFAR, see H. Rohling, "Radar CFAR Thresholding in Clutter and Multiple Target Situations", IEEE Trans. AES, July 1983, p 608-621 incorporated by reference herein). This type of CFAR is robust in detecting local thumbtack "discretes" and avoiding detecting edges of extended range—Doppler weather. The drawback of ordered statistic CFAR is that a number of logical sorting operations must be within the repertoire of the machine. The term "modified" indicates that the selection of the local estimate for computing the threshold is not a strictly ordered quantile result. Rather, a sequence of simple comparisons produces an estimate which is biased above the median in edge conditions, away from the maximum extreme in multiple target cases, and approaches the average value CFAR in noise. The CFAR window (FIG. 9) for a given, "normal" cell is defined to contain the narrow ridge of threatening windshear return over robust perspectives (i.e. including a non-radial cast through the microburst with reduced windshear). This locus is delineated in FIG. 9. For the selected co-ordinates, an increasing range gate index forms the ordinate and an increasing Doppler velocity forms the abscissa. The diagonally symmetric outrigging areas of the CFAR window span the family of windshears of example hazards with index slopes deltax/deltay from 1:1 to 7:1 (scale to hazard factor for 300 m range gates, 1.88 m/sec filter spacing, and 80 m/sec aircraft speed is about 0.0512/sec., horizontal hazard factors of 0.05 to 0.35 respectively), i.e. the more horizontal the ridge of microburst outflow return, the more dangerous. The outriggers include a "wedge" to intersect the peak windshears. The lowest windshear corresponds to a total hazard factor approaching 0.10 with a horizontal contribution of 0.05 (wet). The first Doppler layer in the outrigger lies 2 Doppler filters away from the center cell and extends in range from the range gate of the center cell to include the range cell 2 indices in front of the center cell. The outer Doppler layer also consists of three cells, lying in Doppler adjacent to the inner layer but leading the inner layer by one range gate. Each of these four layers nominates an amplitude for the eventual ordered statistic from which the detection threshold will follow. For each layer, the minimum and maximum values are discarded. The median amplitude cell is then nominated. The ordered statistic then is chosen as the maximum of the layer nominations. It may be observed that this process will select a cell "colored" by a windshear ridge for the range of expected windshears. Selection of a cell containing wind blow rain will desensitize detection of the microburst windshear edge.

FIG. 9 shows the amplitudes of fourteen cells of the CFAR window for the 32 pt. FFT (approx. 4 KHz.

PRF, 300 m. range gate). The two lines 210 and 212, which define the window orientation, represent the ridge of larger amplitude return from windshears with horizontal hazard factors 0.05 and 0.35. The tables 1 and 2 below indicate which cells would be selected as median for each iso-Doppler layer as well as the final result from selecting the maximum across the layers. First the medians within each Doppler index of the oriented window are selected performing the ordering of the process. The maximum of the medians is selected, thereby modifying the ordering, and then tested against the threshold. If the threshold is exceeded the return is set to the local average.

TABLE 1

| | F = .05 (wet, min. hazard) | | |
|---|---|---|---|
| cell no. | min. | median | max |
| [7,6,5] | 5 | 6 | 7 |
| [4,3,2] | 2 | 3 | 4 | max(6,3) = 6

TABLE 2

| | F = .35 (dry microburst) | | |
|---|---|---|---|
| cell no. | min. | median | max |
| [7,6,5] | 7 | 6 | 5 |
| [4,3,2] | 4 | 2 | 3 | max(6,2) = 6

For windshear less than 0.05, the two cells labeled "1" become important. For larger windshear, they will contain noise and the lesser of the two should not influence the selection of the statistic. For smaller windshear than 0.05, i.e. the edge of downdraft/outflow with tangential perspectives, the cells labeled "3" and "6" may contain less windshear than the cell labeled "1". Selection of the lesser of the two cells "1" avoids de-sentization due to multiple targets and will pass core-outflow cells. The case of the center cell lying at the peak outflow speed places one group of seven out-rigging cells in noise only and should result in the lowest threshold value (most likelihood of detecting and editing) for the outflow. The repetition of determining the median for each layer can be minimized by forming a separate matrix of medians for each layer centering cell. This insures that the logical and sorting operations for the median of the centered layer are not repeated when the layer result is required for different CFAR windows. Detection of less threatening features of the microburst is de-sensitized by a single out-rigger located in Doppler between the inner layer and the center cell and leading the center cell range gate index by 2. These cells will allow the threshold logic to select a cell lying on or near the windshear ridge for radar geometries with non-radial cuts through the microburst (i.e. windshear ridges of less dangerous slope but desired for microburst extent features). The minimum of these two cells is included as layer nomination.

This process 104 as illustrated in FIGS. 10A–10F uses a conventional matrix processing approach. The dimensioning of the arrays and vectors are off-set extended and, for convenience in describing the operation and design, utilize negative and null subscripting. A scratch matrix is constructed with zero amplitudes values inserted for cells within the notch and outside the normal domain of range gate and Doppler filter indices (cells with PDI amplitude data within the notch or across the notch are not accessed). A detection list is formed using the amplitudes of the scratch matrix. The amplitudes of these detected cells are replaced with a local average value respective of that cell (since the median data have already been formed, editing will not effect subsequent cell detection). The addressing of the scratch matrix is conducted along the diagonal of the CFAR window. This diagonal is a function of the filter bandwidth and range gate ratio and should be changed if different constructions are employed than the 32 pt. FFT, 4000 Hz. PRF, and 300 m range gate. This addressing, however, furnishes an opportunity of economy in the "modified quantile" operation by re-using partial results. The "modified" ordered statistic furnishes a value analogous to the CFAR window average value. It is multiplied by a scaling constant to control the false alarm probability in a uniform Rayleigh (exponential) distributed background. A value of 6.8337 is selected as the CFAR threshold multiplier constant. That selection is based on the assumption that there are about 7 independent samples and the selection process approaches a $\frac{3}{8}-\frac{7}{8}$ quantile ordering. For a, 0.000001 pfa (probability of detecting/editing a cell when only noise is present), Rohling gives a multiplier of 46.7 for signal-to-noise based calculation (we take the square root). Range - Doppler cells which have been detected by the "modified" ordered statistic CFAR threshold are edited to form an output amplitude matrix by replacing their amplitude with an approximating average of neighboring cell amplitudes based upon the ordered statistic. With respect to this operation mainbeam clutter is positioned at 0 m/sec Doppler by the clutter reference oscillator offset in the transmitter 52. In these figures notch corresponds to the region of mainbeam ground clutter and in the upper bar notch=0.

The process 104 begins by determining 230 which elevation bar is being processed since the upper bar could use slightly modified CFAR processing and setting 232 and 234 an appropriate index where the lower bar notch is an index for the half width in the Doppler for rejection of mainbeam clutter along the lower bar and the function of the azimuth scan angle and the upper bar notch is the index for the half width in the Doppler rejection for the mainbeam clutter and is zero since the upper bar has negligible mainbeam clutter. The notch value is then tested 236 to determine whether the scratch matrix needs zeroing. If the scratch matrix needs to be zeroed because of lower bar processing, the system enters a series of loops 238 and 242 during which the scratch matrix is zeroed 240 and 244. Next the system enters into loops 246 and 248 in which the outer range gates are zero filled to allow for null and negative subscripting and the scratch matrix is zeroed 250. The system then enters into indexing loops 252 and 254 during which the post detection integration amplitudes are transferred 256 into the scratch matrix. Next a series of loops 258 and 260 are entered in which the layer centered medians are formed by storing 262 the scratch matrix contents into three variables. The variables are used as parameters in a subroutine AMED which conventionally determines 264 the median value in a non-ordered set. The parameters are reset 266 and the routine is called 268 again. Next, indices are appropriately set 270 to allow the process to be conducted in a half Doppler space fashion which proceeds outwardly from the notch. For each half, there is address calculation which in one case is incremented and the other decremented. The system then enters loops 272–276 in which the addressing parameters will be altered at the end of the first loop in which a determination is made of the ordered statistic CFAR threshold using the layer center results previously stored. During this set of loops the index is updated 278 and parameters are loaded 280 for calling 282 a conventional subroutine which selects the minimum in a two member non-ordered set. The parameters are reset and new parameters are set 284 to medians and the threshold is determined 286 using a conventional routine which selects the maximum value from a non-ordered 5 member set. The selection is multiplied by a multiplicative constant for converting the modified ordered statistic result into a threshold constant controlling false alarm. For a 14 cell CFAR window with 8-9 independent samples in a modified statistic process which produces a result near 0.75-0.82 quantel, an envelope multiplier of 6.8337 is preferred. The system then performs 288 the detection operation and appropriately sets 290 the detection matrix 292 and counts 292 the number of detections. The contents of the range cell are corrected 294 which uses a multiplicative constant to convert the modified statistic result into an estimate of the value of the amplitude in the window for uniform noise background. The indices are then updated 296. The system then writes the output data list for the positive and negative velocity data where the output data is packed in a range by velocity matrix where the Doppler subscript 1 contains the zero velocity filters subscripts 2 through 0.5 NFFT+1 contain headwinds increasing in magnitude and 0.5 . NFFT+2 through NFFT+1 contain tailwinds increasing in magnitude. This is accomplished using two loops 286 and 290 during which the scratch matrix contents are transferred 288, 292 and 294 to produce an ordered matrix of range gate by Doppler filter amplitudes for each slice of th accumulation. The last step 296 is to store tags, pointers and constants including the relative time tag since the bar started identifying the time of the center of the PDI, the centroid azimuth for the looks in the PDI amplitude data, the centroid elevation for the looks in the PDI amplitude data, the flag for the PRF of the PDI data and the flag indicating whether the current elevation is the upper or lower bar. The final step 296 completes the output record by transferring the output record, the time tag and the averaged angle data which accompanied the input. This may be viewed as an explicit effort for pipeline processing to prevent time skewing of portions of input data with each other.

Figure 17A:
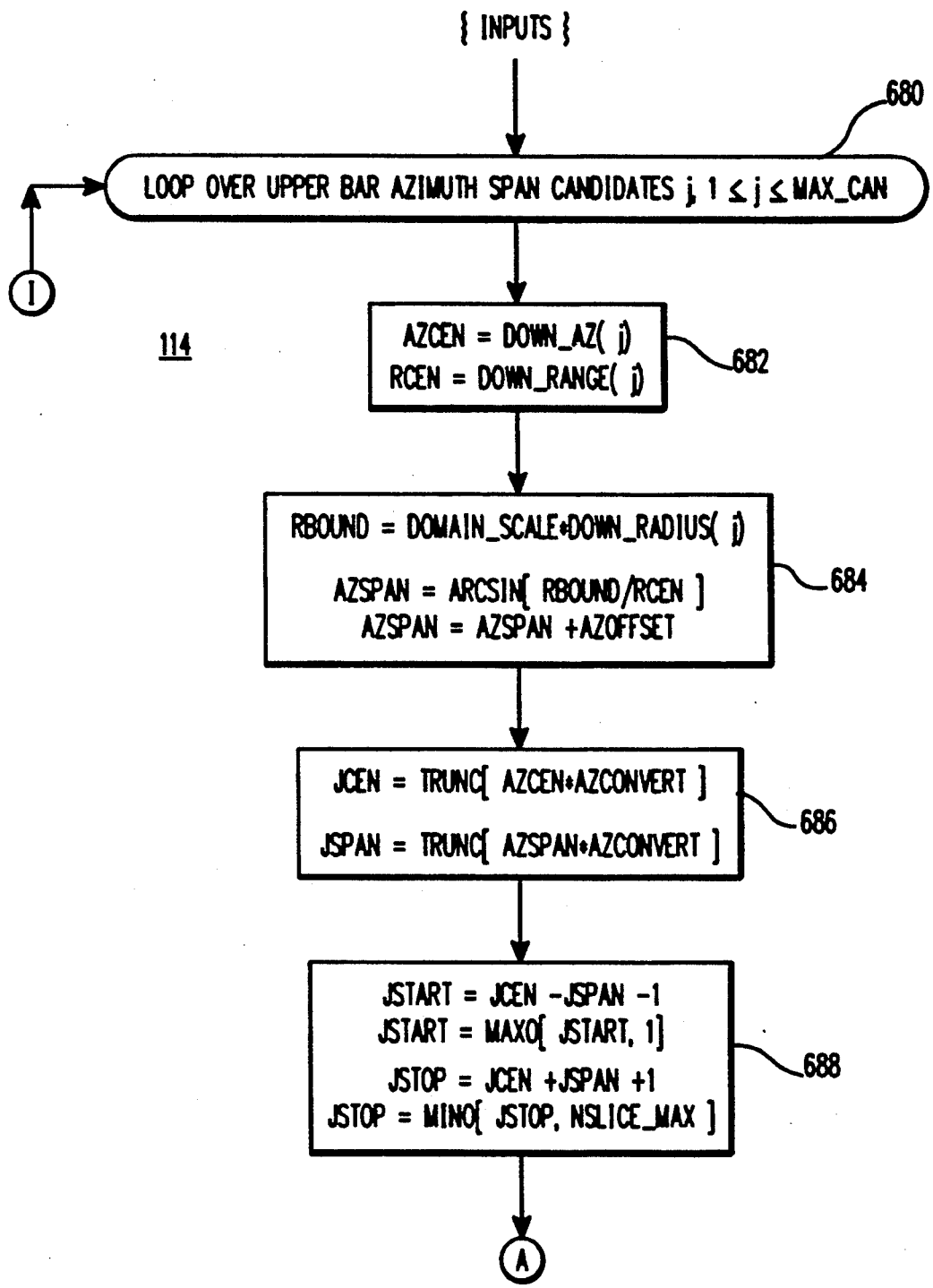
FIGS. 17A-17G illustrate the upper and lower bar combination process 114.
Figure 17B:
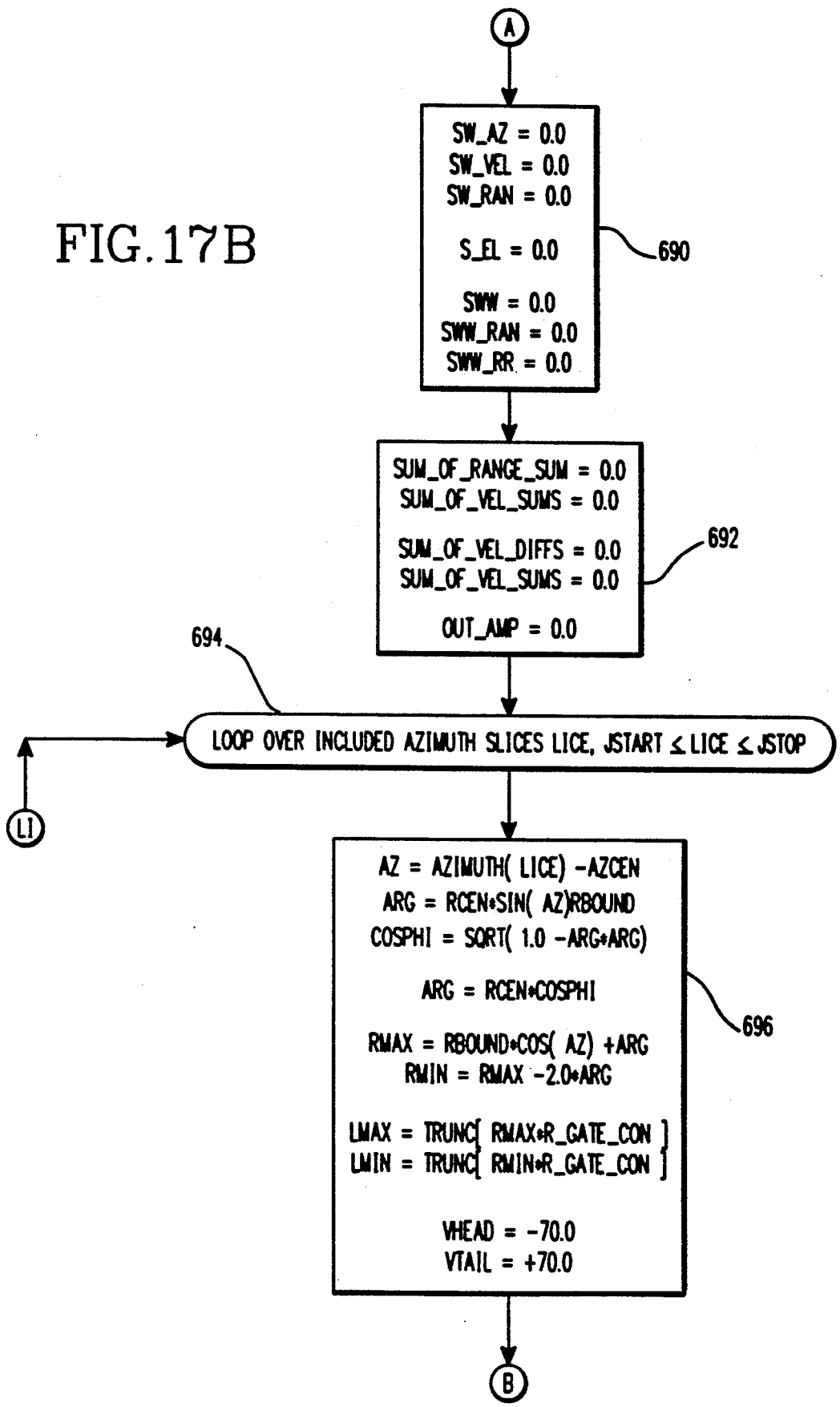
Figure 17C:
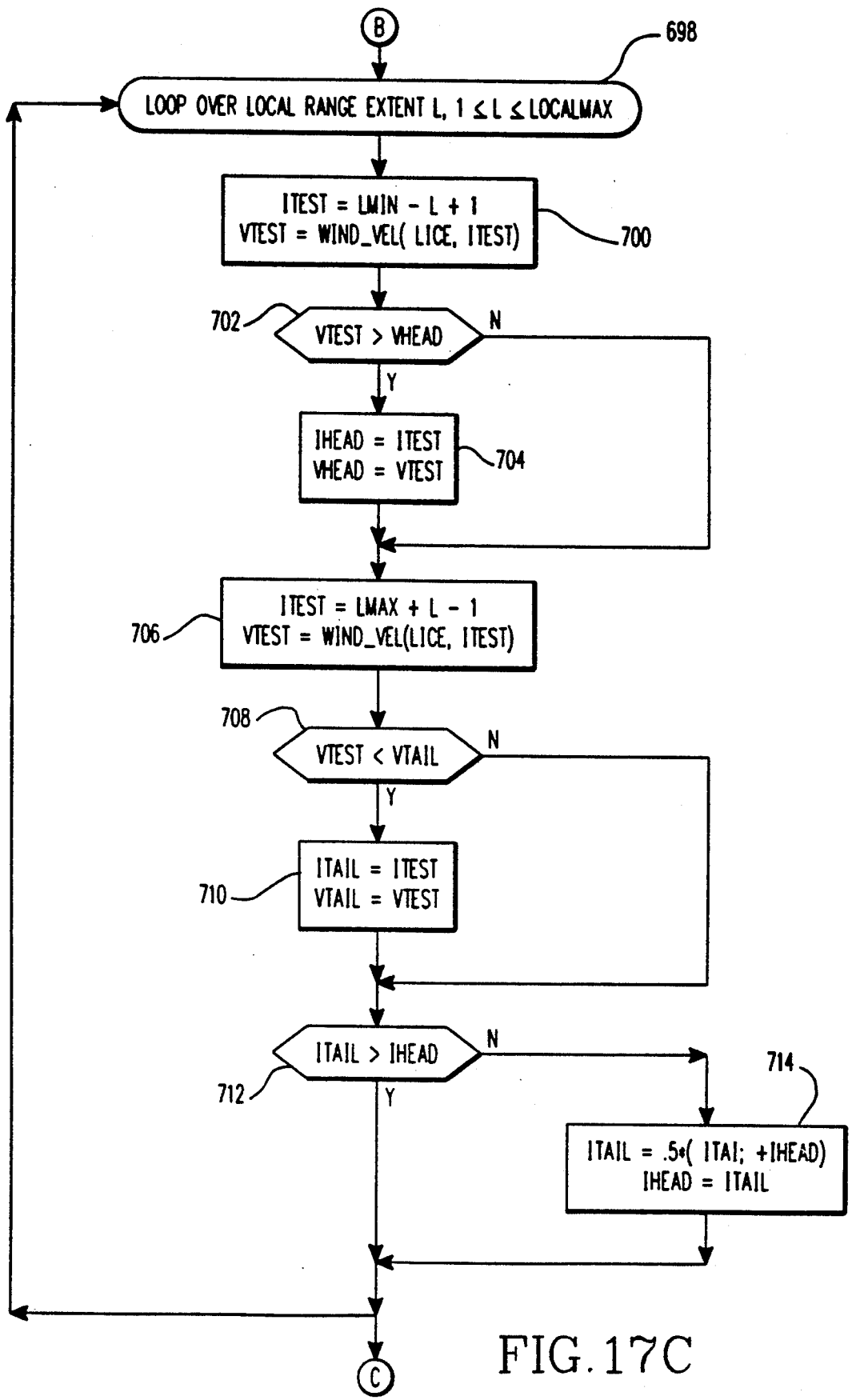
Figure 17D:
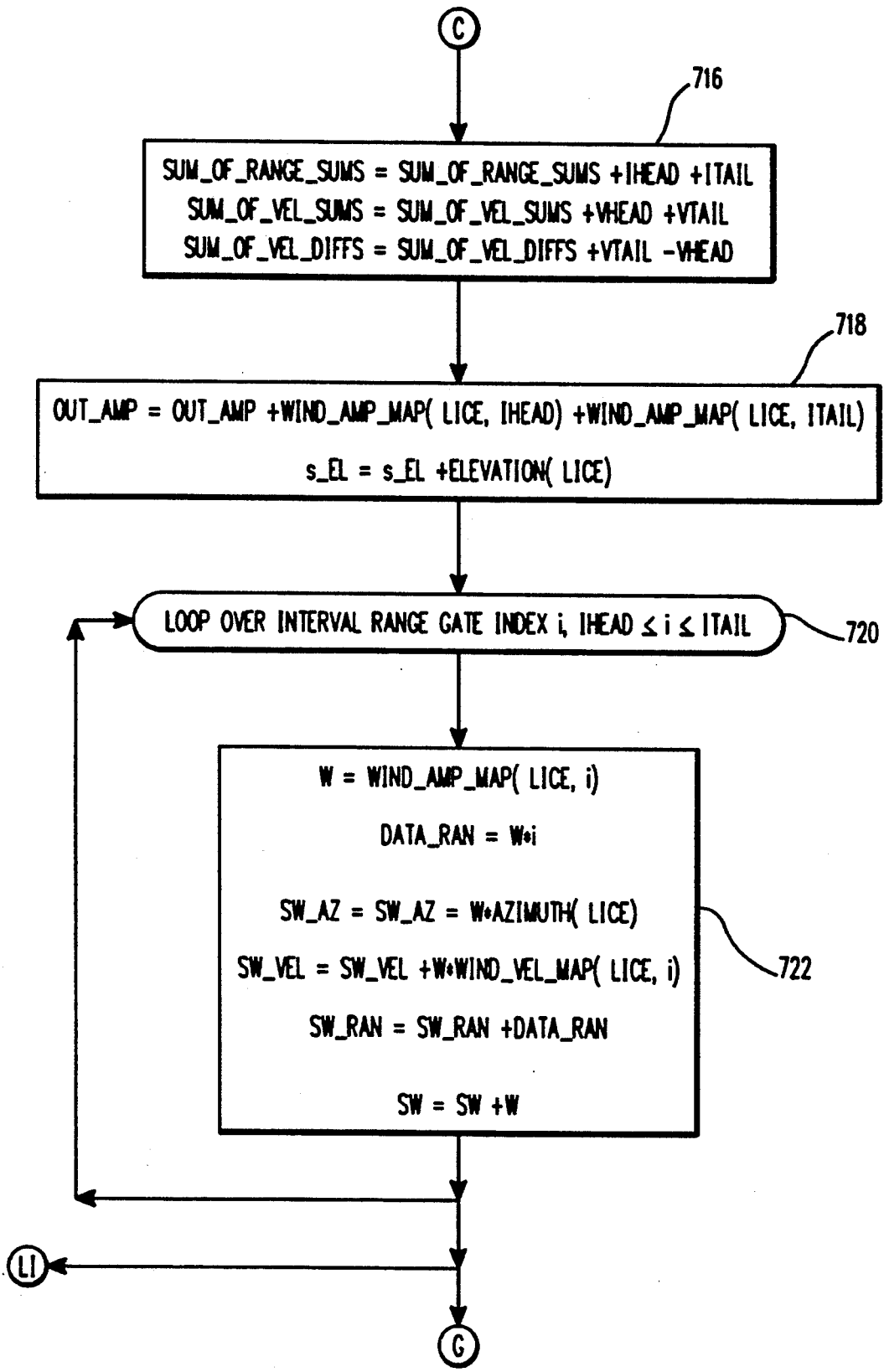
Figure 17E:
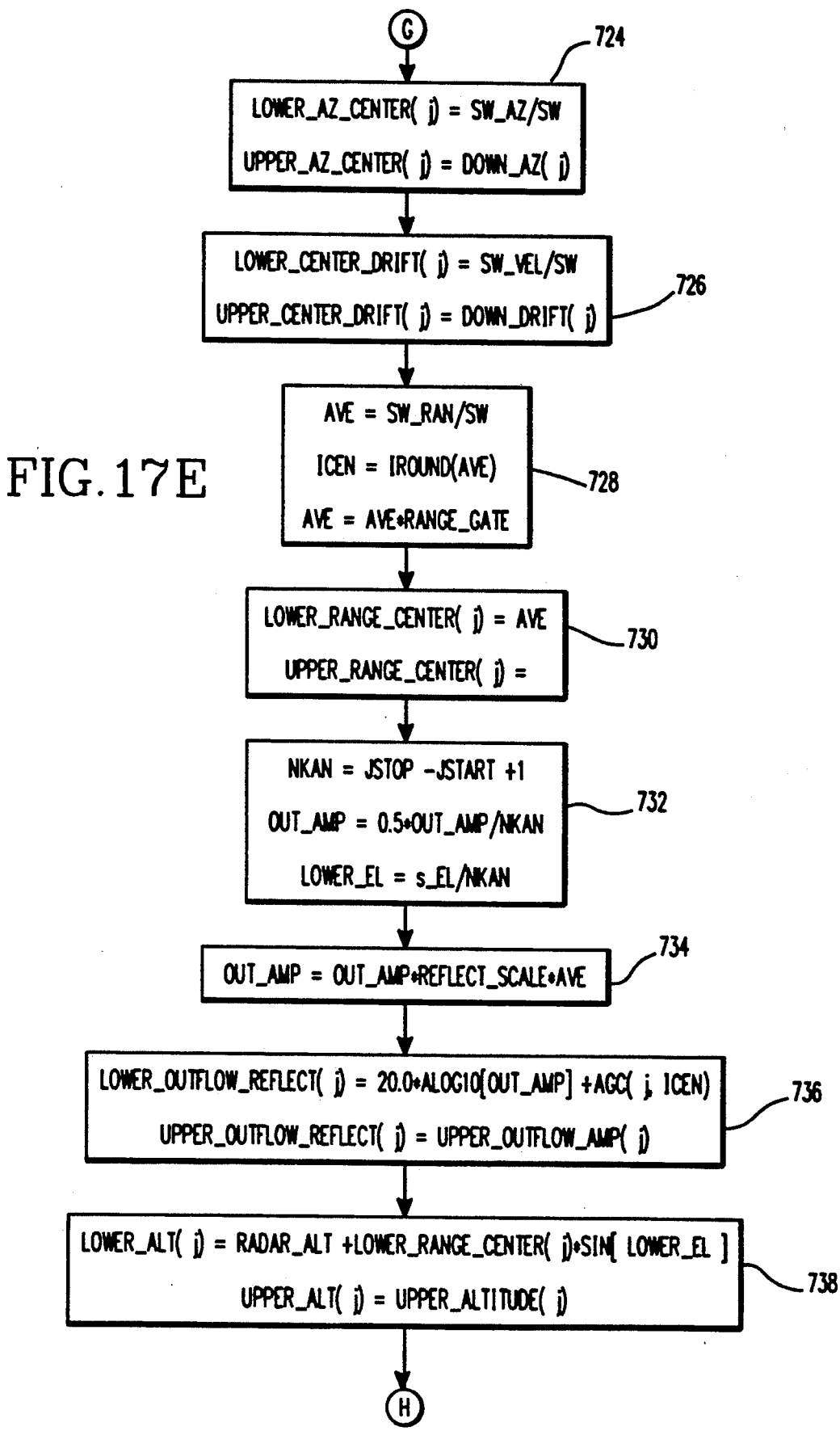
Figure 17F:
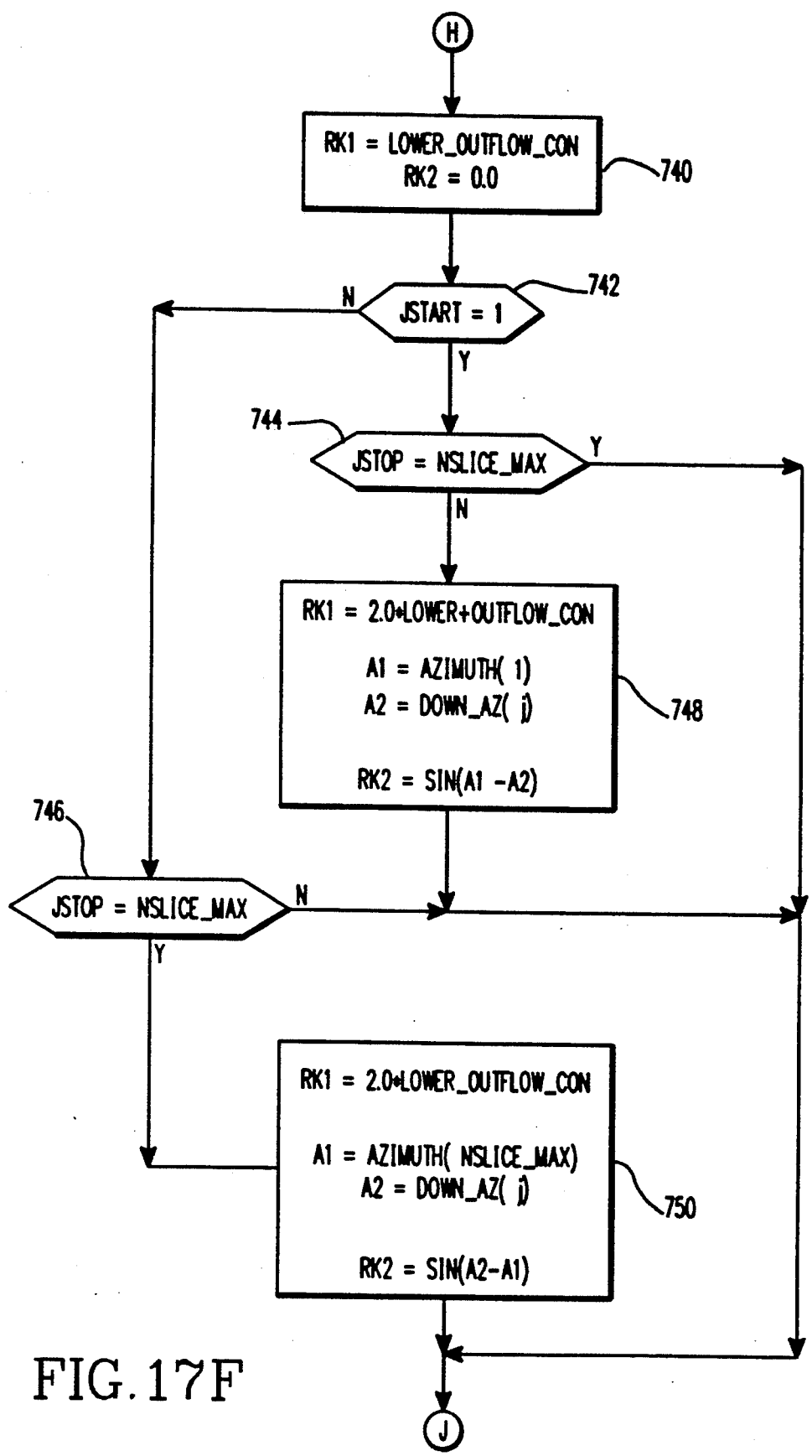
Figure 17G:
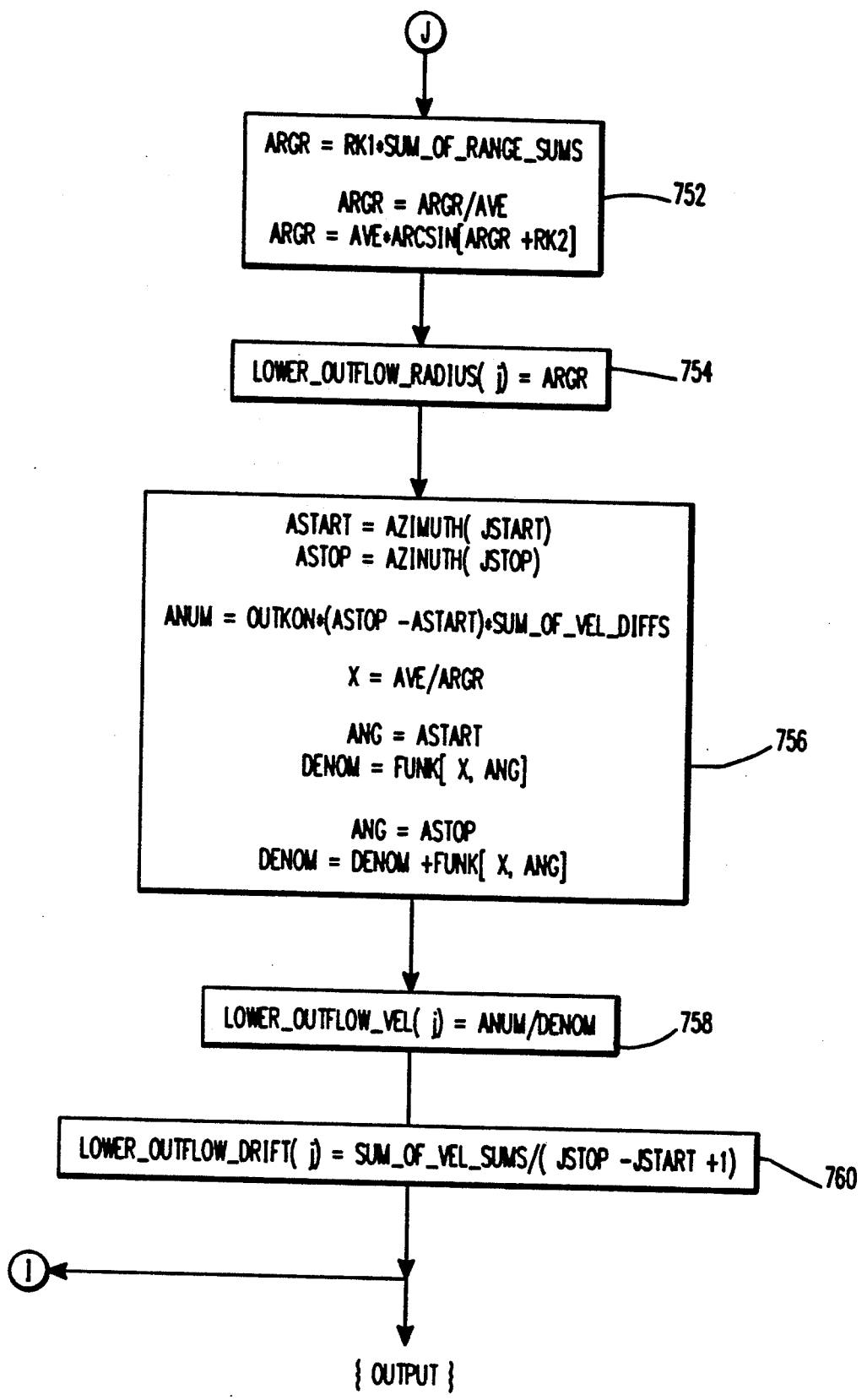

The process 106, as illustrated in FIGS. 11A-11E, consists of a loop over the range gates where within each range gate each edited and corrected Doppler cell amplitude is amplitude thresholded to prevent excessive noise contribution and then assigned a velocity based upon its Doppler filter index and a PRF dependent constant. During the processing the intermediate results are retained and output to be used subsequently when combining the weighted mean velocity of the two differing PRFs. The process starts by initializing 320 the variables to zero and testing to determine whether the high or low PRF data is being processed 322. If high, one scale value is set 324 and if low another scale value is set 326. The low scale value is used for converting the filter width of the low PRF FFT data into velocity data and for a PRF of 3597.1223 hertz at the X-band frequency of 9345 megahertz and a 32 point FFT filter this value is 1.804 meters per second. The high scale value for a PRF of 3937.0079 hertz is 1.969 meters per second. The system then enters the range gate loop 328 setting 330 the number of samples, the sum of weighted data, the sum of weights, the sum of squared weighted data, the sum of squared weights and the sum of the squared weighted squared to zero. The Doppler index loop is entered 332 followed by a test 334 to determine whether the entry in the ordered matrix is greater than the minimum amplitude which will be allowed to enter the weighted mean velocity calculation. Since the FFT data was scaled on output to place noise at 1.4 quanta and the PDI process has used no scaling (that is noise lies at 1.4×the square root of the number of slices), a threshold of 3.0 dB signal to noise corresponds to a signal plus noise amplitude of 2.45×the square root of the number of slices quanta. Next, the index counter which counts the number of samples is incremented 336 followed by a test 338 to determine whether the loop count over the Doppler index is greater than 1 plus 0.5 times the number of FFT samples which is the boundary on the index interpretation for positive and negative Doppler velocities. In the presence of a prevailing wind bias, this boundary may be appropriately translated at the executive level by altering the supplied control word neohalf by the number of filters equalling the Doppler component of the prevailing wind. If so, the velocity is set 340 at the negative, opening interpretation or set 342 to the positive, closing scaled value. The setting of the velocities in these steps 340 and 342 could take into account the drift of the microburst by adding the upper outflow drift value determined in step 550 (FIG. 15I) or 760 (FIG. 17G). Next the system sets 344 the latest edited PDI amplitude as the weight and then produces the weight times the velocity. The system then computes 346 the accumulated statistical values. Next, the PRF slice statistics are computed by testing 348 and 350 the samples counter and producing 352-356 the slice statistics. Then the system stores 358 and 360 the latest values The system, in step 362, compares the latest average velocity with the latest PRF headwind and if the velocity is greater the latest headwind is set 364 to the average velocity. A similar operation 366 and 368 is performed for the tailwind and the values produced are stored 370 for output.

Figure 12A:
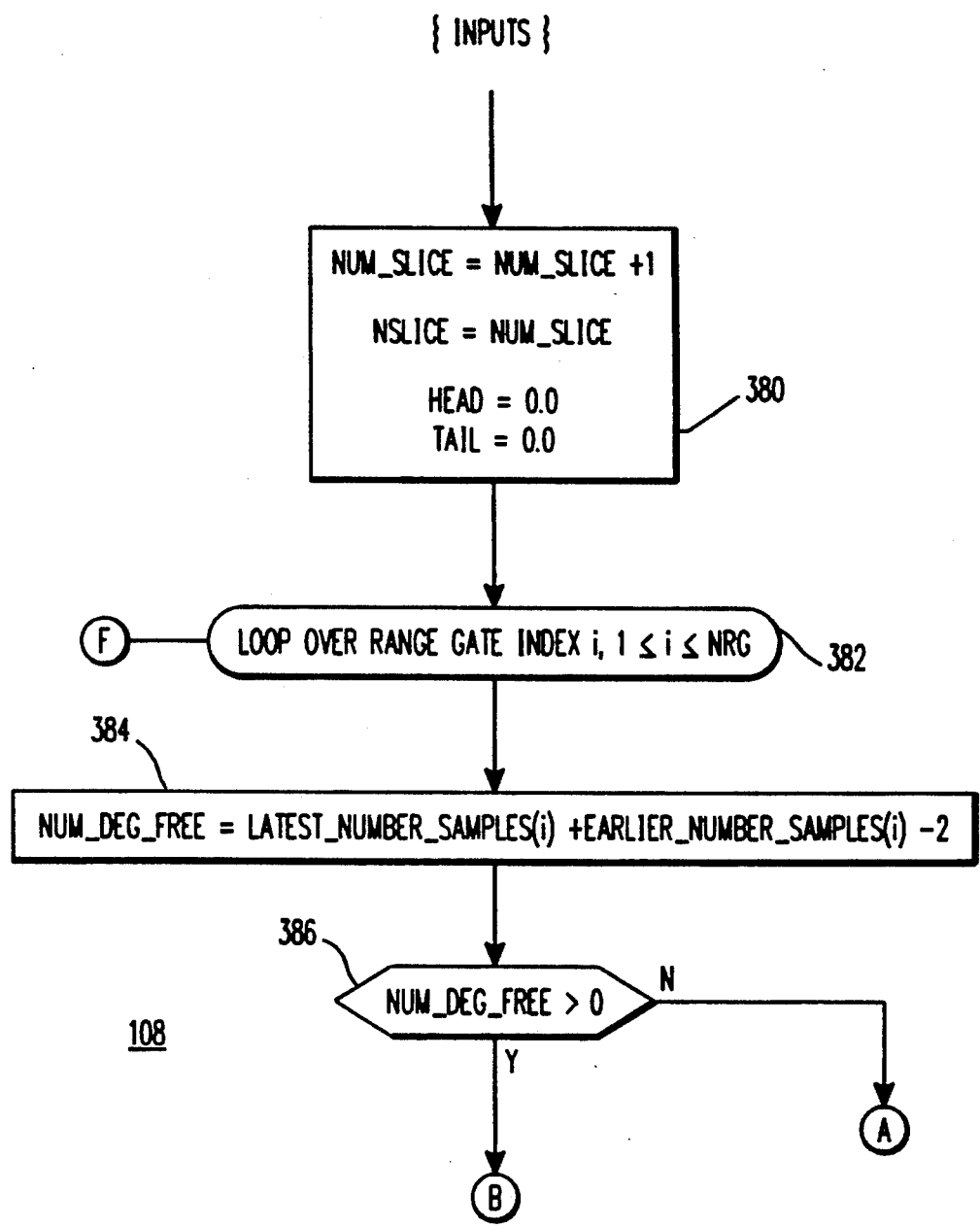
FIGS. 12A-12F illustrates the slice wind map production operation 108.
Figure 12B:
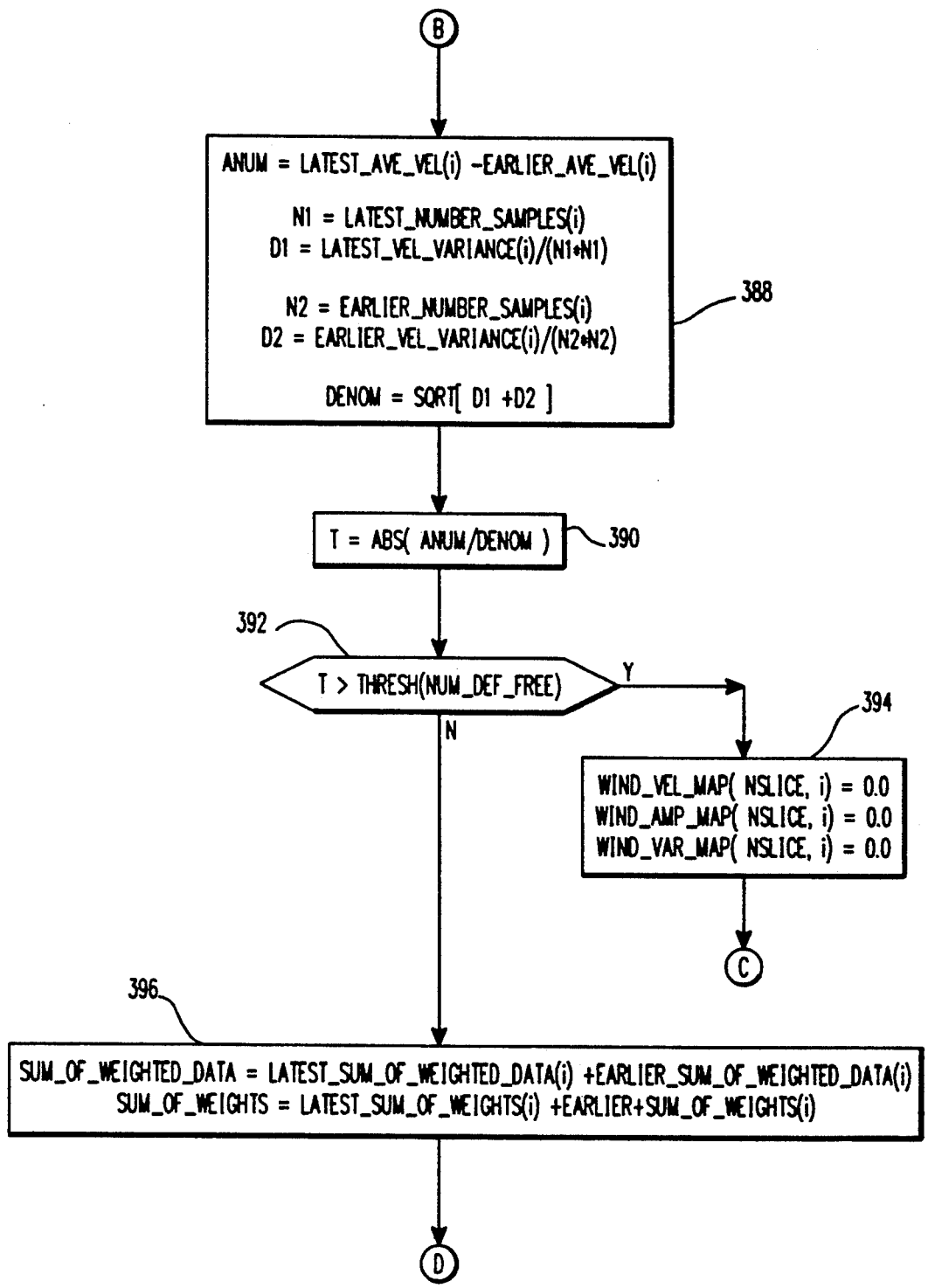
Figure 12C:
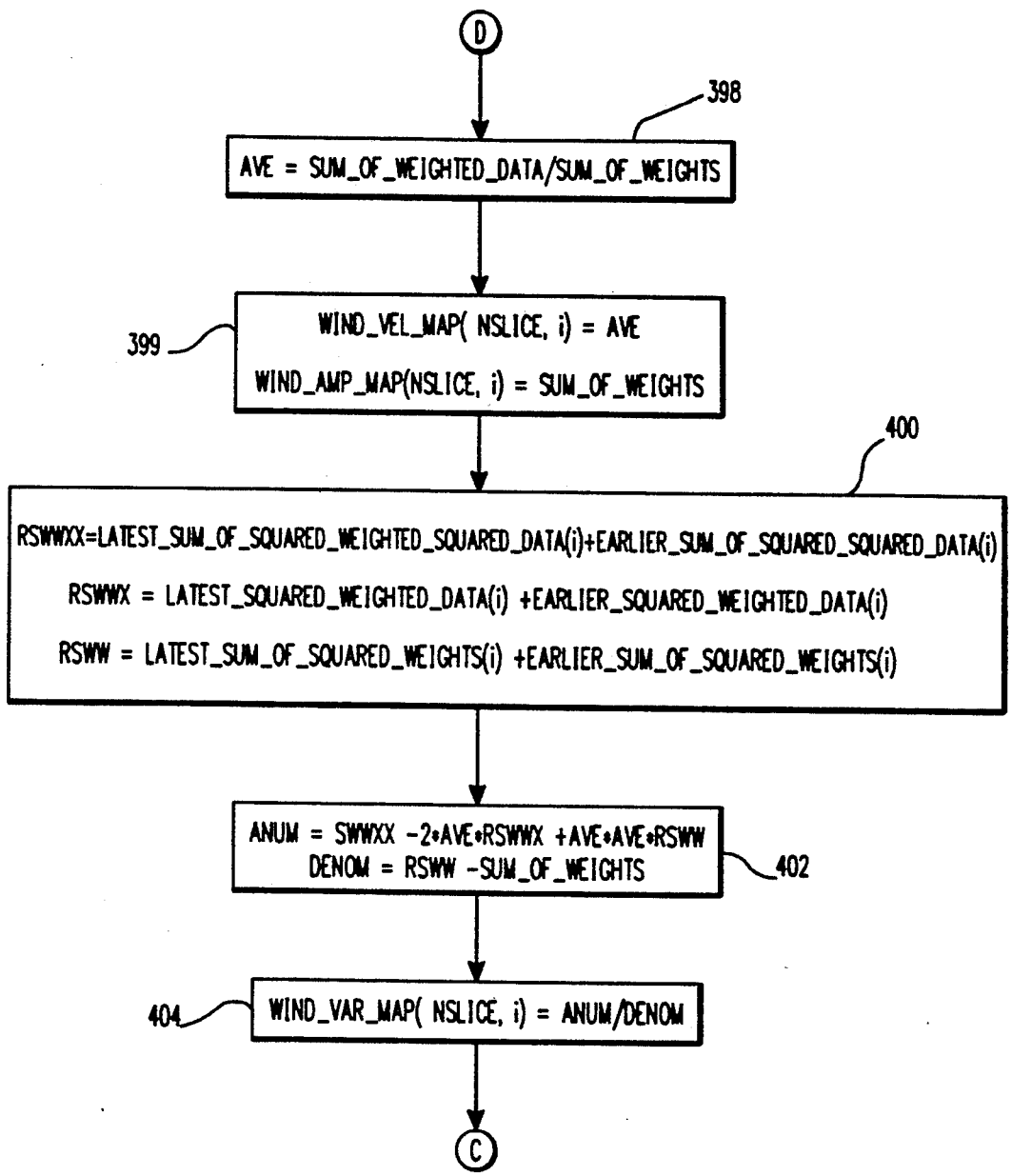
Figure 12D:
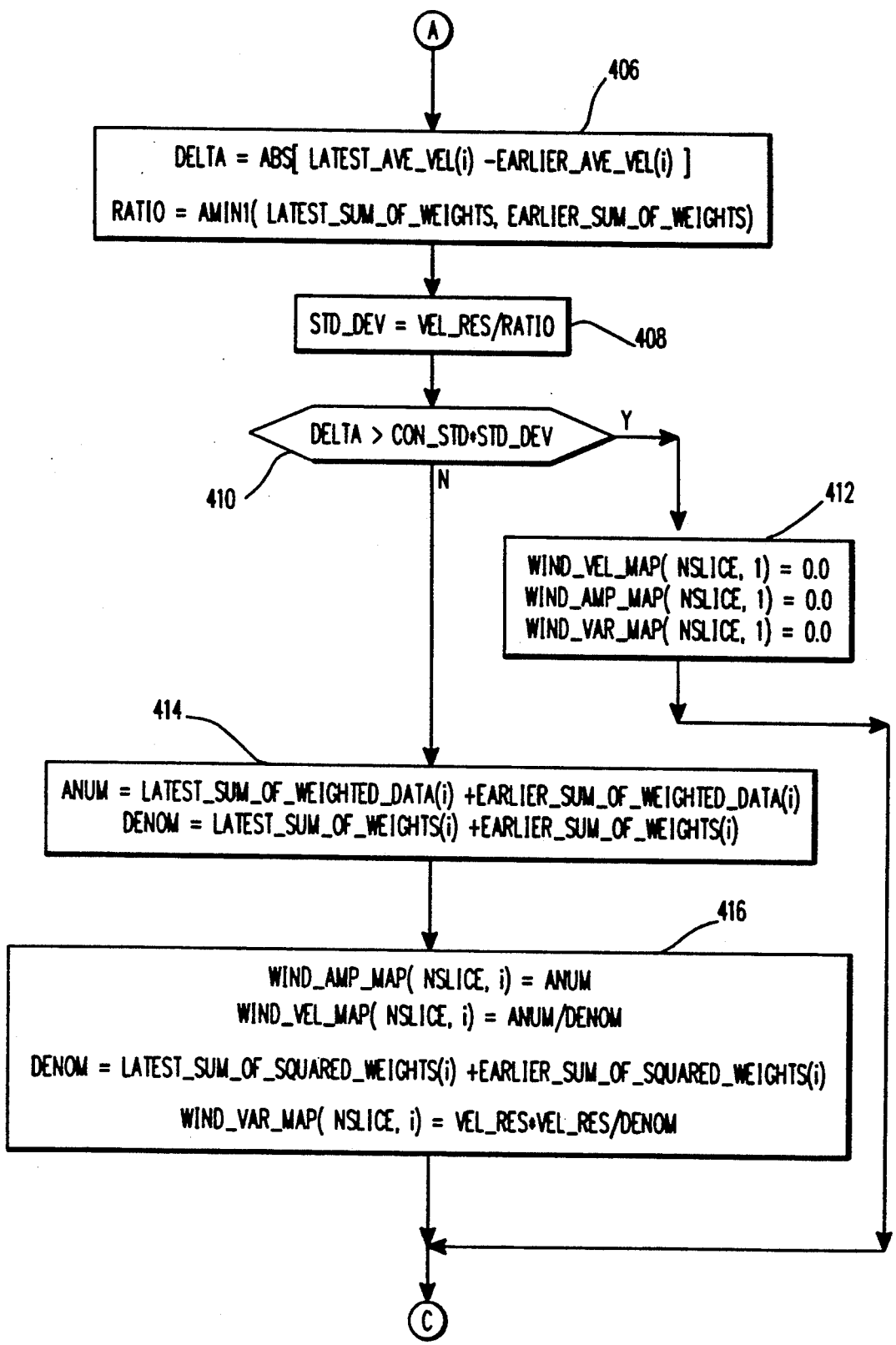
Figure 12E:
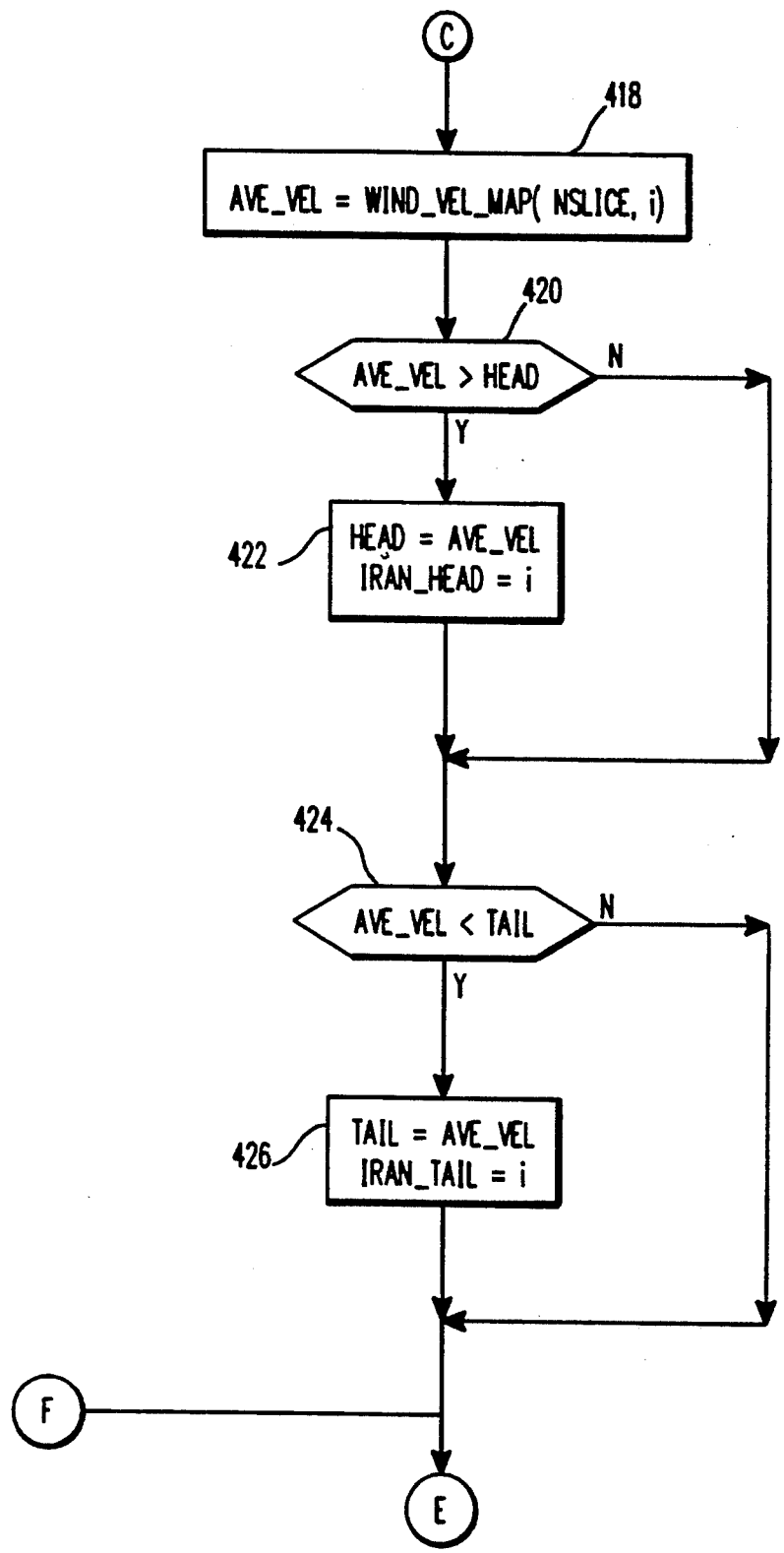
Figure 12F:
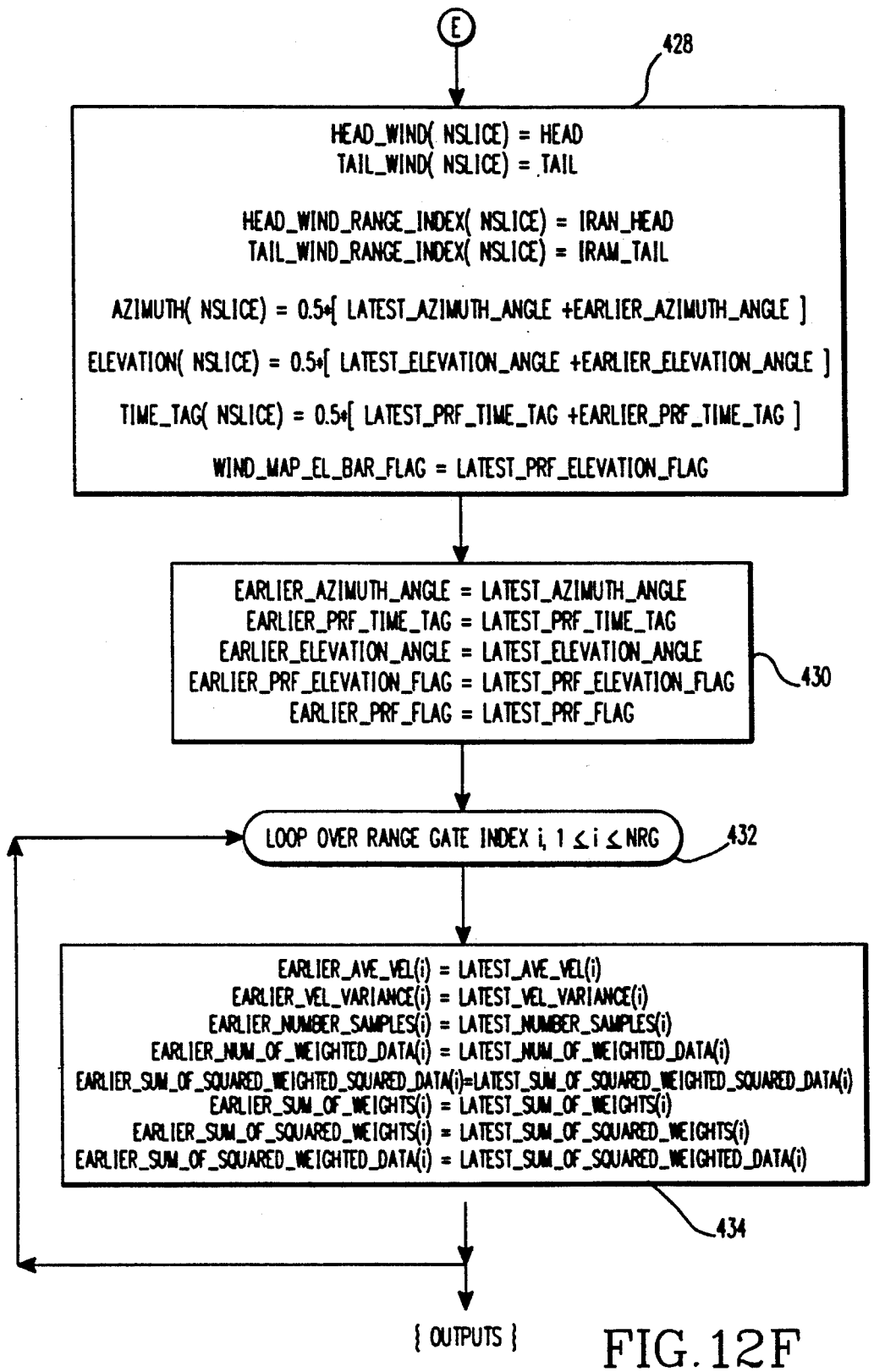

The windmap slice process 108 begins by initializing 380 slice pointers and head and tailwind values. The system then enters a range gate loop 382 in which the system determines 384 the number of degrees of freedom for configuring the combinatorial test. The system then tests 386 the number of degrees of freedom and if the number of degrees of freedom is not greater than zero special processing is performed as illustrated in FIGS. 12D and 12E. Otherwise the system calculates 388 variables to be used in the student's T statistics test on the values. The system then calculates 390 an absolute value of the difference between the mean values of the velocity in the low and high PRF slices, normalized by the combined set standard deviation, if they were correlated. A lookup table is used to determine the percentage points of the student's T distribution for a given confidence interval in terms of the number of degrees of freedom where it is preferred that a confidence interval of alpha equal 0.0005 be used rejecting the signal and covers degrees of freedom up to 30. This looked up threshold is compared to 392 to T. If T is greater than the threshold, the values are set to zero (an uncorrelated pair of returns) otherwise the statistics are combined 396-404. If the special case of zero degrees of freedom is encountered in step 386, the system calculates 406 a difference and a ratio followed by 408 a standard deviation. The difference is compared 410 to the standard deviation multiplied times a constant which is much like a multiplicative constant in the students t test, only here the variance is assumed known, effectively an assumption of infinite degrees of freedom and the constant is 3.29. If the difference is greater the system again set the map values to zero 412. Otherwise the system by storing the head and tailwinds with their indices, by accumulating angle, elevation and PRF time and by storing the elevation flag. The process then computes 414 and 416 the statistics. The system then updates the head and tailwind candidates responsive to testing the head and tailwinds against the average velocity 418–426. The system then creates 428 the output record for the process by storing the head and tail winds with their indices, by accumulating angle, elevation and PRF time and by storing the elevation flag. The process then stores 430–434 the values that need to be carried to the next cycle of this process.

Figure 14:
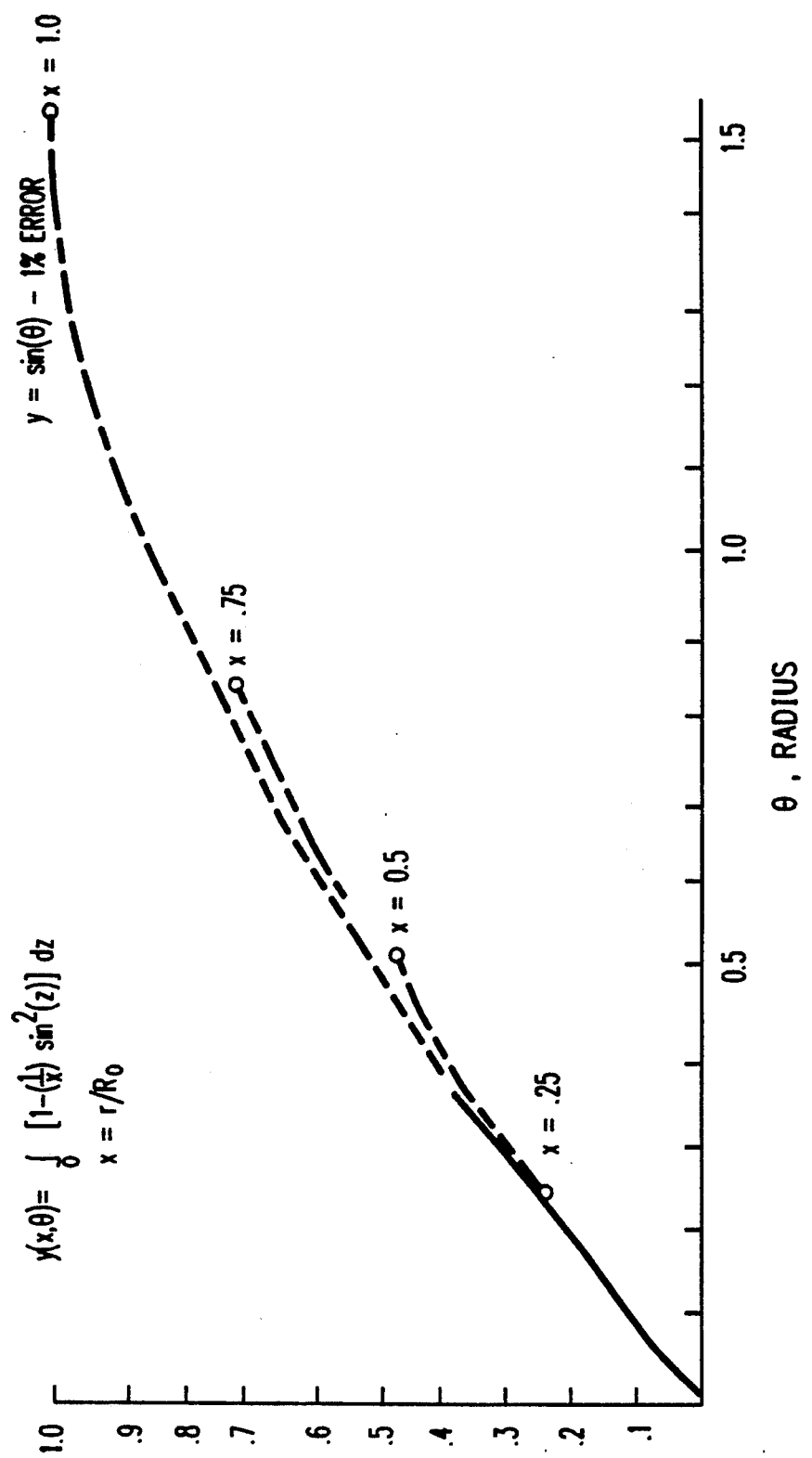
FIG. 14 is a curve for a lookup table.
Figure 15A:
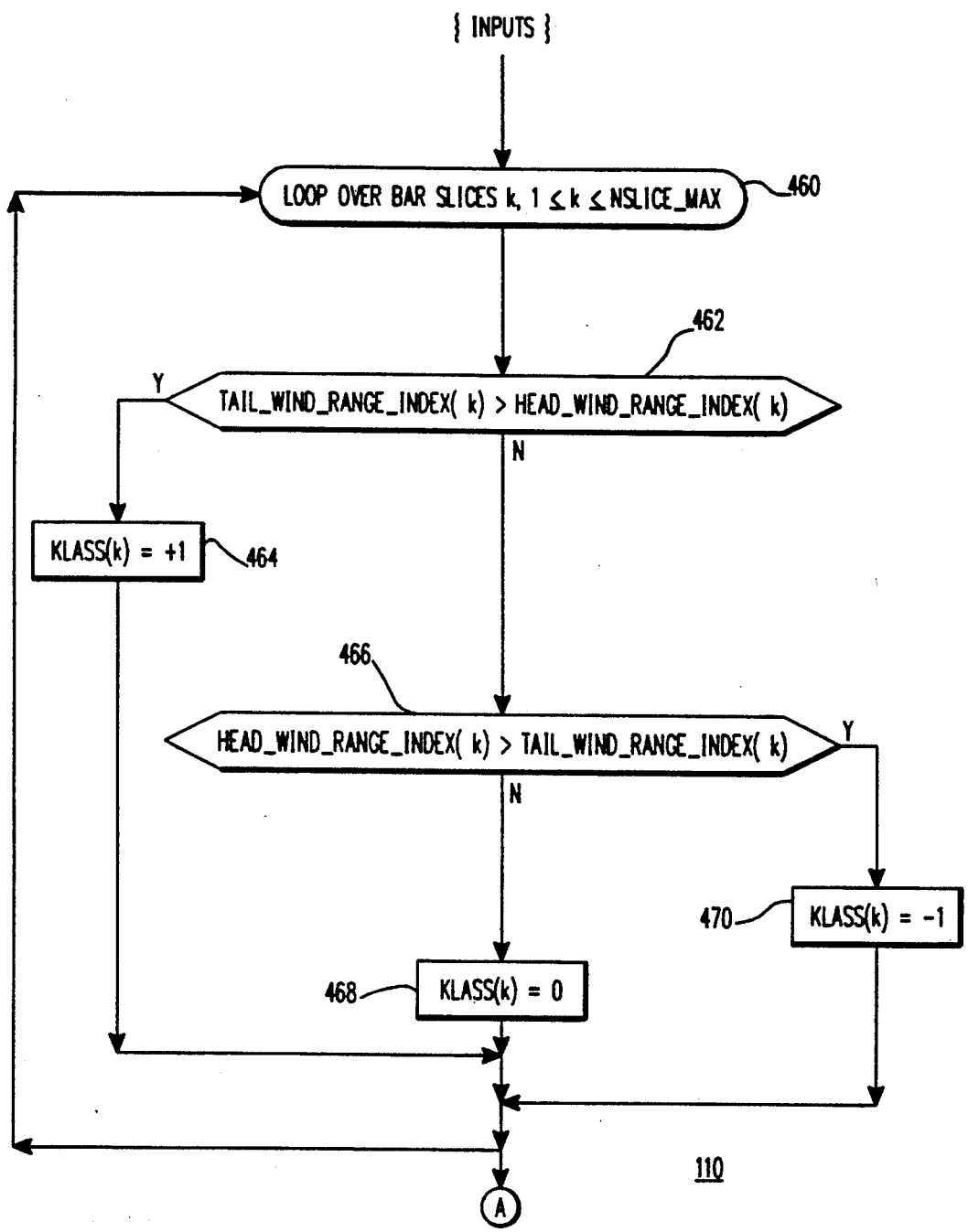
FIGS. 15A-15I illustrate the processing for the upper bar scan.
Figure 15B:
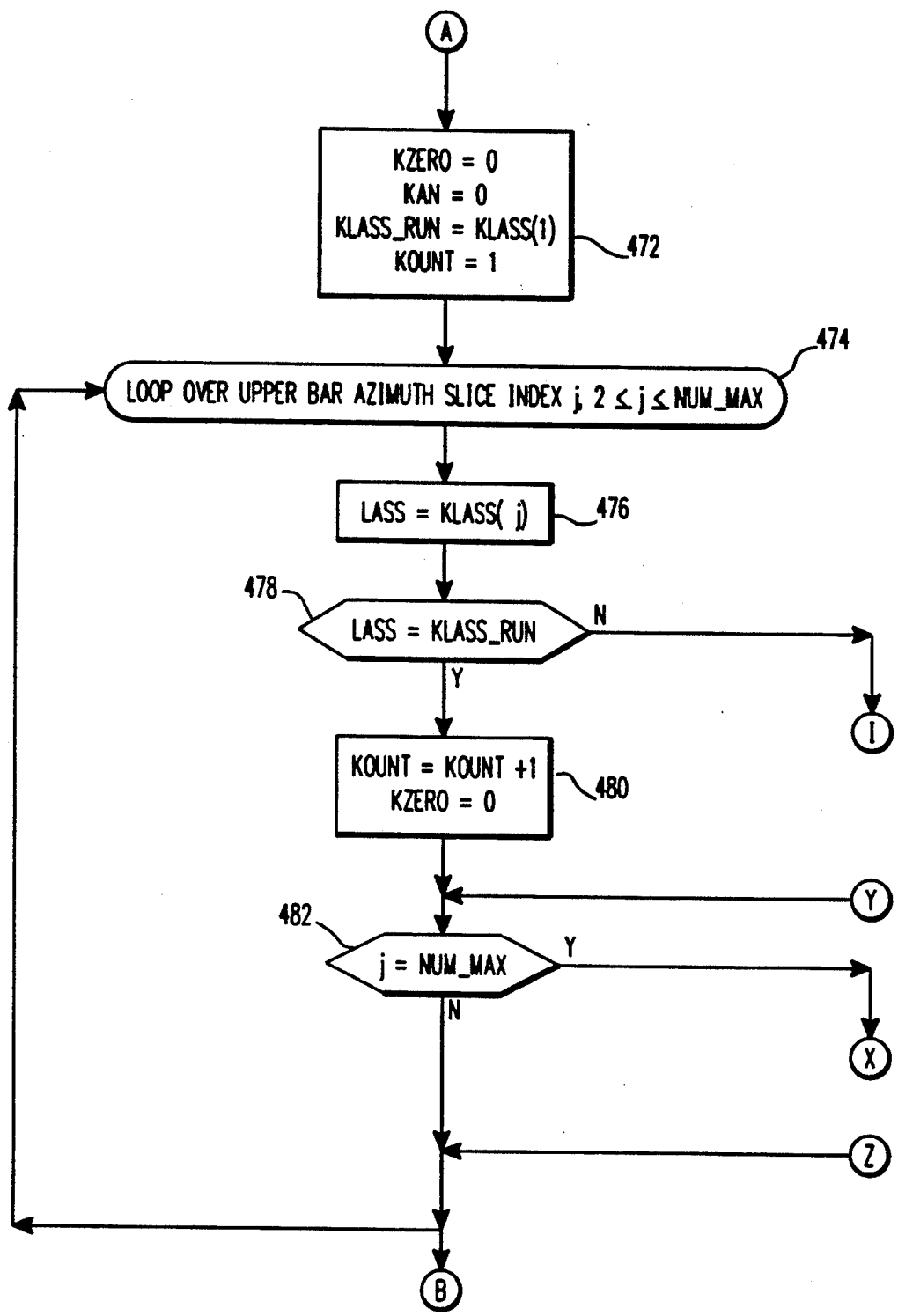
Figure 15C:
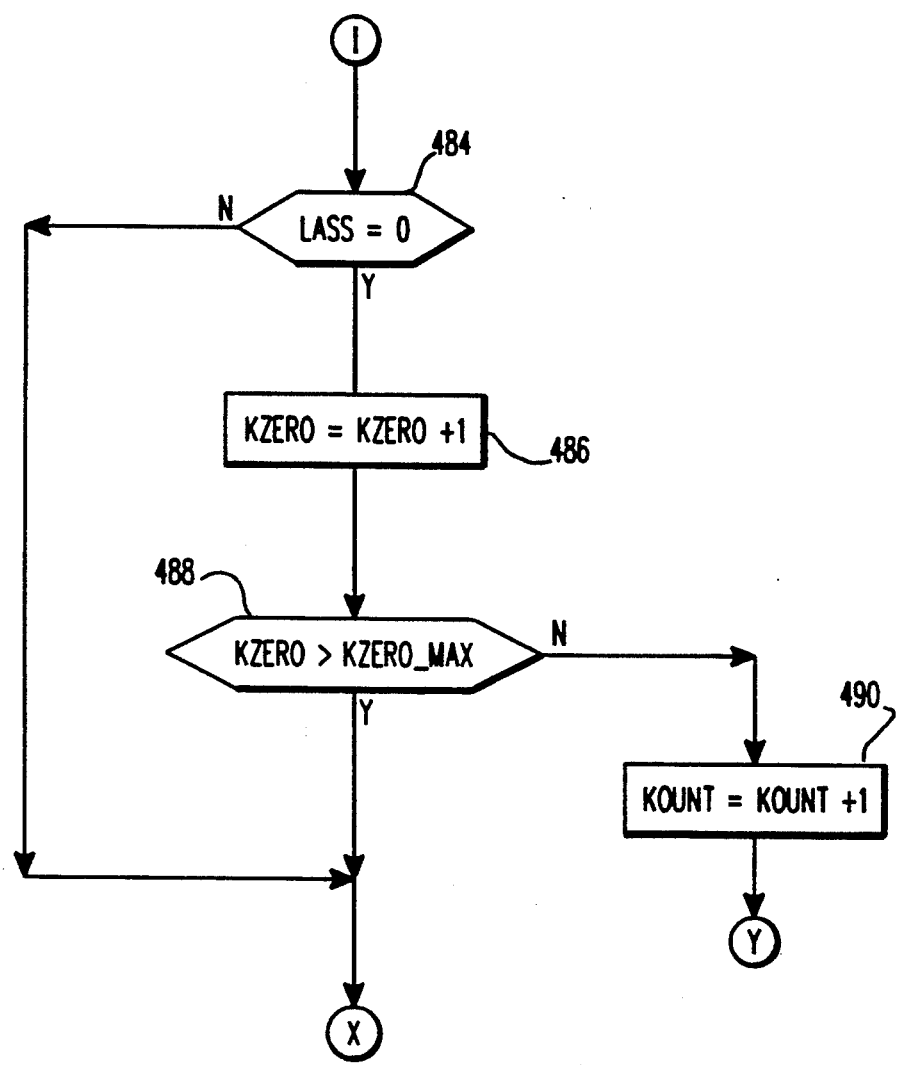
Figure 15D:
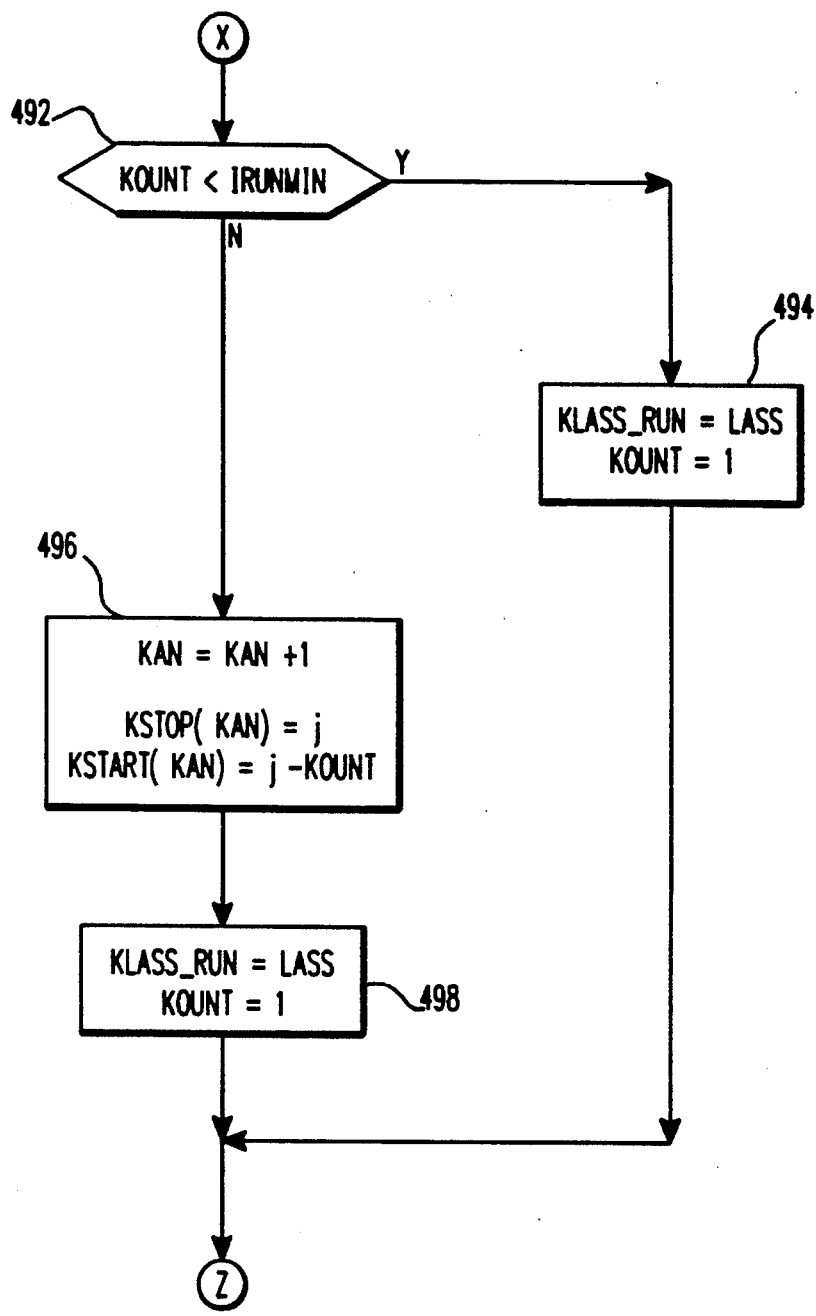
Figure 15E:
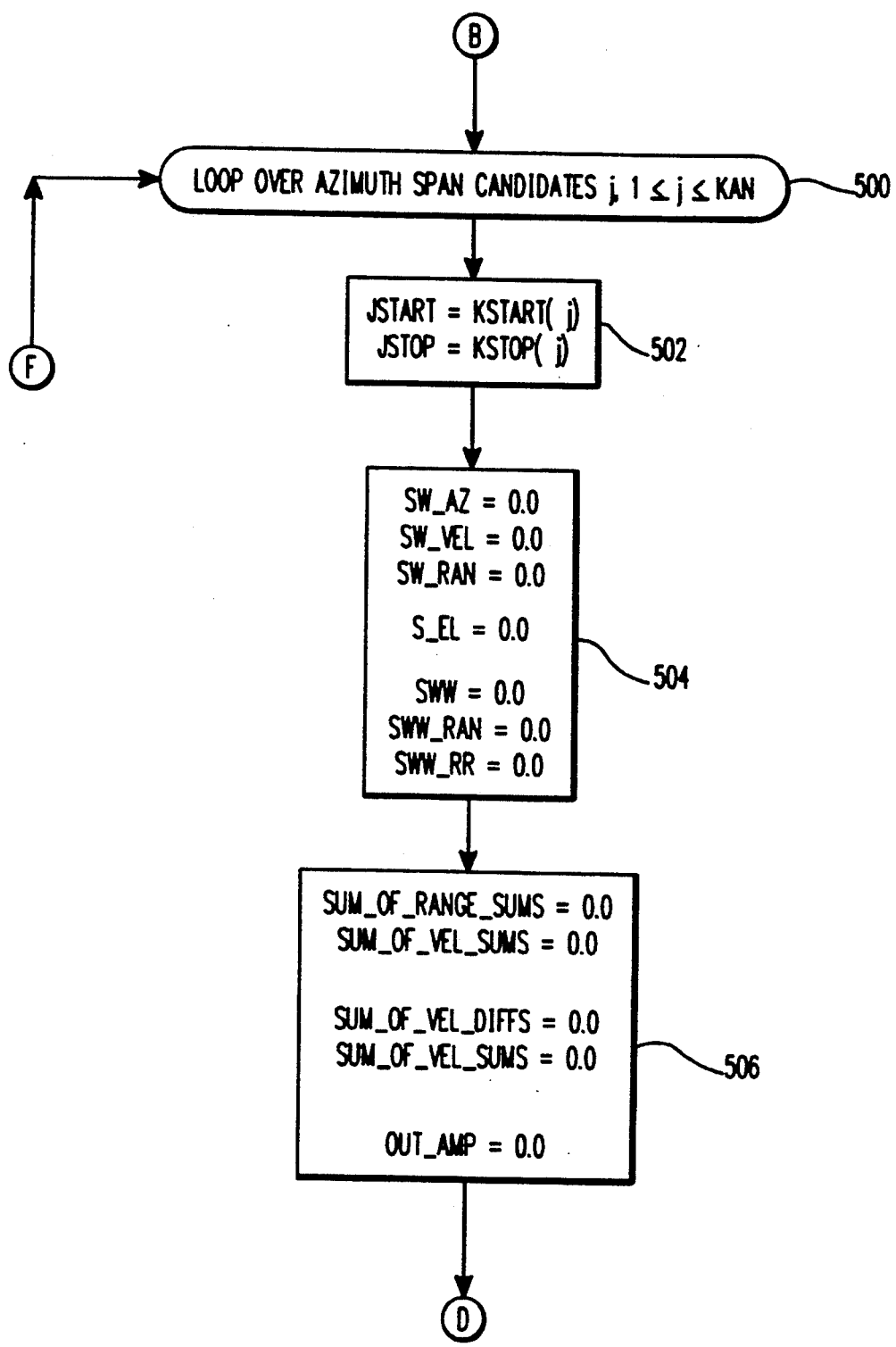
Figure 15F:
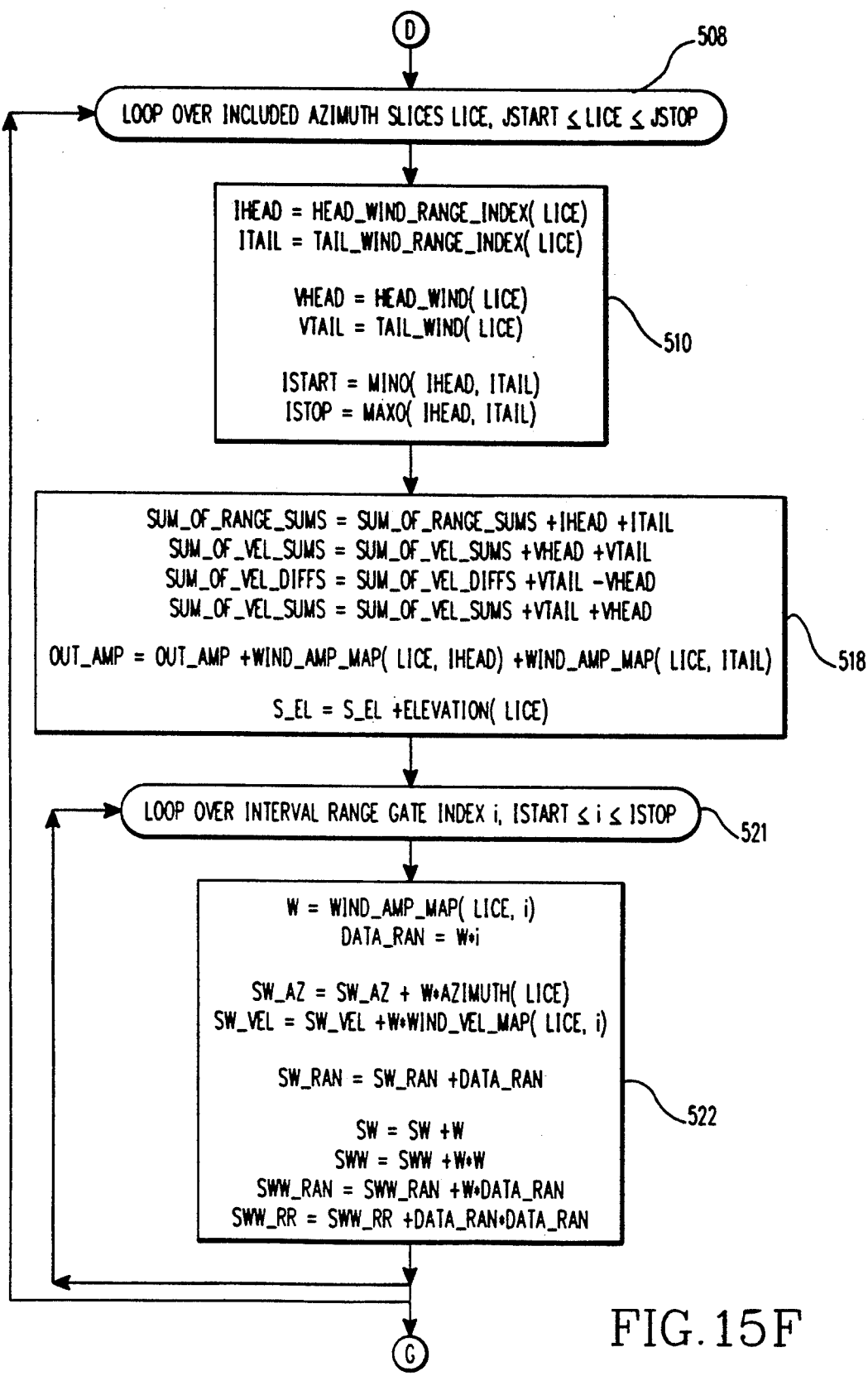
Figure 15G:
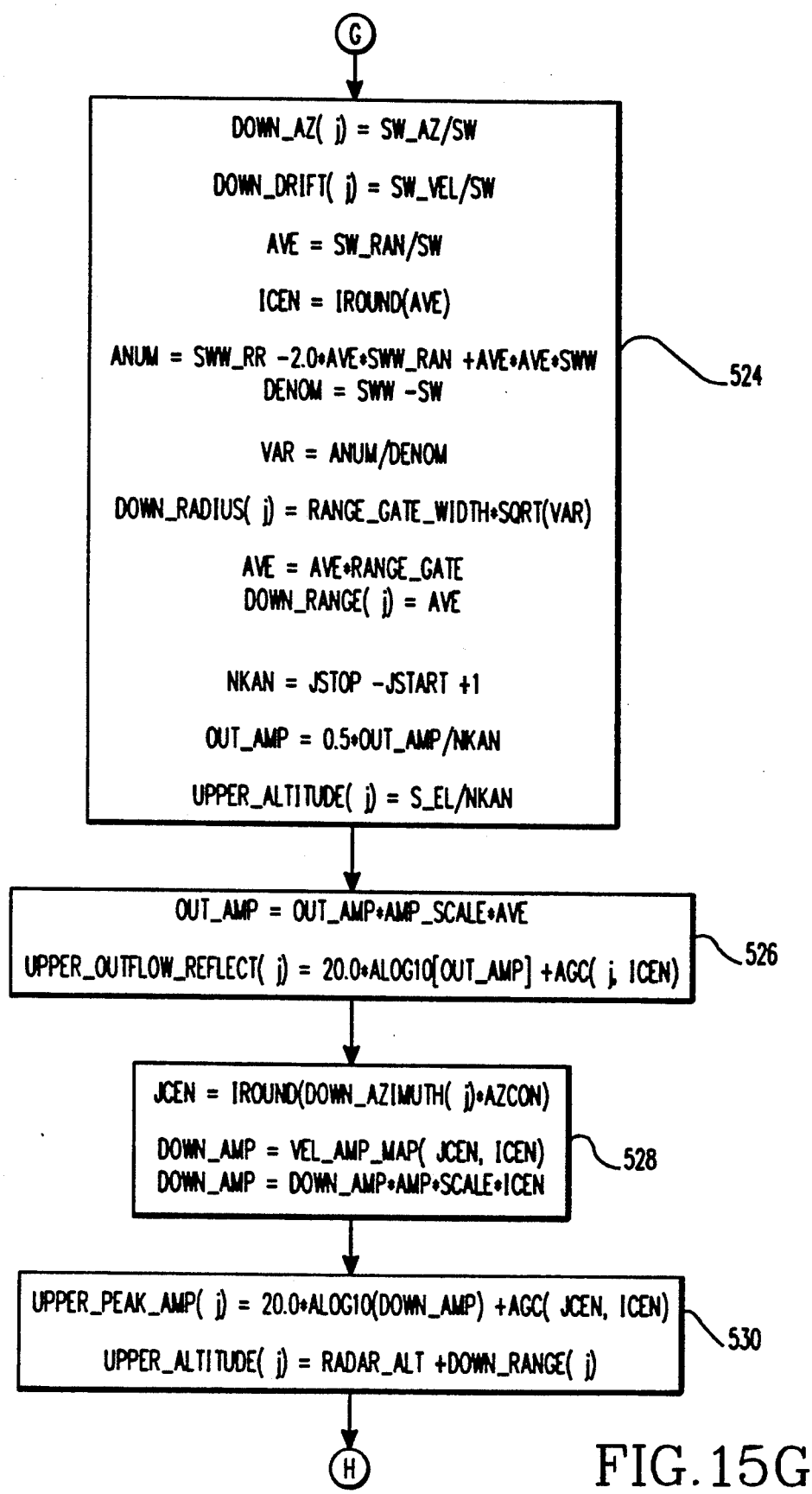
Figure 15H:
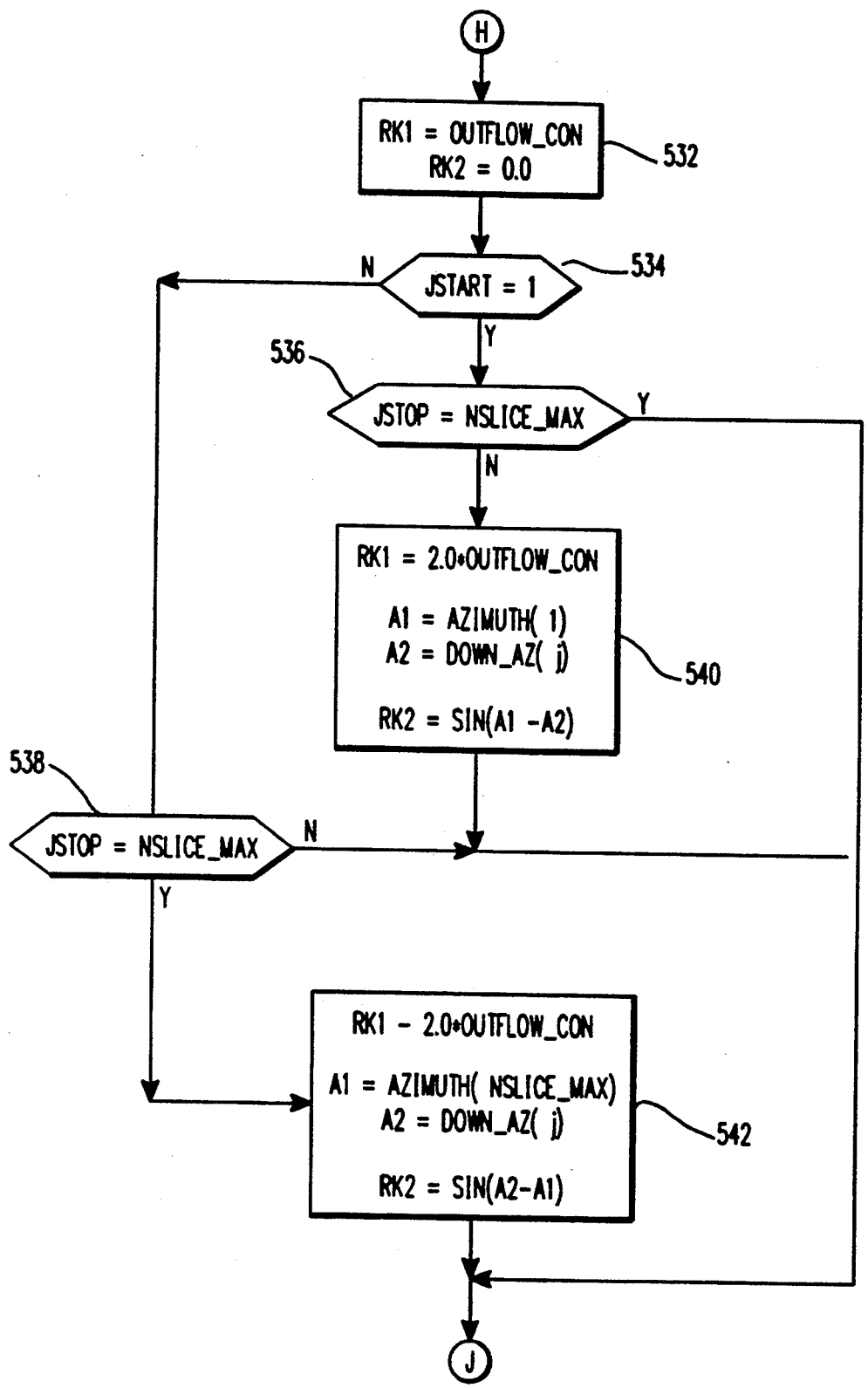
Figure 15I:
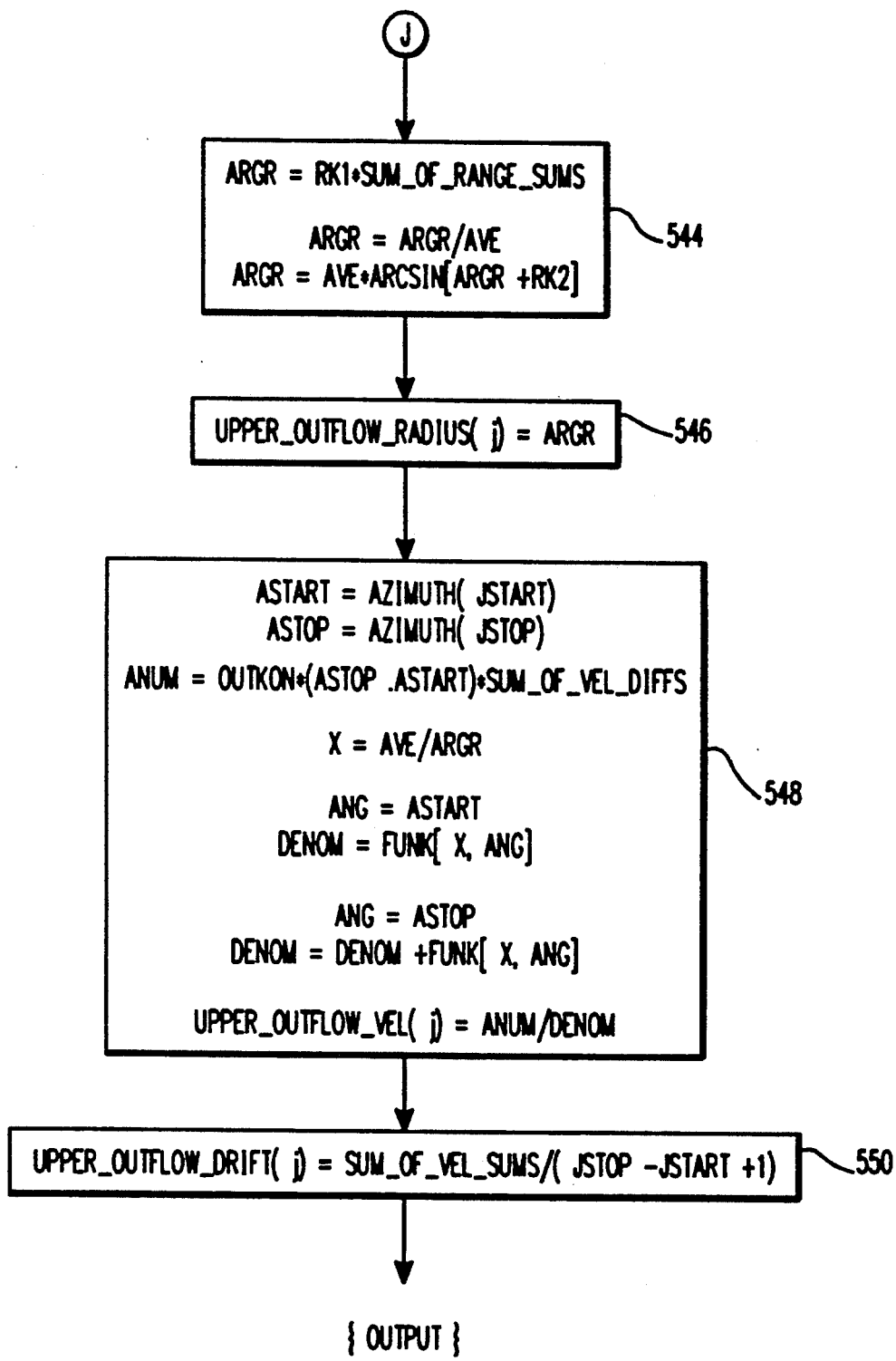

FIG. 13 depicts the geometry of a microburst, with a locus of peak outflow velocity shown as a circle with the radial velocity features also shown. FIG. 14 is a plot of a curve for a looking table where the angle $\theta$ is in radians plotted against the ratio of the radius of the outflow maximum and the range to the center of the microburst.

Initially the process 110, FIGS. 15A–15I, classifies the outflow features in steps 460–470 by testing the magnitudes and setting values in a class vector. Once the classification is completed the counters and indices for determining the extent of the angular run length are set 472. The process then enters a loop 474 in which the number of continuous run candidates of the same classification are counted. First the class is stored 476 and then compared 478 to the class run value. If a match occurs the count is incremented 480. The index is then tested 482 against the maximum angle index for possible loop special termination. The class value is then tested 484 to determine whether the string has been indeterminately interrupted. If so, the interruption count is incremented 486 and then tested 488 to determine whether it is greater than the maximum. If not, the count is incremented 490. If it is above the maximum the system determines 492 whether the count is less than a minimum that is, determines whether the string is of sufficient angular length. If the string is not sufficiently long the system resets 494 the count variables. If the string is sufficiently long, the number of candidates is incremented 496 along with storing the start and stop indices of the candidate. The system then resets 498 the counters to get ready for a new string. The system then enters a loop 500 and performs the setup operations 502–506 to prepare to compute the features for each candidate of sufficient angle span. The system then begins processing the candidates restricting attention to candidate angle string and outflow boundaries. This loop 508 sets 510 pointers and sums 518 the features followed by entering a loop of 520 which the amplitude weighted azimuth centroid, range centroid and standard deviation in range sums are accumulated 522. Step 524 determines the amplitude weighted azimuth angle centroid with respect to each candidate, the amplitude average radial velocity component of the slices in the candidate in meters per second, the amplitude weighted standard deviation in range and angle about the mean for each candidate, the amplitude weighted range centroid of the candidate and the amplitude weighted altitude of the data contributing to each candidate feature. Step 526 determines the mean amplitude of the outflow cell features of the slices composing each candidate and the upper outflow reflectance. Step 528 determines the azimuth slice index of the candidate centroid and the scaled amplitude of the volume reflectivity of the pixel at the candidate centroid while step 530 determines the compensated peak reflectivity of the centroid which will be eventually scaled and interpreted for downdraft core reflectivity. Step 530 also produces the altitude of the centroid of each candidate. The system then computes the radial outflow velocity of the radius of peak outflow by first setting 532 the outflow to a value for performing the angle functional average over the outflow range which is preferably .5. The system then checks 534, 536 and 538 for boundary conditions, adjusting 540 and 542 the parameters appropriately. The system then computes 544 and 546 the radius of the peak outflow as a functional average over the axial symmetric regression locus. The outflow peak radial velocity is then computed 548 followed by determining the upper outflow drift 550, thereby determining outflow velocity asymmetry.

Figure 16A:
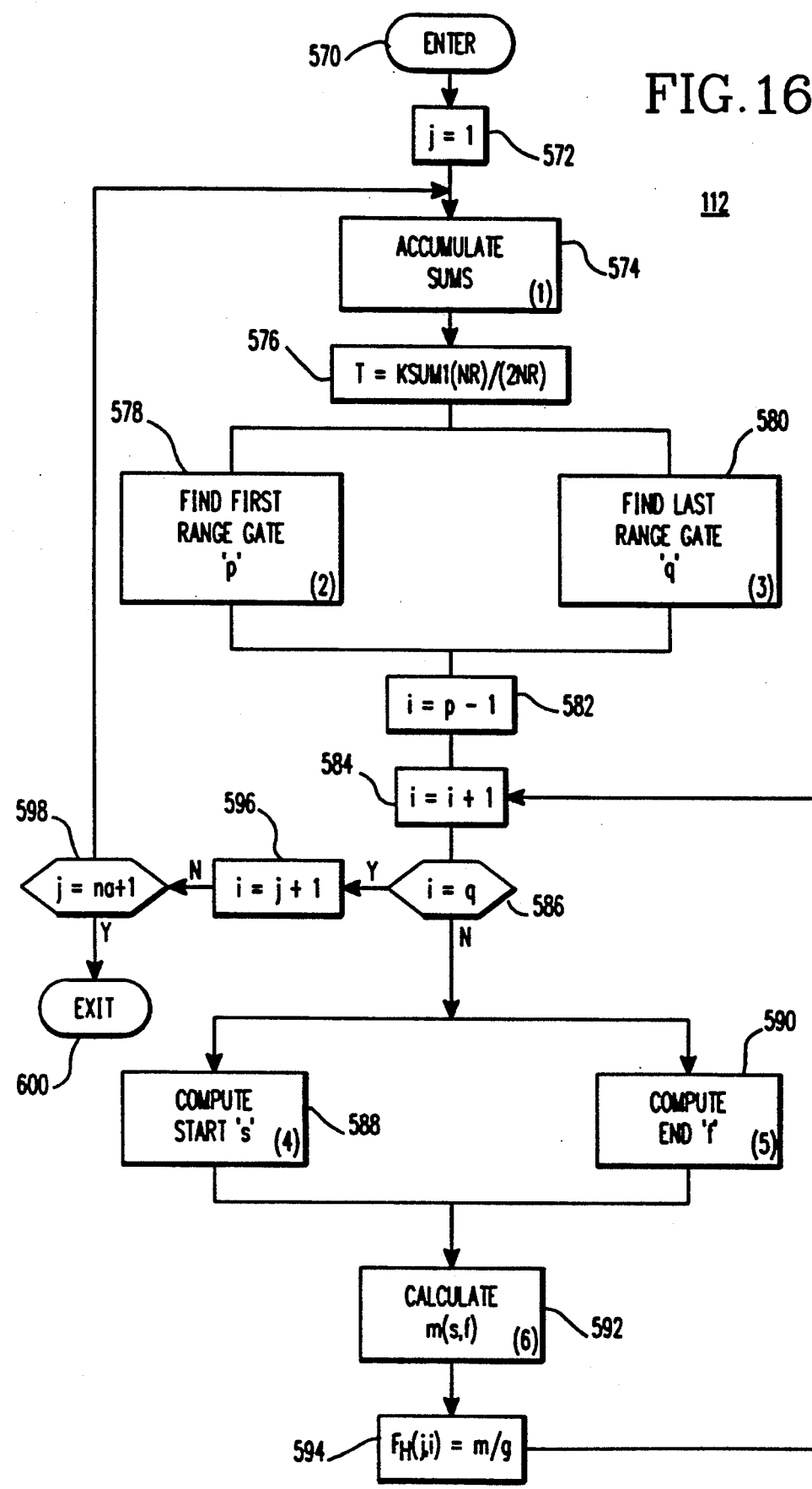
FIGS. 16A-16G depict the details of the horizontal windshear hazard map process 112.
Figure 16B:
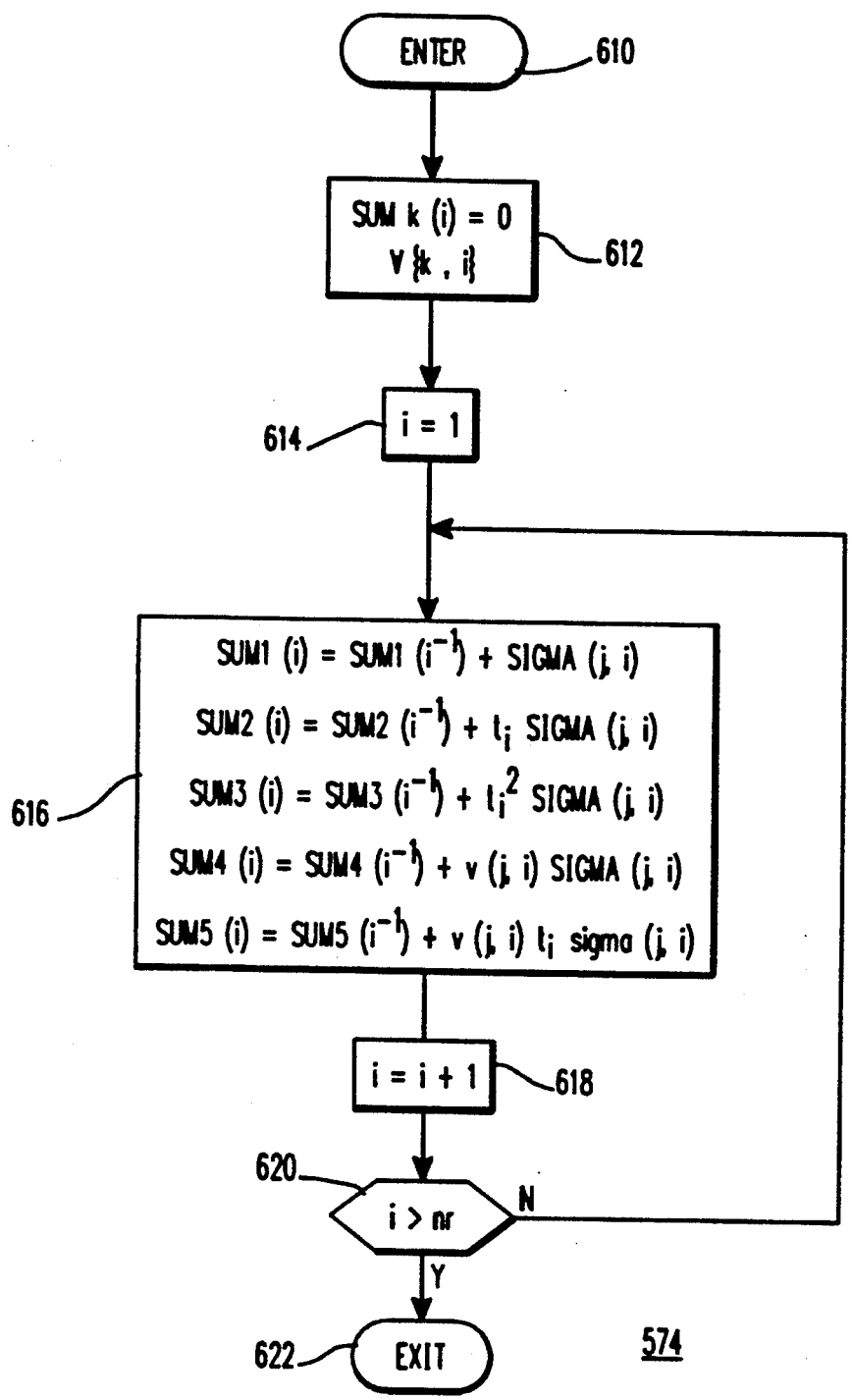
Figure 16C:
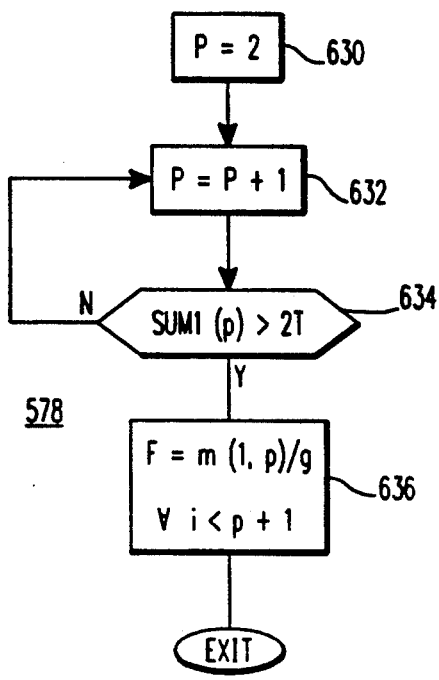
Figure 16D:
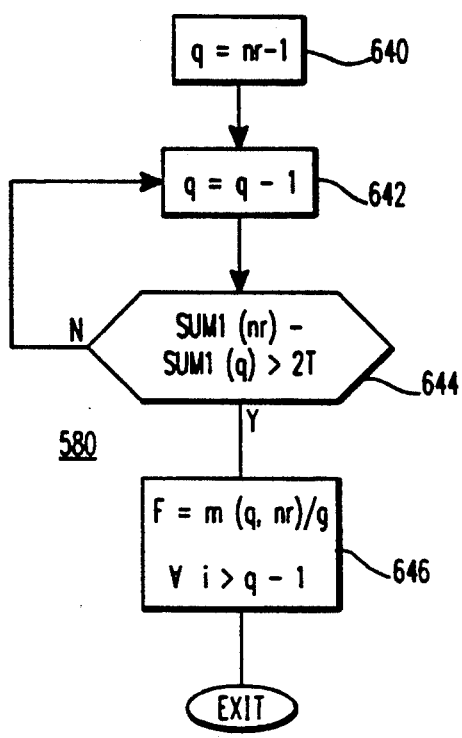
Figure 16E:
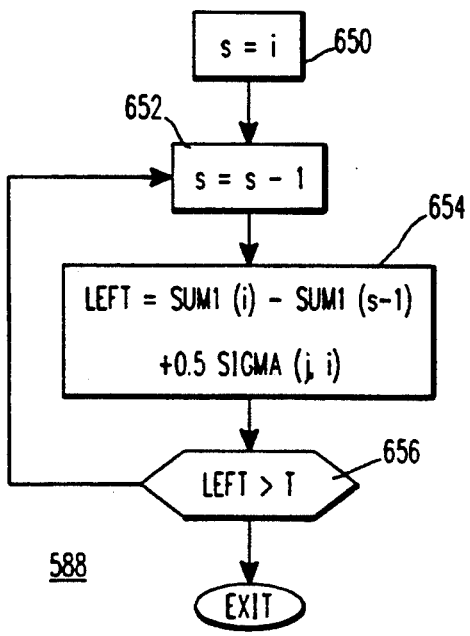
Figure 16F:
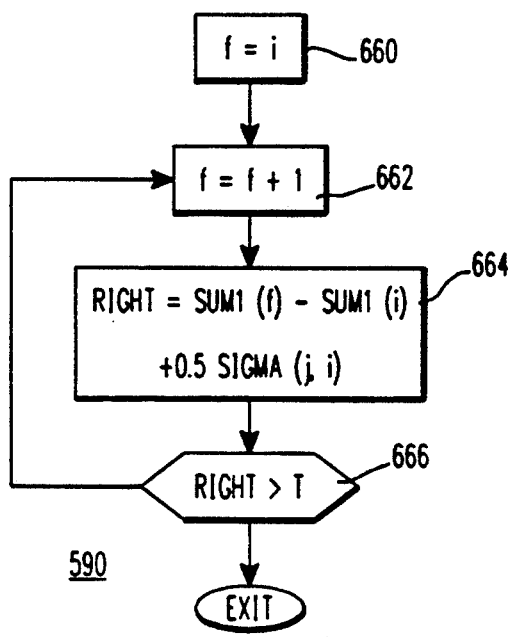
Figure 16G:
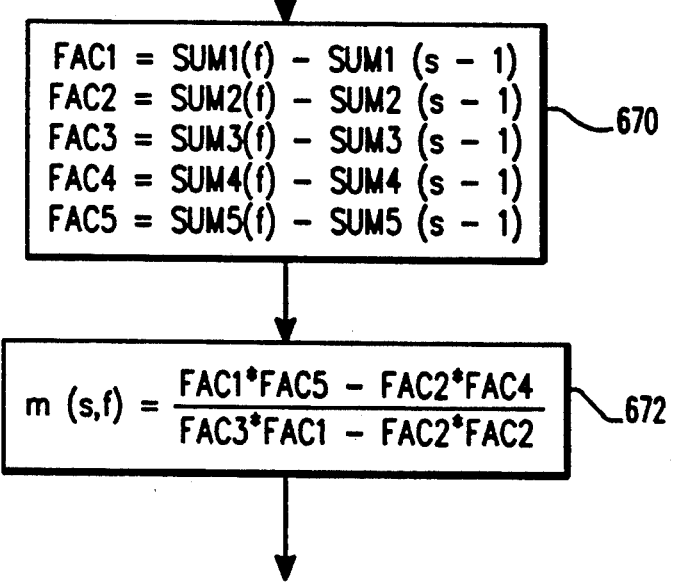

The horizontal windshear hazard map process 112, as illustrated in FIGS. 16A–16G establishes, about each range gate in a slice, a window containing sufficient total amplitude. From the window a slope across the velocity returns is computed by least squares. The left and right edges of the azimuth slice must be treated differently. For these cells a slope for the left edge and a slope for the right edge are computed once and applied globally. The horizontal hazard is the slope of the velocity field across range, scaled to gravity. The process 112 starts by setting 572 the slice pointer and then accumulating 574 sums which will be described in more detail with respect to FIG. 16B. A threshold is then computed 576. Next the first and last range gates are found 578 and 580 which will be described in more detail with respect to FIGS. 16C and 16D. This operation is shown as being performed in parallel which is preferred if two processors are available, otherwise step 578 should be performed before step 580. The system then updates the index to the range cell (p−1) at 582, and then (i+1) at 584, and finally determines whether it is the last range cell (q) at 586. If not, the computes 588 and 590 the start and end points which will be described in more detail with respect to FIGS. 16E and 16F. Once again, these operations can be performed in parallel if appropriate resources are available, otherwise step 588 is first. The system then calculates 592 the unadjusted windshear hazard as shown in FIG. 16G and calculates 594 the gravity adjusted hazard. The system then returns for another iteration. If the test 586 is positive the system increments 596 the slice pointer and then determines 598 whether the angle slice pointer exceeds the range of interest.

As illustrated in FIG. 16B the accumulation operation 574 starts by setting 612 all the sum values to zero and then initializing 614 an index. The windmap amplitudes are then added 616 followed by incrementing 618 the index. The system then determines 620 whether the index is greater than the number of range gates and if so exits 622.

As illustrated in FIG. 16C the first range gate is found by setting 630 the first range gate pointer to 2, incrementing 632 the pointer and testing the first sum,for the range gate against the doubled threshold 634. If the first sum is greater than the double threshold, the system sets 636 the windshear hazard map value for each cell in the current azimuth slice between range index 1 and the value of the pointer for which the sum exceeded the doubled threshold. This point is the starting gate of the center region and the prior gate is the last gate of the left edge region of the given azimuth slice. Each cell in the left edge region is assigned a hazard value corresponding to the condition in steps 670 and 672, with the start gate and end gate the last gate of the left end region.

The process for determining the last range gate as illustrated in FIG. 16D is substantially similar. First the last range gate pointer is initialized 640 and decremented 642 followed by threshold testing 644. If the test 644 is passed, the range cell, for which the doubled threshold is exceeded while decrementing the range gate pointer from its maximum value, is the last range gate of the center region. The next higher index is the first range gate of the right edge region. All cells from the first gate of the right edge region to the last gate are globally assigned a hazard value in step 646 according to steps 670 and 672 with the start gate the first gate of the right edge region and the end gate the last range gate of the slice. In this manner the left and right edges are treated symmetrically.

The index which is incremented in block 584 of FIG. 16A is the current range gate. The process depicted in FIG. 16E determines the left or lower extreme of a window about this range gate point 1. This is the range gate pointer which is incremented in block 584 of FIG. 16A. The window start index or pointer to the left extreme is initialized in 650 with the value i, and decremented until the sum of amplitudes in the left half of the window exceeds a threshold as shown in steps 652, 654 and 656.

The index which is incremented in block 584 of FIG. 16A is the current range gate. FIG. 16F depicts the determination of the right or upper extreme of a window about the current range gate in a manner substantially similar to that used to determine the lower window edge as depicted in FIG. 16E. The pointer to the right extreme is initialized in 660 with the value i, and incremented until the sum of amplitudes in the right half of the window exceeds a threshold as shown in steps 662, 664 and 666. The sum of amplitudes in the right half of the window is computed 664. The window edge is incremented until a threshold is exceeded.

The calculation of the unadjusted hazard factor, as illustrated in FIG. 16G, consists of constructing the sums 670 for the computed window size, and performing 672 the slope computation.

In general, mathematical development of the equations for the processing in the lower bar feature estimation process 114 were discussed in detail with respect to process 110 for the upper bar features. The processing here begins with the initial definition of candidates from the upper bar results. These identify microburst downdraft candidates in angle and range. The domains for applying similar averaging and weighing algorithms as in the upper bar are restricted to expansions about the domain of those candidates. The Oseguera-Bowles equations previously mentioned model microburst outflow and predict that the locus of peak horizontal velocity outflow (over all altitudes) should lie at:

$$r_{max} = 1.1212\ R$$

where R is the radius of the downburst shaft. The range and angle centroids of the lower bar features are determined by considering range azimuth cells in a domain extended by this fixed scaling about the upper candidate centroids according to the respective downdraft radius. The lower bar outflow features are culled to be both properly ordered (i.e. the range of the headwind is less than the range of peak tailwind) and "near" the expected outflow radius. In many ways, the results from the upper bar form an initial guess which is refined by the lower bar, thereby reducing the processing necessary to identify and define the hazard. The combined processing 114 of the upper and lower bars to determine the microburst feature estimation begins (See FIGS. 17A-17G) with a loop 680 incrementing over the upper bar azimuth span candidates. In step 682 the amplitude of the weighted azimuth angle centroid and the amplitude of the weighted range centroid of the candidate are stored. The downdraft radius is then scaled 684 using a domain scale constant for scaling the downdraft reflective core radius of the upper bar into a search window for the lower bar velocity map where this scaling number is a value between 1 and 2 and preferably approximately 1.3. The azimuth span of the candidates is also extended by the increased boundary and an offset constant for expanding the angle domain for the lower bar feature computations beyond that suggested by the upper bar is added where this offset value preferably corresponds to a few slice spacings such as 0.5 degrees. The system then adjusts 686 the center of the span by the numerical value of the inverse of the angle spacing between azimuth slices and truncates these numbers. Start and stop indices are then calculated 688. The system then zeros 690 and 692 the processing variables and enters a loop 694 which restricts attention to the candidate string and the outflow range boundaries. The system then computes 696 the range gate indices of the anticipated range gates containing the peak outflow velocities where the maximum and minimum are adjusted using a constant value equal to the inverse of the range gate and the head and tail wind. In 696 initial values are set up for each angle slice, including indices of range gate LMIN and LMAX for the head and tail wind peaks. Next, the system enters a loop 698 in which the range extent is looped over as controlled by an integer constant defining the range extent for the localized search of the outflow. This number is preferably 3. The system then computes 700 test values for the local peak headwind, which for divergent flow should lie near LMIN. The maximum velocity is tested 702 against the velocity test value and if the test value is greater than the velocity maximum the range gate index and the maximum value is stored 704. The system then computes 706 tailwind test values near LMAX, compares 708 the minimum velocity value against a minimum velocity and stores 710 the minimum if the test is passed. The system then determines 712 whether the tailwind index is greater than the headwind index and if not, adjusts 714 the indices. The system then computes 716-722 intermediate summations including amplitude weighted centroid values, and then computes 724-740 the lower bar features using the windowed results including computing azimuth centroid, drift velocity, range centroid index, range centroid average elevation angle and outflow reflectivity. Some of the upper bar feature values are renamed to be consistent with the new convention. The system then checks 742-746 for boundary conditions and adjusts 748 and 750 the features accordingly. Next this process 114 computes 752 and 754 the outflow features including the radius of the peak outflow as a functional average over the actual symmetric regression locus. Next the system computes the outflow peak radial velocity 756 and 758 and then the outflow velocity asymmetry or the drift 760.

Figure 18A:
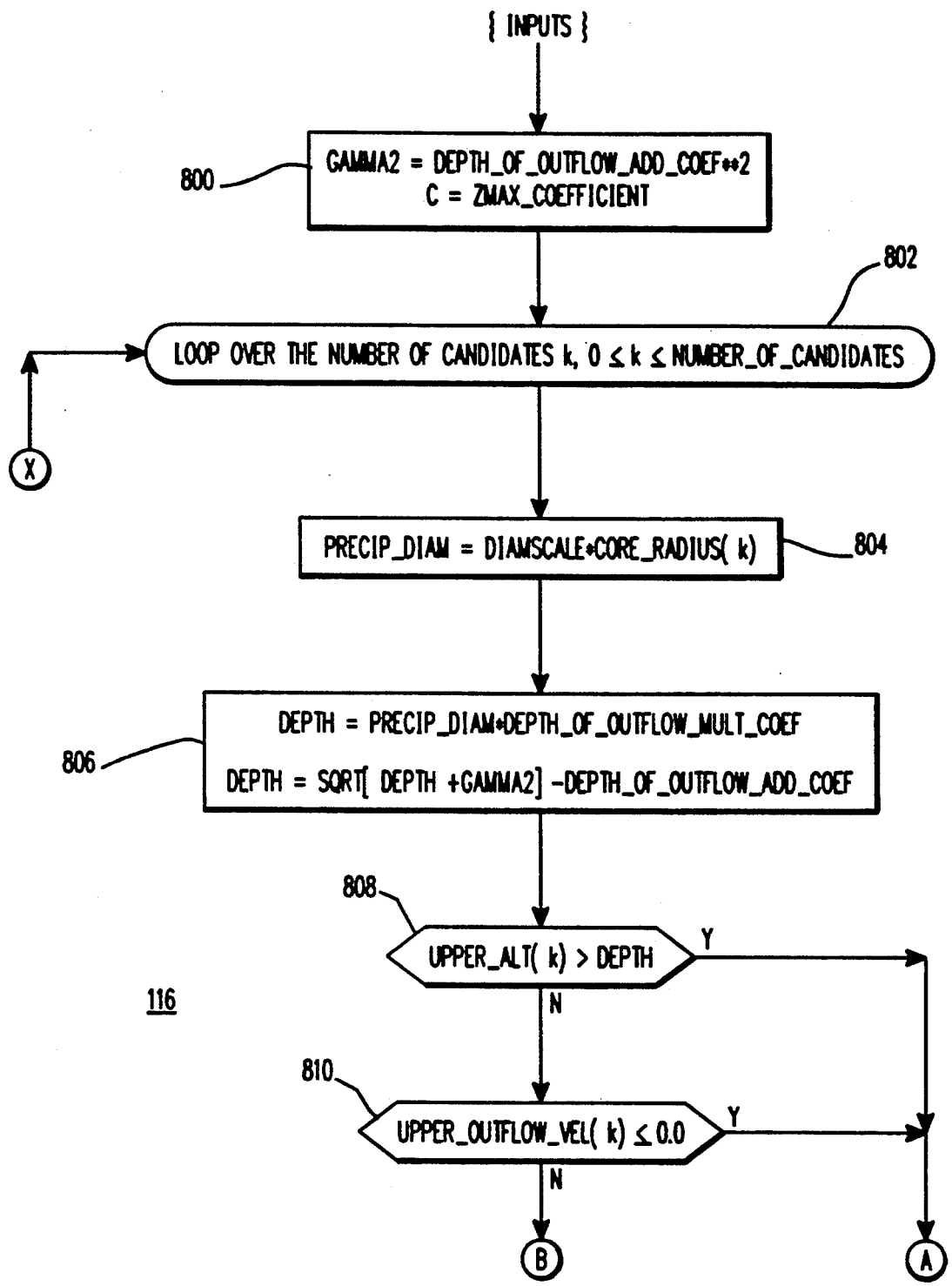
FIGS. 18A-18C depict the vertical hazard and scaling process 116.
Figure 18B:
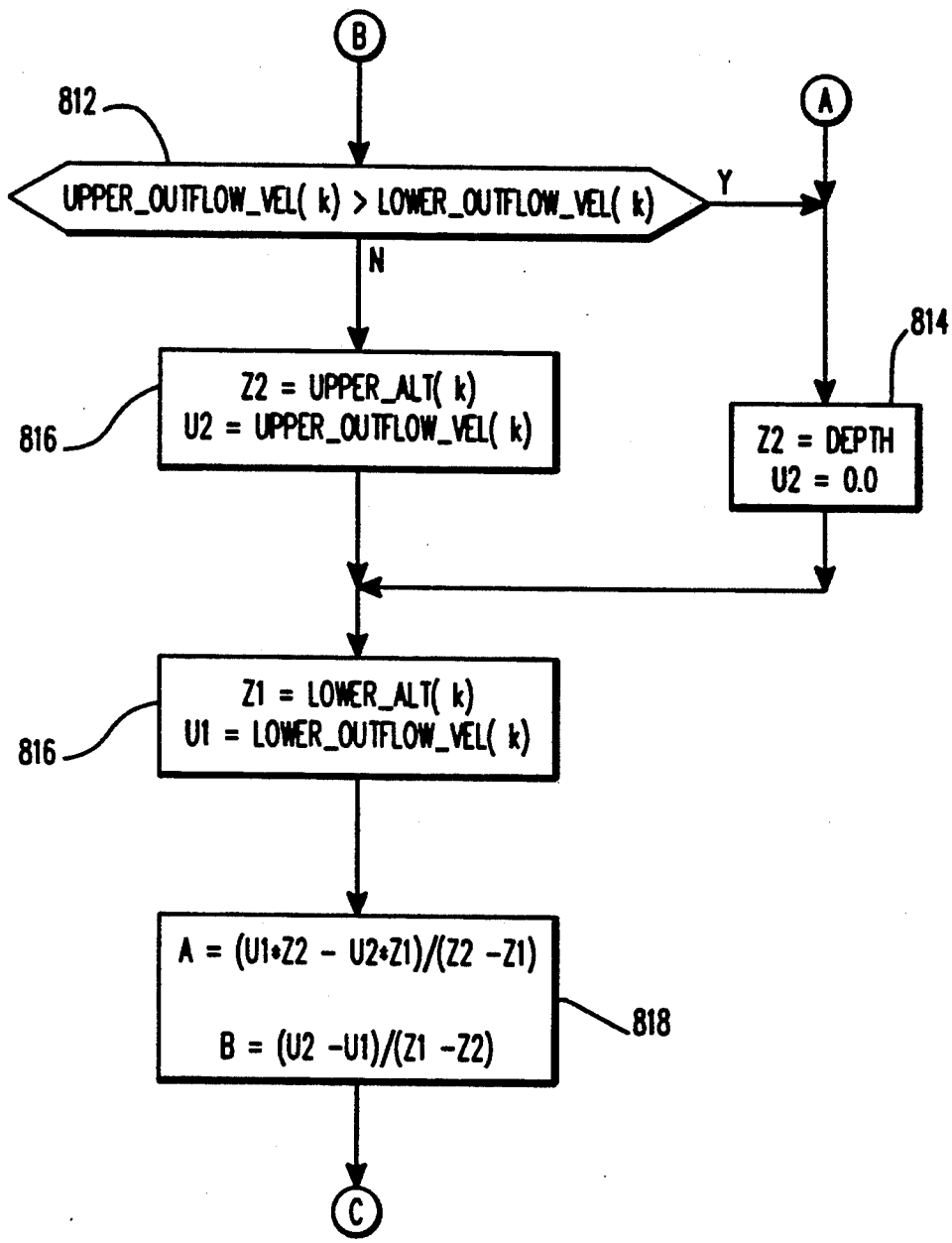
Figure 18C:
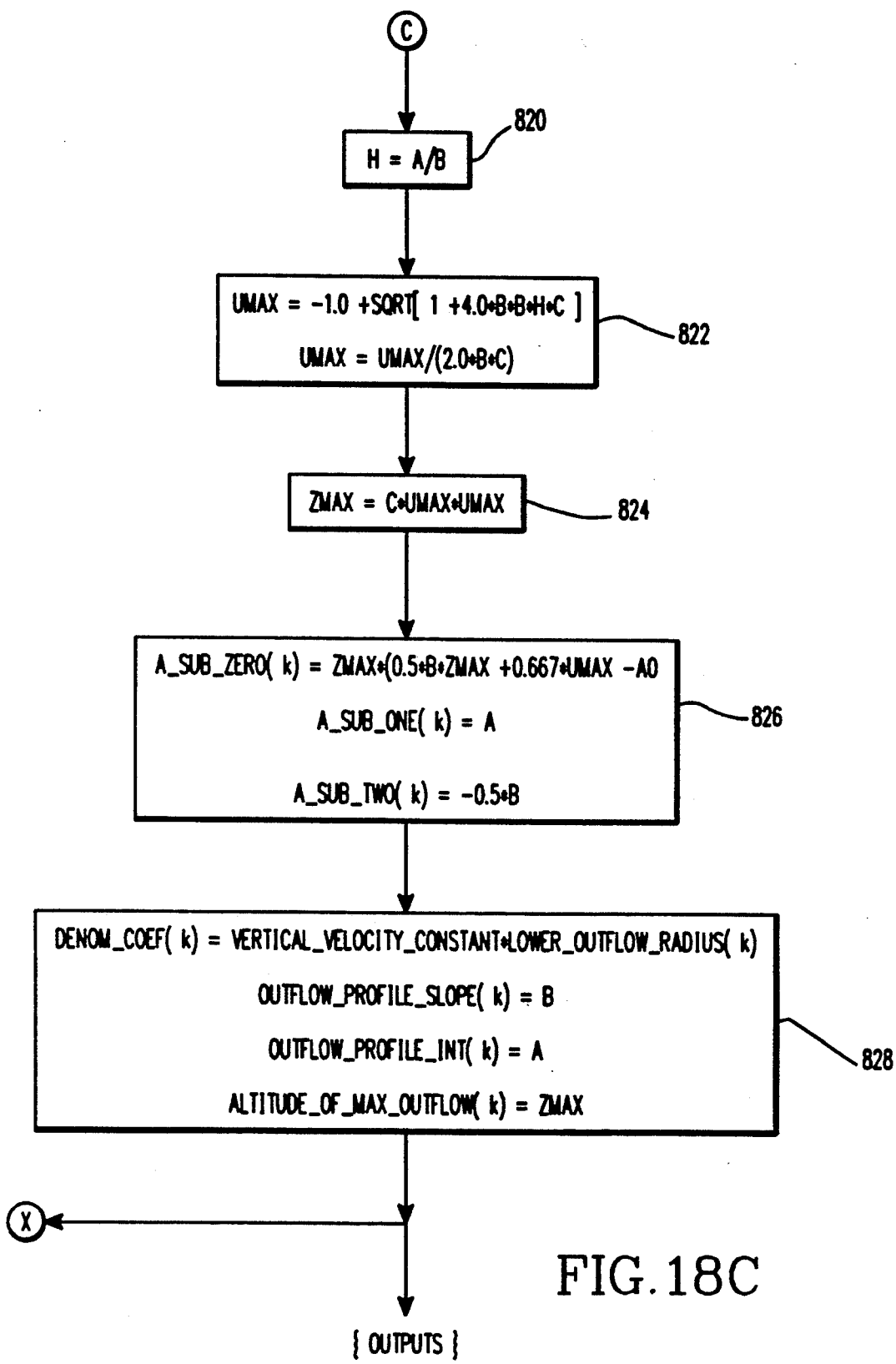
Figure 19A:
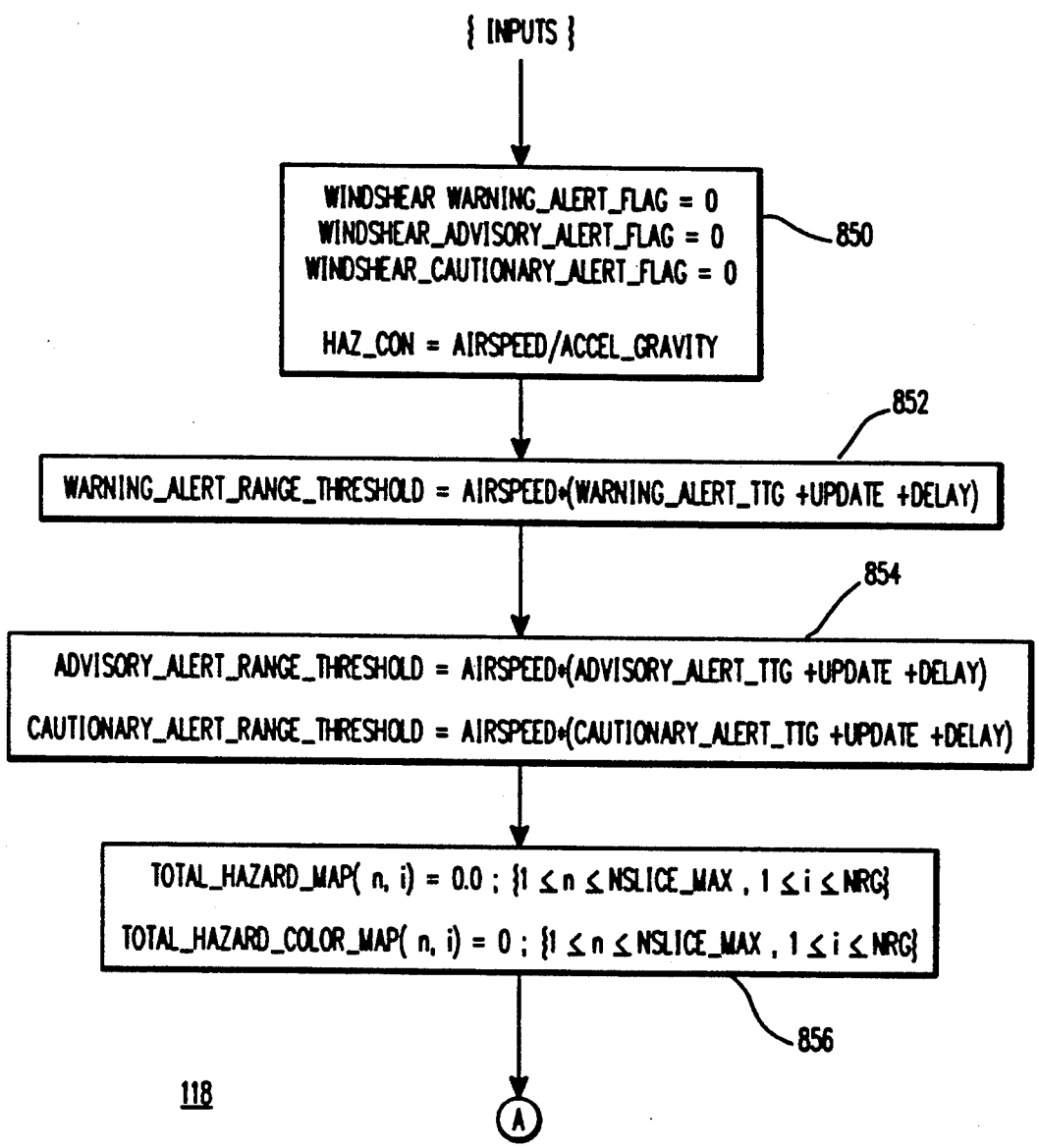
FIGS. 19A-19I depict the details of the hazard detection operation 118.
Figure 19B:
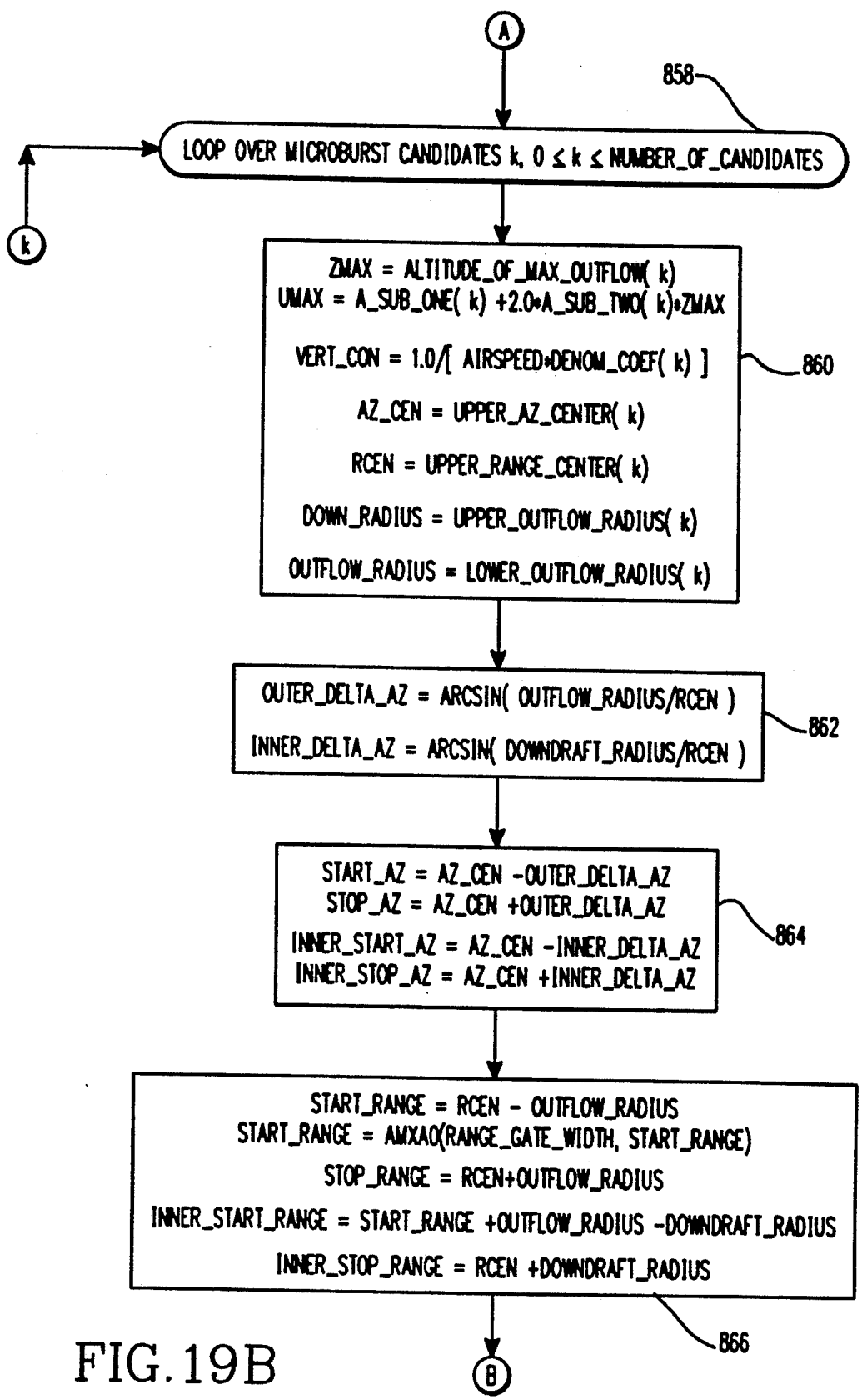
Figure 19C:
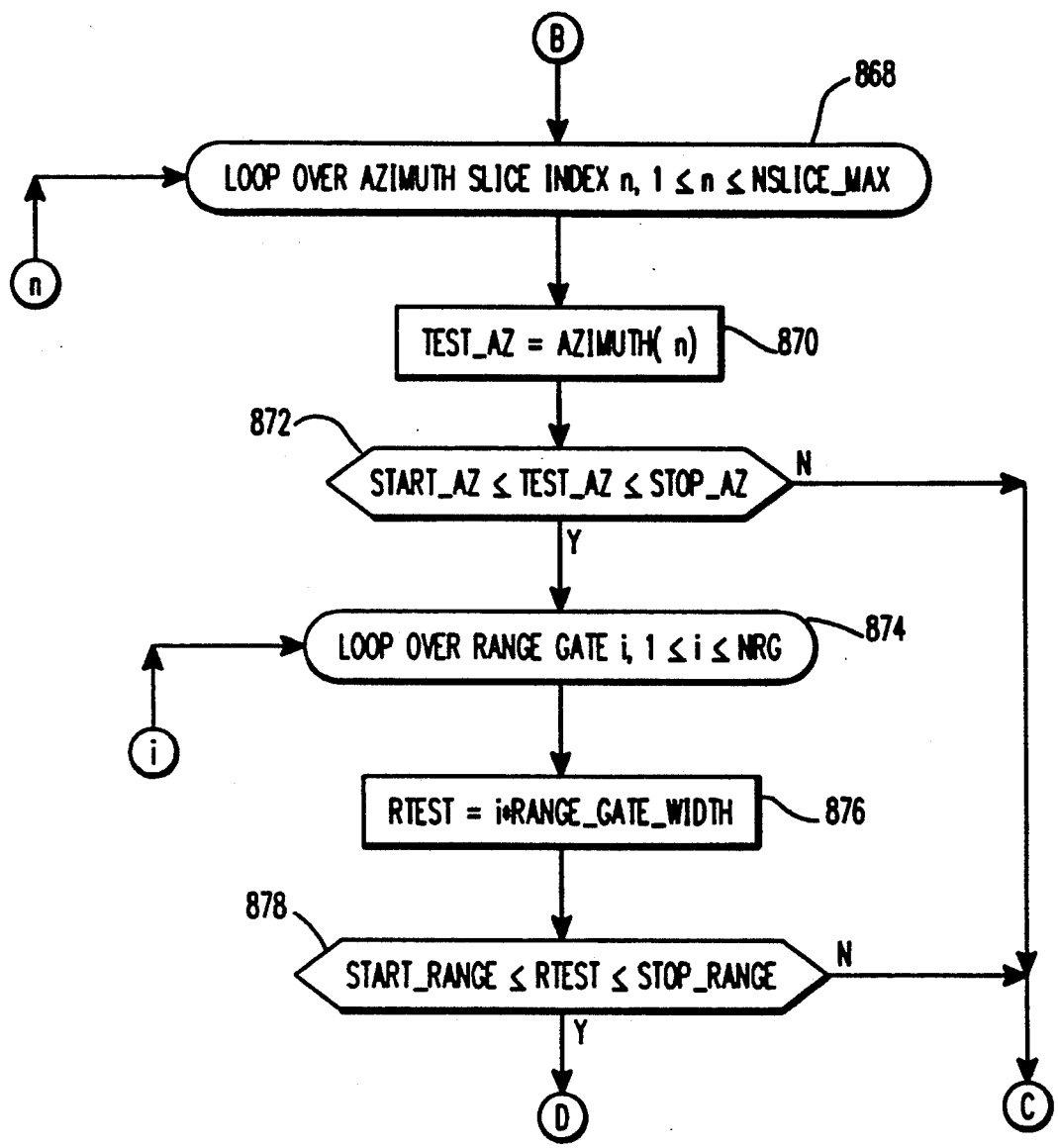
Figure 19D:
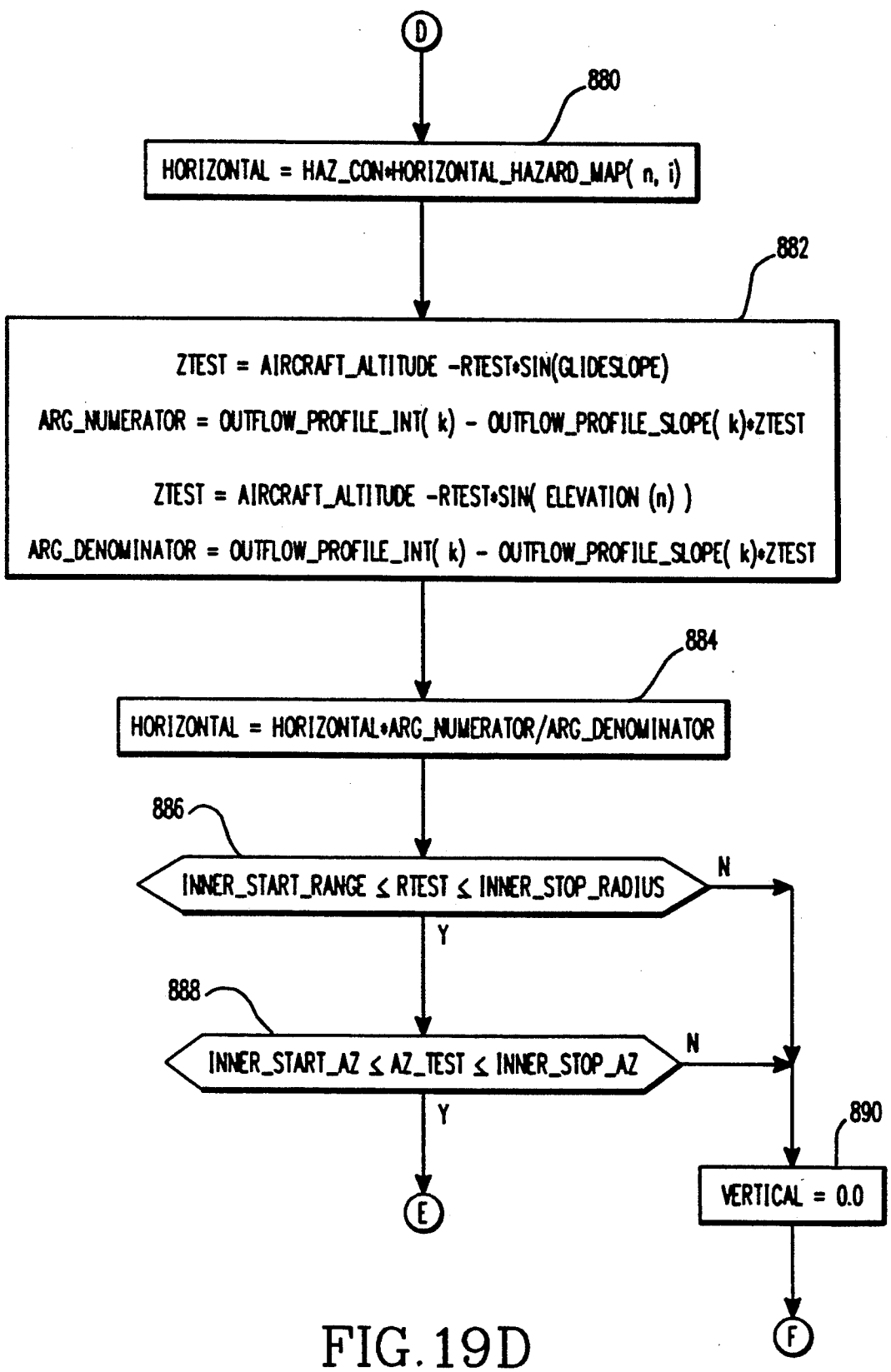
Figure 19E:
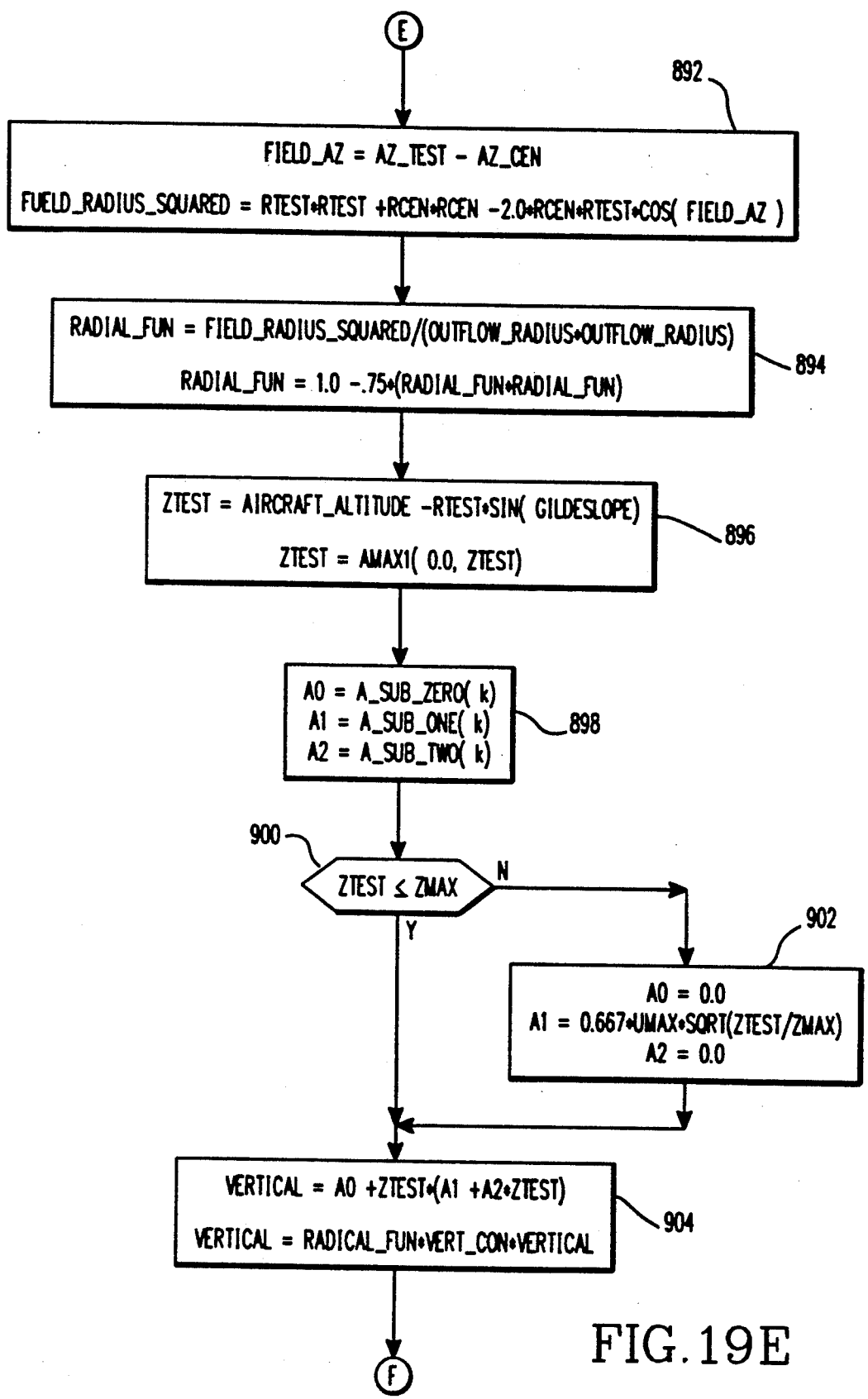
Figure 19F:
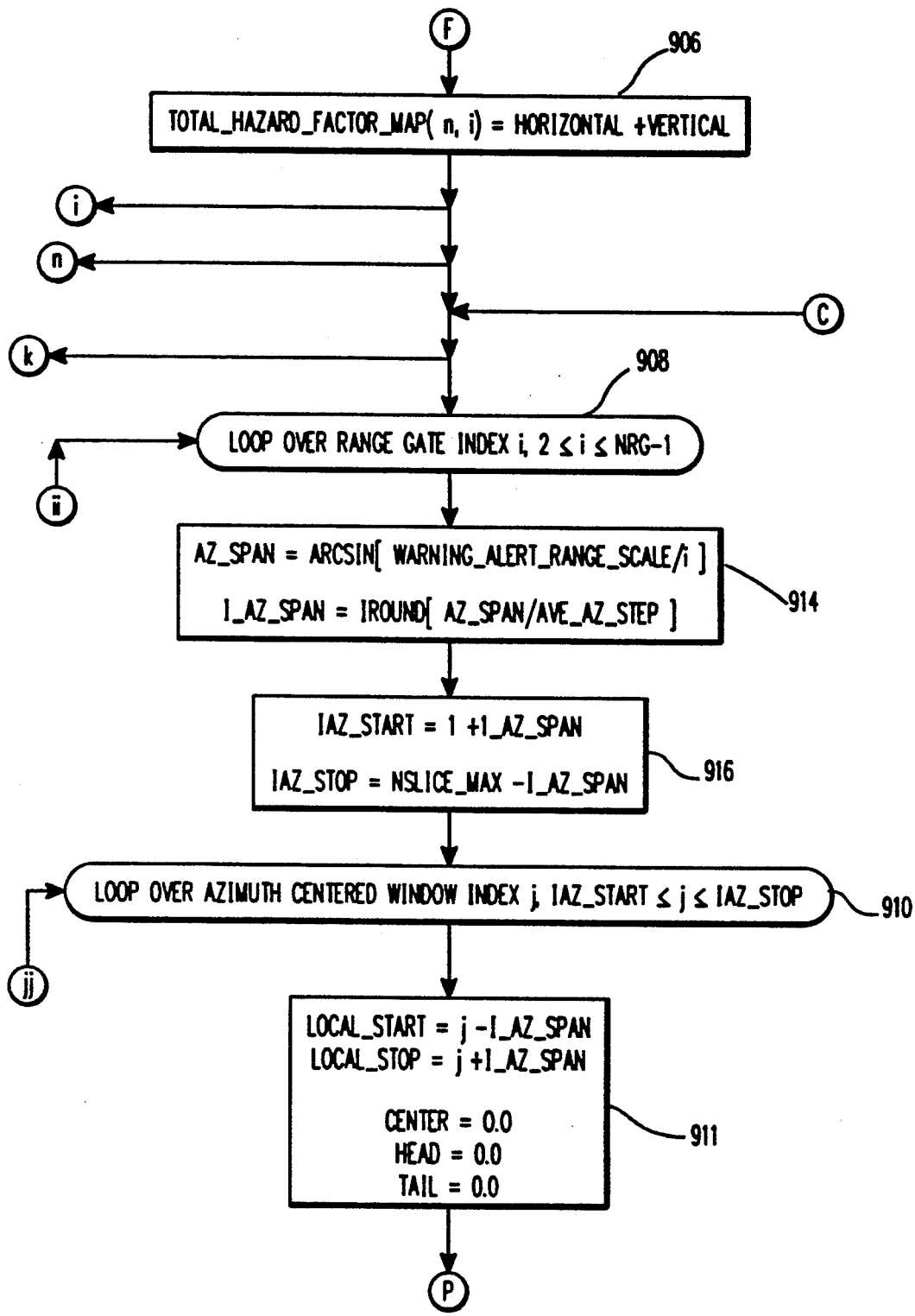
Figure 19G:
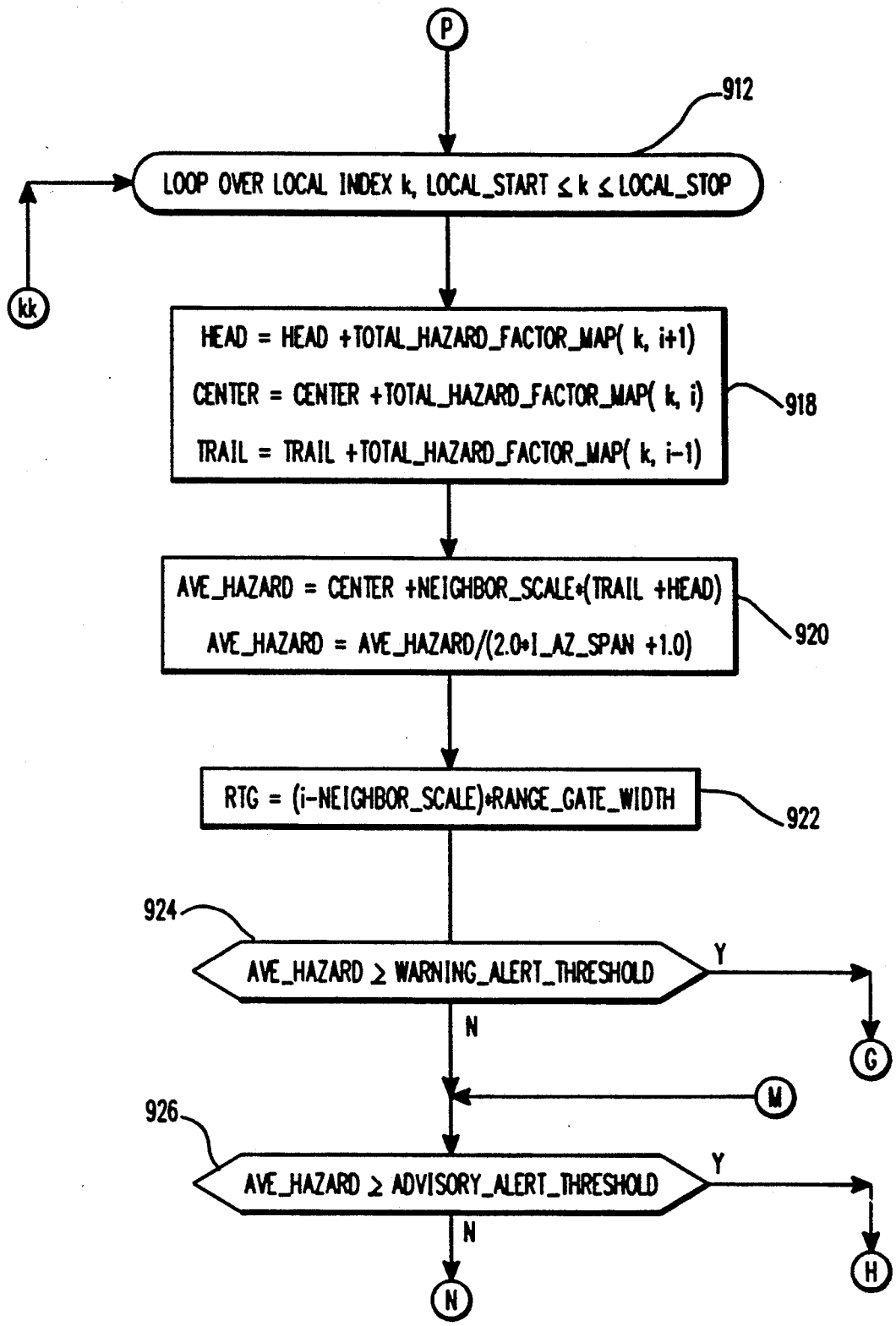
Figure 19H:
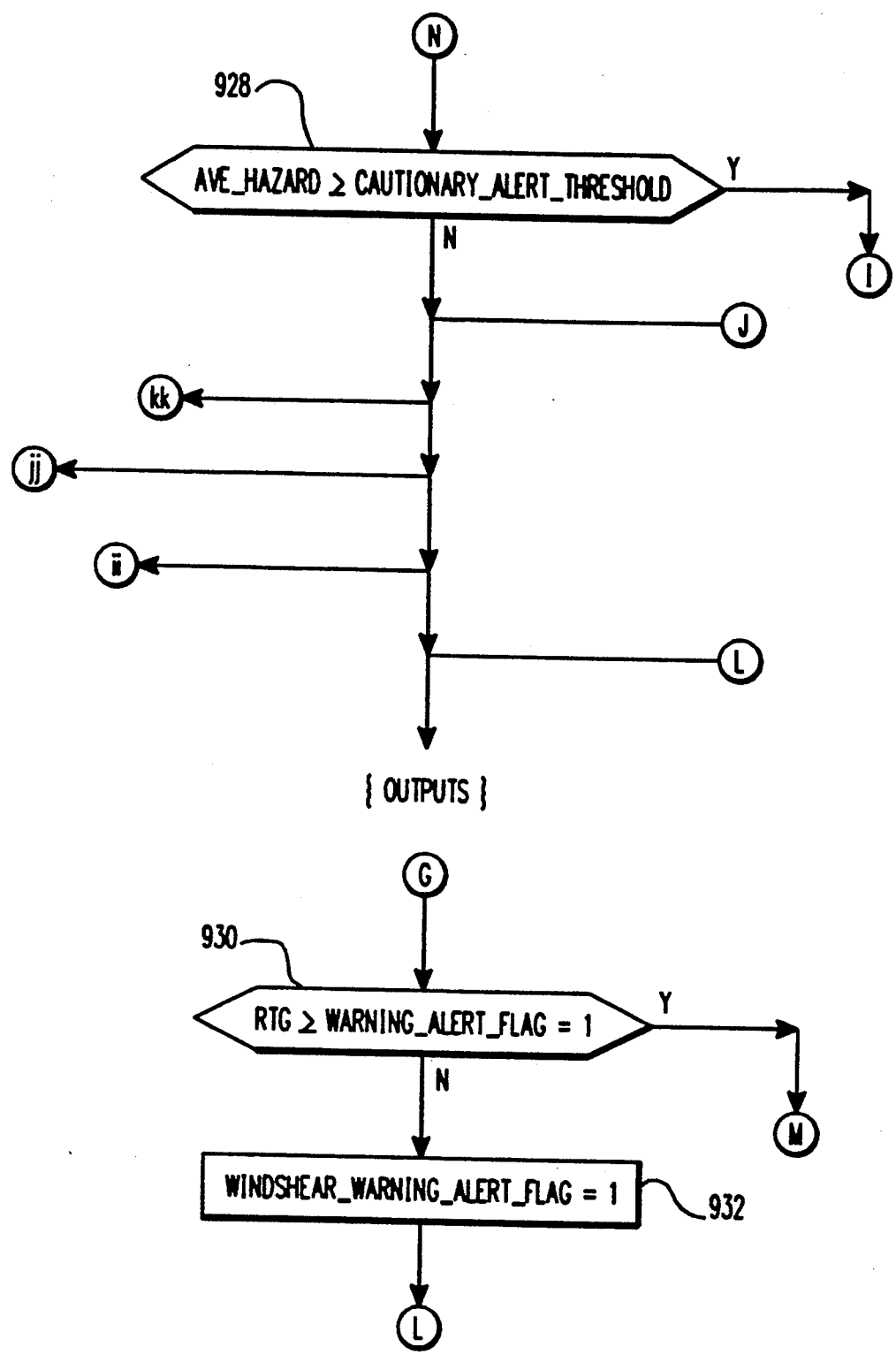
Figure 19I:
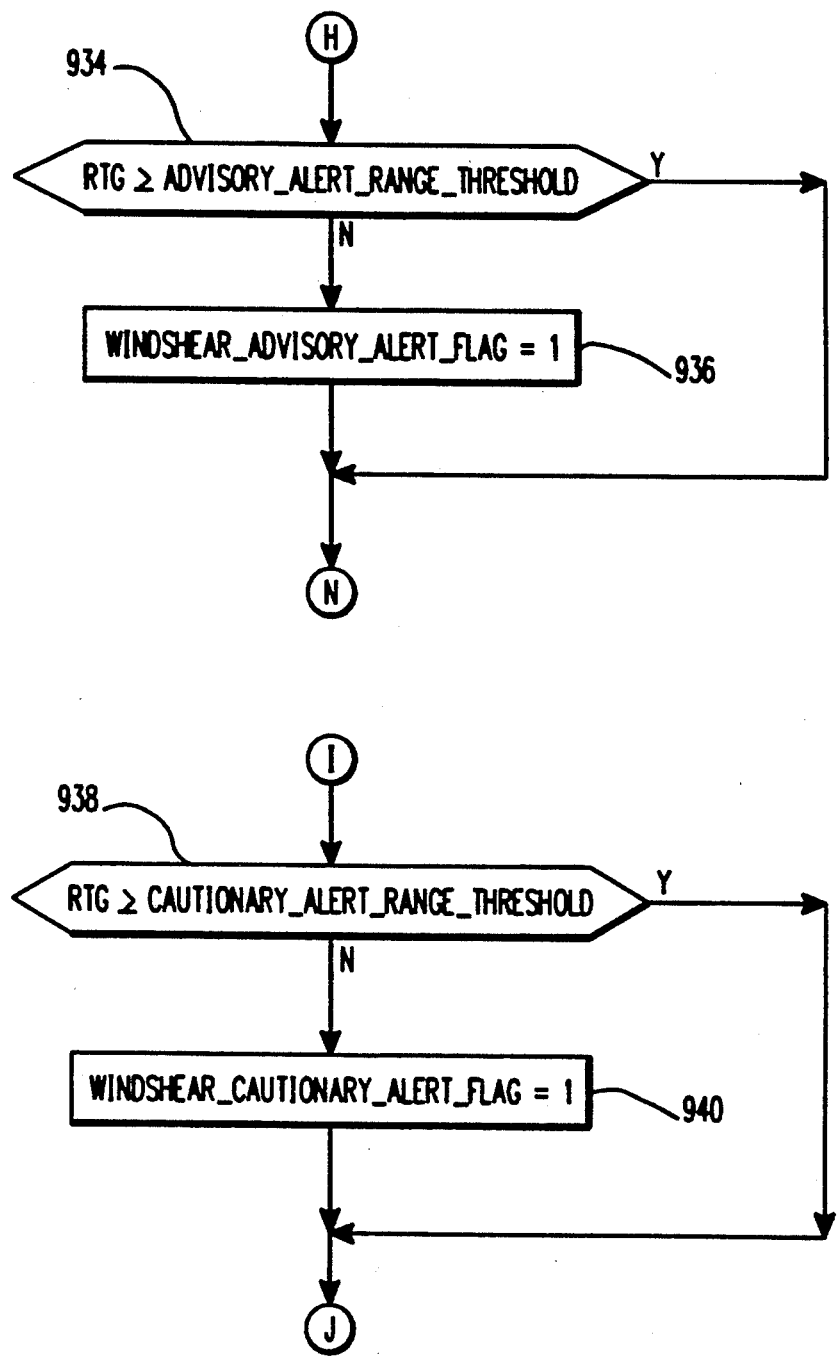

The vertical hazard estimation and scaling process 116, as illustrated in FIGS. 18A-18C begins by setting 800 calculation constants one of which is a coefficient for modeling the depth of the outflow as a function of precipitation downdraft (at 1000 meters adjusted ground level) where this coefficient is preferably 100 meters, whereby the system also sets a maximum coefficient for expressing the altitude of the maximum outflow as a function of the outflow speed where this coefficient preferably has a value of 0.122. The system then enters loop 802 looping over the number of candidates. In this loop the precipitation diameter is calculated 804 followed by calculating 806 the depth of outflow using a multiplication coefficient for modeling the depth of the outflow as a function of the precipitation diameter at 1000 meters adjusted ground level where this coefficient is preferably equal to 100 per meter. The depth of outflow is further adjusted by an additional offsetting constant preferably about 100 meters. The system then tests 808 the depth to determine whether the upper bar data altitude is too high and if not the upper bar outflow velocity is tested 810 to determine whether the upper bar outflow is really an inflow. Next, the process determines 812 if the upper bar outflow is greater than the lower bar outflow and sets the upper bar data points accordingly. The system then sets 816 the lower bar data points and computes 818 the elevation profile coefficients. Once the profile coefficients are determined, the dependent coefficients for vertical velocity are calculated 820-828 including the outflow profile slope which is the slope of the dependence of the radial outflow velocity on above ground level altitude for altitudes above the altitude of maximum outflow, the outflow profile intercept which is the data for the intercept in the linear model of the outflow velocity has a function of altitude, the altitude of the maximum outflow, a zero constant which is the constant in a power series model for the altitude dependence of the vertical wind for altitudes above the altitude of maximum outflow, a first coefficient which is the linear coefficient in the power series model of the altitude dependence of the vertical velocity and a second coefficient which is the quadratic coefficient in the power series model of the altitude dependence for the vertical velocity.

The hazard detection process 118 begins, as illustrated in FIGS. 19A-19I, by initializing 850 warning, advisory and cautionary flags and calculating a hazard constant. The system then calculates 852 and 854 warning, advisory and cautionary thresholds using the airspeed, obtained from the inertial navigation system or assumed to be 80 meters per second, and an update time which is the time until another hazard decision, that is the time over which the data must be extrapolated which is the time for a complete frame of two bars, that is, two seconds and a delay time which is the delay from receiving the radar data and producing a map. That is, the map shows where the hazard was and must be interpreted to be closer and this is the amount of time for three elevation scans or approximately three seconds along with the warning alert time which is set at 30 seconds, the advisory alert time which is set at 60 seconds and the cautionary alert time which is set at 30 seconds. The system then clears 856 the hazard map and the color hazard map. This process 118 then enters a loop 858 during which only the candidates for a hazard are examined. The profile of the hazard is set 860 and 862 and the start and stop indices are calculated 864 and 866. The system then enters an azimuth loop 868 which an azimuth test value is set 870 and tested 872 to insure that only the proper candidates are examined. The system also enters a loop 874 over range gates in which the same type of boundary setting 876 and testing 878 occurs. The system then calculates 880 a horizontal hazard factor using the horizontal windshear map data and then scales 882 and 884 the horizontal hazard factor to the glide slope. The system then tests 886 and 888 to determine whether this field point lies under the downdraft and if not sets 890 the vertical component to zero. If the field point is under the downdraft the system then determines 892 and 894 the radial constants for the vertical wind and then determines 896 the altitude for that range point along the glide slope. The system then sets 898 profile parameters, tests 900 to determine if the altitude is within the boundary layer and may reset 902 the profile parameters. The system then computes 904 the vertical wind using the radial and vertical profile model. The total hazard factor map is then written 906 for the pixel. The system then enters a set of loops over range gates 908, the azimuth sliding window 910 and the local index 912 to calculate 914-920 the average hazard and then calculates 922 the range to the hazard. The average hazard is then tested 924 against the warning alert threshold, 926 against the advisory alert threshold and 928 against the cautionary threshold. If the warning threshold is exceeded a determination 930 is made concerning whether the range is greater than the warning alert range threshold. If not, the windshear warning flag is set 932. A similar test and set operation is performed 934 and 936 for the advisory threshold and test 938 and set operation 940 for the cautionary threshold.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

The present invention has been described with respect to providing the pilot with an alert when a hazard should be avoided. However, it is possible to provide the pilot with a hazard display as well as a glide path hazard profile which shows the vertical and horizontal components. When the performance of the aircraft is known the system could also calculate a flight control profile for controlling the plane when the hazard could not be avoided. Additional pilot alerting and/or avoidance displays can use the hazard map developed here since such additional capabilities are derived from and dependent on data obtained as discussed herein.

What is claimed is:

1. A method of detecting hazardous windshear, comprising:
   (a) scanning the atmosphere in an upper radar scan;
   (b) determining first hazard candidates in the upper scan;
   (c) scanning the atmosphere in a lower radar scan;

(d) determining second hazard candidates in the downward scan responsive to the first hazard candidates; and (e) characterizing the total hazard responsive to the second hazard candidates.

2. A method as recited in claim 1, wherein the total hazard is scaled to an aircraft glideslope.

3. A method as recited in claim 1, further comprising performing, prior to step (d), constant false alarm rate processing on the lower scan using a non-rectangular window oriented with respect to loci of hazardous windshear.

4. A method as recited in claim 3, where in the constant false alarm rate processing comprises ordering Doppler cells within the window to select a maximum of medians in the Doppler order.

5. A method as recited in claim 3, further comprising, prior to the constant false alarm rate processing, performing post detection integration using a sliding azimuth window.

6. A method as recited in claim 1, wherein step (e) includes determining a microburst profile from a radial outflow determined from the upper scan.

7. A method as recited in claim 1, wherein step (e) includes determining a microburst profile from an upper radial outflow determined by the upper scan and a lower radial outflow determined from the lower scan.

8. A method as recited in claim 1, further comprising performing the upper scan at two pulse repetition frequencies and combining correlated velocity returns on a range gate basis.

9. A method as recited in claim 1, further comprising performing the lower scan at two pulse repetition frequencies and combining correlated returns on a range gate basis.

10. A method as recited in claim 1, wherein step (b) comprises identifying a candidate when a number of adjacent range cells in an azimuthal direction with a wind amplitude above a minimum exceeds a predetermined number.

11. A method as recited in claim 10, further comprising using a maximum tall wind and a maximum head wind in the candidate identify radar ranges to define a diameter of the candidate and radial outflow.

12. A method as recited in claim 10, further comprising using a maximum tall wind and a maximum head wind in the candidate identify radar ranges to define an ellipsoidal, asymmetric candidate.

13. A method recited in claim 1, wherein step (b) includes determining drift and said method further includes adjusting the total hazard response to drift.

14. A method of hazardous windshear detection, comprising:
(a) scanning the atmosphere in an upper radar scan;
(b) scanning the atmosphere in a lower radar scan; and
(c) determining a downdraft core size from the upper and lower scans.

15. An airborne method of detecting hazardous windshear from an aircraft, comprising:
(a) scanning the atmosphere in an upper radar scan at approximately five degrees above local level of the aircraft using two pulse repetition frequencies and receiving upper radar returns;
(b) performing post detection integration of the upper returns using a sliding azimuth window;
(c) performing ordered constant false alarm rate processing on the upper returns using a nonrectangular window oriented with respect to loci of hazardous windshear;
(d) combining correlated upper returns on a range gate basis;
(e) scanning the atmosphere in a lower radar scan approximately down a glideslope of the aircraft using the two repetition frequencies and receiving lower radar returns;
(f) performing steps (b)-(d) on the lower returns;
(g) determining a centroid, an upper diameter and an upper radial outflow of a hazard candidate from the upper returns;
(h) selecting a portion of the lower returns for processing responsive to the hazard candidate;
(i) determining a lower diameter and a lower radial outflow of the candidate from the portion;
(j) vertically profiling the candidate;
(k) determining a total hazard;
(l) scaling the total hazard to the glideslope; and
(m) comparing the scaled total hazard to a threshold and warning the pilot when the threshold is exceeded.

16. An airborne method of detecting hazardous windshear, comprising:
(a) scanning the atmosphere in a radar scan and receiving radar returns;
(b) performing post detection integration of the radar returns using an azimuth sliding window; and integrated returns.

17. An airborne method of detecting hazardous windshear, comprising:
(a) scanning the atmosphere in a radar scan and receiving radar returns;
(b) performing constant false alarm rate processing on the returns; and
(c) detecting windshear from the processed returns.

18. An airborne method of detecting hazardous windshear, comprising:
(a) scanning the atmosphere in upper and lower radar scans;
(b) profiling the windshear from the upper and lower radar scans using a linear relationship between radial outflow and altitude;
(c) determining the hazard from the profile.

* * * * *